United States Patent
Adachi et al.

(10) Patent No.: US 7,920,287 B2
(45) Date of Patent: Apr. 5, 2011

(54) LAYOUT APPARATUS, LAYOUT METHOD, AND PROGRAM PRODUCT

(75) Inventors: Hideki Adachi, Kanagawa (JP); Koichi Homma, Tokyo (JP); Hiroshi Yamaguchi, Kanagawa (JP); Joji Oki, Kanagawa (JP); Naohiro Yoshikawa, Kanagawa (JP); Hideyuki Fujiwara, Kanagawa (JP); Akira Negishi, Kanagawa (JP); Shuji Someya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 12/111,343

(22) Filed: Apr. 29, 2008

(65) Prior Publication Data

US 2008/0273226 A1    Nov. 6, 2008

Related U.S. Application Data

(62) Division of application No. 10/863,645, filed on Jun. 7, 2004, now abandoned.

(30) Foreign Application Priority Data

Jun. 13, 2003  (JP) .................................. 2003-170038
Jun. 13, 2003  (JP) .................................. 2003-170040

(51) Int. Cl.
G06F 3/12   (2006.01)
G06F 17/00  (2006.01)
G06F 3/00   (2006.01)
G06K 15/00  (2006.01)
G03F 3/08   (2006.01)

(52) U.S. Cl. ........ 358/1.15; 358/2.1; 358/5.23; 715/243; 715/707

(58) Field of Classification Search ................ 358/1.15, 358/2.1, 3.23; 707/9, 10; 705/67
See application file for complete search history.

(56) References Cited

U.S. PATENT DOCUMENTS

| | | | |
|---|---|---|---|
| 5,228,118 A * | 7/1993 | Sasaki ......................... 358/1.13 |
| 5,913,198 A * | 6/1999 | Banks ......................... 705/36 R |
| 6,809,748 B2 * | 10/2004 | Watanabe et al. ............. 715/741 |
| 7,047,551 B2 * | 5/2006 | Ogawa et al. ................. 725/141 |
| 7,426,474 B2 * | 9/2008 | Schoenbaum et al. ............ 705/2 |

* cited by examiner

*Primary Examiner* — King Y Poon
*Assistant Examiner* — Akwasi M Sarpong
(74) *Attorney, Agent, or Firm* — Canon U.S.A. Inc., I.P. Division

(57) ABSTRACT

A layout apparatus lays out a document by referencing personal information registered on a per user basis. Even if no particular print setting is input for a print job by a user, excellent prints customized for each user are thus provided.

4 Claims, 61 Drawing Sheets

FIG. 9

| | | |
|---|---|---|
| PRONUNCIATION | SIMOMARKO | TAROU |
| SURNAME AND FIRST NAME | SIMOMARUKO | TARO |

HOME

| | | | |
|---|---|---|---|
| POSTAL CODE | 146 | – | 8501 |
| ADDRESS | 3-30-2 SIMOMARUKO, OHTA-KU, TOKYO | | |
| TELEPHONE NO. | 03 | – XXXX – | XXXX |
| FAX NO. | 03 | – XXXX – | XXXX |
| CELLULAR PHONE NO. | 090 | – XXXX – | XXXX |
| E-Mail Address (E) | shimomaruko@cxxxx.co.jp | | |

[ OK ]  [ Cancel ]

FIG. 10

PASSWORD SETTING OF NEW REGISTRANT

USER ID : UNISSUED (NEW REGISTRATION)

| | |
|---|---|
| PASSWORD | ******** |
| PASSWORD VERIFICATION | ******** |

[ OK ]  [ Cancel ]

FIG. 11

CONTRACTUAL COVERAGE

CONTRACT PERIOD [SIX MONTHS ▼]

☐ CONTRACT BY COURSE  [PACKAGE 1 ▼]

☑ CONTRACT BY CATEGORY

- ● DOMESTIC SOCIETY
- ● DOMESTIC POLITICS
- ● DOMESTIC ECONOMY
- ○ DOMESTIC SHOW BUSINESS
- ● DOMESTIC SPORTS
- ● LOCAL AREA INFORMATION
- ● WORLD GENERAL
- ○ WORLD SOCIETY
- ○ WORLD POLITICS
- ○ WORLD ECONOMY
- ○ WORLD SHOW BUSINESS
- ○ WORLD SPORTS

NOTE) PRIORITIZE ITEMS IN THE LIST BELOW IN THE CASE OF CATEGORY BY CATEGORY CONTRACT OR KEYWORD CONTRACT.

| PRIORITY | CATEGORY OR GROUP | |
|---|---|---|
| 1 | DOMESTIC SOCIETY | ▼ |
| 2 | DOMESTIC POLITICS | ▼ |
| 3 | DOMESTIC SPORTS | ▼ |
| 4 | LOCAL AREA INFORMATION | ▼ |
| 5 | DOMESTIC ECONOMY | ▼ |
| 6 | WORLD GENERAL | ▼ |
| 7 | | ▼ |
| 8 | | ▼ |
| 9 | | ▼ |
| 10 | | ▼ |

☐ COLLECTING INFORMATION BY KEYWORD (RELATED ARTICLES COLLECTED BY GROUP)

| | KEYWORD 1 | KEYWORD 2 | KEYWORD 3 | KEYWORD 4 | KEYWORD 5 |
|---|---|---|---|---|---|
| FIRST GROUP (EXAMPLE) | SOCCER | SERIES A | NAKATA | | |
| SECOND GROUP | | | | | |
| THIRD GROUP | | | | | |
| FOURTH GROUP | | | | | |
| | | | | | |

DELIVERY

DATE OF DELIVERY [EVERYDAY ▼]   ● ONCE A DAY   ○ TWICE A DAY

TIME OF DELIVERY 1 [6 : 00 ▼]

TIME OF DELIVERY [ ▼]

[ OK ]   [ Cancel ]

FIG. 12

PERSONAL INFORMATION INPUT SCREEN

DATE OF BIRTH [1970/01/01]   SEX ●MALE ○FEMALE   HOLIDAYS [EVERY SATURDAY AND SUNDAY ▶]

OCCUPATION [ENGINEER ▶]   ANNUAL INCOME [$70,000 – 80,000 ▶]

ACADEMIC CAREER [UNIVERSITY EDUCATED ▶]   NUMBER OF FAMILY MEMBERS [3 ▶]

MARITAL STATUS ○UNMARRIED ●MARRIED   AGE OF CHILDREN/UP TO CHILDREN [10 ▶]

NUMBER OF CHILDREN [1 ▶]   HOLIDAYS OF SPOUSE [EVERY SATURDAY AND SUNDAY ▶]

EMPLOYMENT OF SPOUSE ●YES ○NO   VISION LEVEL [20/40] ASTIGMATISM ○NO ●LIGHT ○SEVERE

BLOOD TYPE [A ▶]

[OK]   [Cancel]

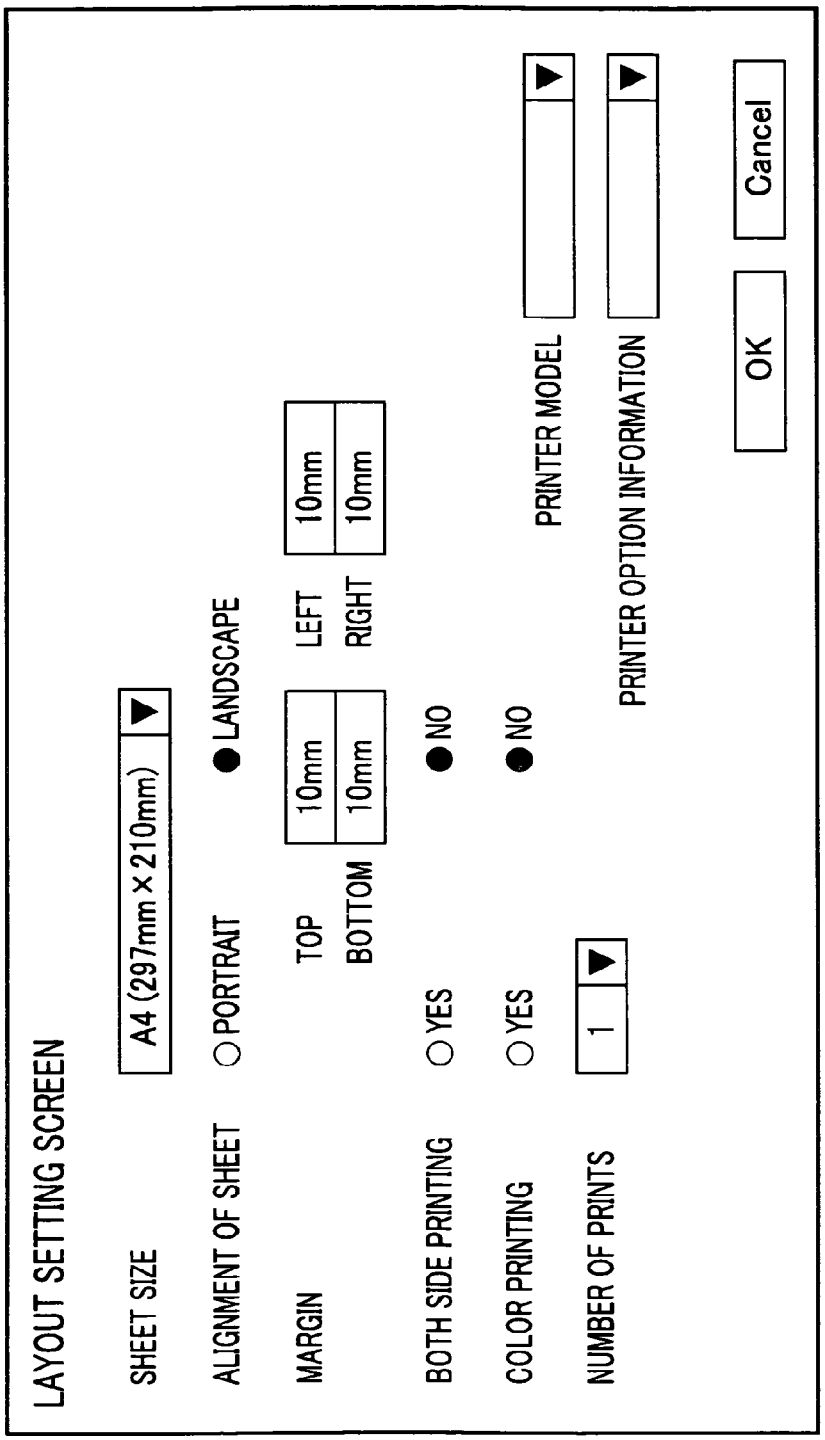

FIG. 17

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHOTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | HOLIDAYS | EVERY SATURDAY AND SUNDAY |
| | ACADEMIC CAREER | UNIVERSITY-EDUCATED |
| | ANNUAL INCOME | $70,000 - 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | - |
| | EMPLOYMENT OF SPOUSE | YES |
| | HOLIDAYS OF SPOUSE | EVERY SATURDAY AND SUNDAY |
| | BLOOD TYPE | TYPE A |
| | VISION LEVEL | 20/40 |
| | ASTIGMATISM | LIGHT |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | PRINTER OPTION NAME | NO |
| ADDITIONAL INFORMATION TABLE | CAPTION FONT SIZE | 16 POINTS |
| | TEXT FONT SIZE | 8 POINTS |
| | CHARACTER SPACING | MIDDLE |
| | LINE SPACING | MIDDLE |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

FIG. 18

| CATEGORY | UPDATE TIME | CAPTION DATA | SUMMARY DATA | DETAIL DATA | VIDEO DATA |
|---|---|---|---|---|---|
| DOMESTIC SOCIETY | 2001/10/1 5:25 | BURGLARY ····· | IN OHTA-KU JANUARY 10, ··· | ACCORDING TO POLICE REPORT, ···· | COLOR 72 DPI 30 × 30 mm |
|  | 2001/10/1 4:00 | ········ | ········ | ········ | NO |
|  | ········ | ········ | ········ | ········ | NO |
|  | ········ | ········ | ········ | ········ | NO |
| DOMESTIC POLITICS | 2001/10/1 4:30 | PASSAGE OF BILL ····· | BILL PASSED WITH A LARGE MAJORITY ···· | ON OCTOBER 1, DURING ORDINARY DIET SESSION, ··· | MONOCHROME 72 DPI 50 × 60 mm |
|  | 2001/10/1 3:05 | ········ | ········ | ········ | ··· |
|  | ········ | ········ | ········ | ········ | ··· |
|  | ········ | ········ | ········ | ········ | ··· |
| SPORTS | 2001/10/1 3:34 | JAPAN TO FINAL GAME FOR PARTICIPATION IN | ASIAN PRELIMINARY CONTEST ····· | OVERTIME GAME WITH 1-1 ···· | ··· |
|  | 2001/10/1 4:10 | ········ | ········ | ········ | ··· |
|  | ········ | ········ | ········ | ········ | ··· |
|  | ········ | ········ | ········ | ········ | ··· |
| LOCAL AREA | 2001/10/1 2:56 | ABC ORCHESTRA GIVING CONCERT | IN OHTA-KU CITIZEN PLAZA TODAY, ·· | CONCERT OF ABC ORCHESTRA ·· | ··· |
|  | 2001/10/1 1:42 | ········ | ········ | ········ | ··· |
| ECONOMY | 2001/10/1 4:27 | COMPANY GOING TO A LARGE-SCALE RESTRUCTURING | XXX COMPANY ······ | ········ | ··· |
|  | ········ | ········ | ········ | BUSINESS ACTIVITY FROM LAST YEAR ·· | ··· |
|  | ········ | ········ | ········ | ········ | ··· |
| WORLD | 2001/10/1 3:12 | SPACE SHUTTLE ····· | NASA ······ | ACCORDING TO NASA REPORT, ······ | ··· |
|  | ········ | ········ | ········ | ········ | ··· |

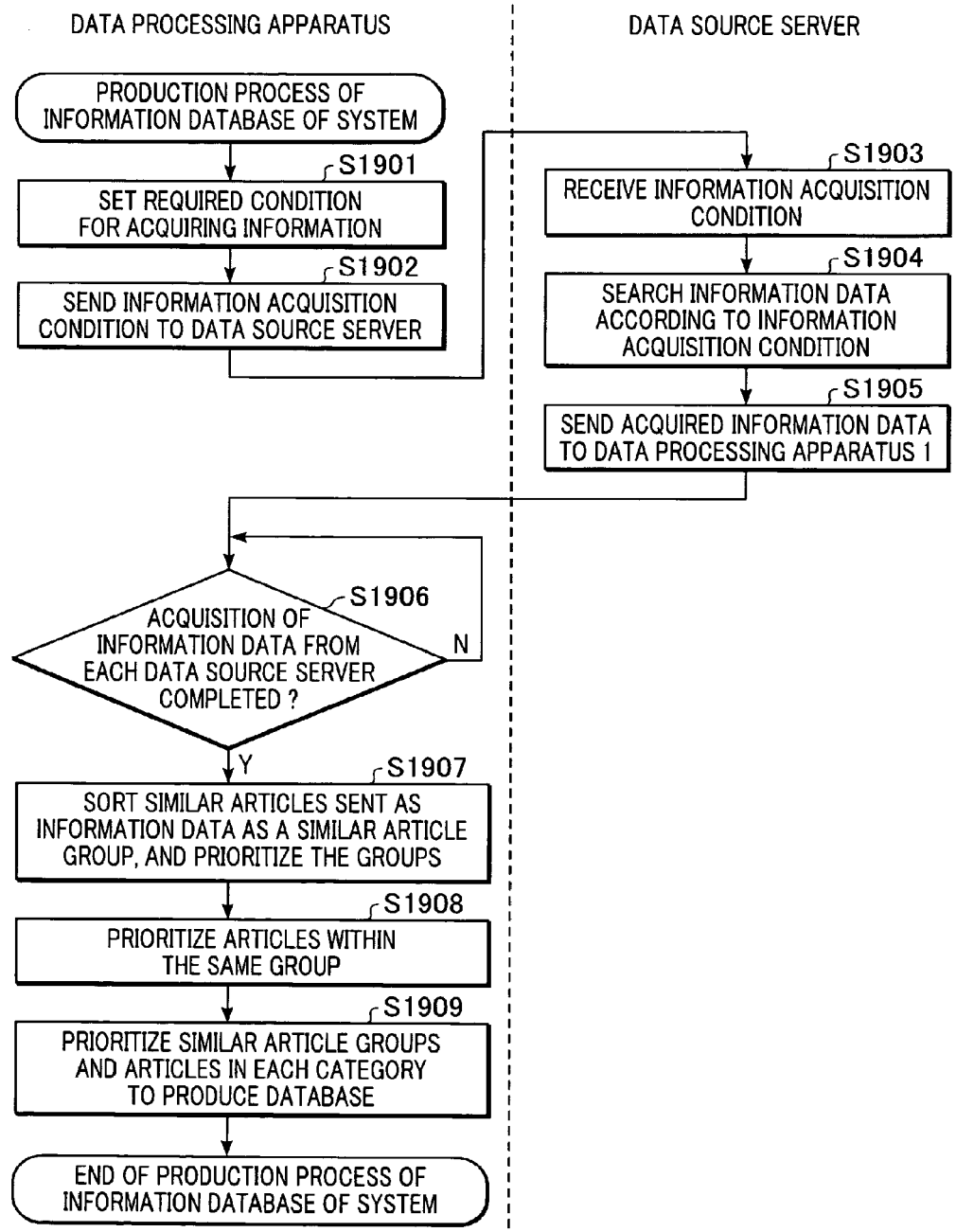

FIG. 20

| CATEGORY | CATEGORY PRIORITY | DATA GROUP PRIORITY | DATA PRIORITY | UPDATE TIME | CAPTION DATA | SUMMARY DATA | DETAIL DATA | VIDEO DATA | SOURCE NAME |
|---|---|---|---|---|---|---|---|---|---|
| DOMESTIC SOCIETY | 1 | 1 | 1 | 2001/10/1 5:25 | BURGLAR ..... | ON OCTOBER 1, IN OHTA-KU, ..... | ACCORDING TO POLICE REPORTING, ..... | COLOR 72 DPI 30 × 30 mm | A |
| | | | 2 | ........ | ....ARRESTED | ..........OHOTA-KU ..... | SUSPECTED OF BURGLARY ....... | NO | B |
| | | | 3 | 2001/10/1 4:00 | ........ | ........ | ........ | NO | A |
| | | 2 | 1 | ........ | HOTEL FIRE ....... | DISASTER ........ | BEFORE DAWN ........ | MONOCHROME 72 DPI 50 × 60 mm | C |
| | | | 2 | ........ | ........ | ........ | ........ | NO | A |
| | | | 3 | ........ | ........ | ........ | ........ | ... | B |
| | | 3 | 1 | ........ | ALLEVIATION OF TRAFFIC JAMS BY ... | ACCORDING TO REPORTING, ........ | IN TOKYO ........ | ... | A |
| | | | 2 | ........ | ........ | ........ | ........ | ... | B |
| | | 4 | 1 | ........ | ........ | ........ | ........ | ... | A |
| | | | 2 | ........ | ........ | ........ | ........ | ... | B |
| | | 5 | 1 | ........ | ........ | ........ | ........ | ... | B |
| DOMESTIC POLITICS | 2 | 1 | 1 | 2001/10/1 4:30 | PASSING OF BILL .... | XXX BILL PASSED WITH A LARGE MAJORITY ... | DURING ORDINARY DIET SESSION ... | ... | A |
| | | | 2 | ........ | ........ | ........ | ........ | ... | C |
| | | | 3 | ........ | ........ | ........ | ........ | ... | B |
| | | 2 | 1 | ........ | DEPARTURE OF FOREIGN MINISTER FROM PARTY | HELD IN OCTOBER 1, ........ | AS A RESULT OF A MEETING OF PARTY EXECUTIVES, | ... | C |
| | | | 2 | ........ | ........ | ........ | ........ | ... | B |
| | | 3 | 1 | ........ | PRIME MINISTER VISITING THE U.S. TOMORROW | MEETING WITH PRESIDENT ..... | DEPARTING IN OFFICIAL PLANE AT 3 PM, .. | ... | B |
| | | | 2 | 2001/10/1 3:05 | ........ | ........ | ........ | ... | A |
| | | 4 | 1 | ........ | ........ | ........ | ........ | ... | B |
| | | 5 | 1 | ........ | ........ | ........ | ........ | ... | C |

FIG. 21

| | | | | | | |
|---|---|---|---|---|---|---|
| SPORTS | 3 | 1 | 1 | 2001/10/1 3:34 | JAPAN TO FINAL GAME FOR PARTICIPATION IN | ASIAN PRELIMINARY CONTEST ···· | IN AN OVERTIME GAME WITH 0-0, ····· | A |
| | | | 2 | ········ | ········ | ········ | ········ | B |
| | | 2 | 1 | ········ | NATIONAL MEDAL OF HONOR GRANTED TO | IN CONTEST, CHAMPIONSHIP WAS WON BY·· | IN THE CONTEST, ········ | A |
| | | | 2 | ········ | ········ | ········ | ········ | C |
| | | 3 | 1 | ········ | GOING TO RETIRE FROM ····· | ACTIVE WINNINGEST PITCHER ···· | WITH A RIGHT ACHING SHOULDER, ···· | C |
| | | 4 | 1 | 2001/10/1 4:10 | ········ | ········ | ········ | B |
| | | 5 | 1 | ········ | ········ | ········ | ········ | A |
| AREA | 4 | 1 | 1 | 2001/10/1 2:56 | ABC ORCHESTRA GIVING A CONCERT | IN OHTA-KU CITIZEN PLAZA TODAY, ···· | THE CONCERT OF ABC ORCHESTRA ···· | A |
| | | | 2 | ········ | ········ | ········ | ········ | C |
| | | 2 | 1 | ········ | HIGH SCHOOL TEAM HAS WON CHAMPIONSHIP IN TOKYO | IN WIND-INSTRUMENT MUSIC CONTEST IN TOKYO | WIND-INSTRUMENT CLUB OF XXX HIGH SCHOOL | A |
| | | 3 | 1 | 2001/10/1 1:42 | ········ | ········ | ········ | A |
| | | 4 | 1 | ········ | ········ | ········ | ········ | C |
| ECONOMY | 5 | 1 | 1 | 2001/10/1 4:27 | COMPANY GOING TO A LARGE-SCALE RESTRUCTURING | COMPANY ········ | BUSINESS ACTIVITY CONTINUOUS FROM LAST YEAR | A |
| | | | 2 | ········ | ········ | ········ | ········ | C |
| | | 2 | 1 | ········ | INCREASE IN INVESTMENT IN SEMICONDUCTOR MANUFACTURING | WITH EACH COMPANY HAVING A SUBSTANTIAL ORDER | USED IN CELLULAR PHONES ···· | B |
| | | 3 | 1 | ········ | ········ | ········ | ········ | B |
| WORLD | 6 | 1 | 1 | 2001/10/1 3:12 | SPACE SHUTTLE ········ | NASA ····· | ACCORDING TO NASA REPORTING, ···· | A |
| | | 2 | 1 | ········ | OCCURRENCE OF TERRORISM IN AREA | IN THE MIDDLE EAST PEACE TALKS, ···· | GUERRILLA IN THE AREA ···· | C |
| | | 3 | 1 | ········ | ········ | ········ | ········ | B |

FIG. 29

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | HOLIDAYS | EVERY SATURDAY AND SUNDAY |
| | ACADEMIC CAREER | UNIVERSITY EDUCATED |
| | ANNUAL INCOME | $70,000 - 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | - |
| | EMPLOYMENT OF SPOUSE | YES |
| | HOLIDAYS OF SPOUSE | EVERY SATURDAY AND SUNDAY |
| | BLOOD TYPE | TYPE A |
| | VISION LEVEL | 20/40 |
| | ASTIGMATISM | LIGHT |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | PRINTER OPTION NAME | NO |
| ADDITIONAL INFORMATION TABLE | CAPTION FONT SIZE | DEFAULT 16 POINTS |
| | TEXT FONT SIZE | DEFAULT 8 POINTS |
| | CHARACTER SPACING | MIDDLE |
| | LINE SPACING | NARROW |
| | TONER SAVE MODE | ON |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

FIG. 32

PERSONAL INFORMATION INPUT SCREEN

DATE OF BIRTH  1970/01/01

OCCUPATION  ENGINEER ▶

ACADEMIC CAREER  UNIVERSITY EDUCATED ▶

MARITAL STATUS  ○ UNMARRIED  ● MARRIED

NUMBER OF CHILDREN  1 ▶

EMPLOYMENT OF SPOUSE  ● YES  ○ NO

BLOOD TYPE  A ▶

SEX  ● MALE  ○ FEMALE

COMMUTING MEANS  PUBLIC TRANSPORTATION ▶

HOLIDAYS  EVERY SATURDAY AND SUNDAY ▶

ANNUAL INCOME  $70,000 – 80,000 ▶

NUMBER OF FAMILY MEMBERS  3 ▶

AGE OF CHILDREN/UP TO CHILDREN  10 ▶

HOLIDAYS OF SPOUSE  EVERY SATURDAY AND SUNDAY ▶

VISION LEVEL  20/40  ASTIGMATISM  ○ NO  ● LIGHT  ○ SEVERE

PHYSICALLY HANDICAPPED  ○ YES  ● NO

OK    Cancel

FIG. 33

PERSONAL INFORMATION INPUT SCREEN

| | |
|---|---|
| DATE OF BIRTH | 1970/01/01 |
| OCCUPATION | ENGINEER ▶ |
| ACADEMIC CAREER | UNIVERSITY EDUCATED ▶ |
| MARITAL STATUS | ○ UNMARRIED  ● MARRIED |
| NUMBER OF CHILDREN | 1 ▶ |
| EMPLOYMENT OF SPOUSE | ● YES  ○ NO |
| BLOOD TYPE | A ▶ |
| SEX | ● MALE  ○ FEMALE |
| COMMUTING MEANS | PUBLIC TRANSPORTATION ▶ |
| HOLIDAYS | EVERY SATURDAY AND SUNDAY ▶ |
| ANNUAL INCOME | $70,000 – 80,000 ▶ |
| NUMBER OF FAMILY MEMBERS | 3 ▶ |
| AGE OF CHILDREN/UP TO CHILDREN | 10 ▶ |
| HOLIDAYS OF SPOUSE | EVERY SATURDAY AND SUNDAY ▶ |
| VISION LEVEL | 20/40  ASTIGMATISM ○ YES ● NO  ● LIGHT ○ SEVERE |
| PHYSICALLY HANDICAPPED | ○ YES ● NO  DEGREE OF HANDICAP ▶ |

- HANDICAP 1    ○ YES  ● NO
- HANDICAP 2    ○ YES  ● NO
- HANDICAP 3    ○ YES  ● NO
- ⋯
- HANDICAP N    ○ YES  ● NO

[ OK ]   [ Cancel ]

FIG. 36

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | COMMUTING MEANS | PUBLIC TRANSPORTATION |
| | HOLIDAYS | EVERY SATURDAY AND SUNDAY |
| | ACADEMIC CAREER | UNIVERSITY EDUCATED |
| | ANNUAL INCOME | $70,000 - 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | - |
| | EMPLOYMENT OF SPOUSE | YES |
| | HOLIDAYS OF SPOUSE | EVERY SATURDAY AND SUNDAY |
| | BLOOD TYPE | TYPE A |
| | VISION LEVEL | 20/40 |
| | PHYSICALLY HANDICAPPED | YES |
| | HANDICAP 1 | YES |
| | HANDICAP 2 | NO |
| | HANDICAP 3 | NO |
| | HANDICAP N | YES |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | OPTION NAME | NO |
| ADDITIONAL INFORMATION TABLE | DISCHARGE BIN DESIGNATE FUNCTION | DESIGNATE DISCHARGE BIN AT LOWER LEVEL |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

FIG. 40

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | COMMUTING MEANS | PUBLIC TRANSPORTATION |
| | HOLIDAYS | EVERY SATURDAY AND SUNDAY |
| | ACADEMIC CAREER | UNIVERSITY EDUCATED |
| | ANNUAL INCOME | $70,000 - 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | — |
| | EMPLOYMENT OF SPOUSE | YES |
| | HOLIDAYS OF SPOUSE | EVERY SATURDAY AND SUNDAY |
| | BLOOD TYPE | TYPE A |
| | VISION LEVEL | 20/40 |
| | ASTIGMATISM | LIGHT |
| | PHYSICALLY HANDICAPPED | YES |
| | HANDICAP 1 | YES |
| | HANDICAP 2 | NO |
| | HANDICAP 3 | NO |
| | HANDICAP N | YES |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | OPTION NAME | NO |
| ADDITIONAL INFORMATION TABLE | CAPTION FONT SIZE | DEFAULT 16 POINTS |
| | TEXT FONT SIZE | DEFAULT 8 POINTS |
| | CHARACTER SPACING | MIDDLE |
| | LINE SPACING | NARROW |
| | PRONUNCIATION GUIDE FONT SIZE | 4 POINTS |
| | GRADE | FOURTH-YEAR STUDENT IN PRIMARY SCHOOL |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

FIG. 43

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | COMMUTING MEANS | PUBLIC TRANSPORTATION |
| | HOLIDAYS | EVERY SATURDAY AND SUNDAY |
| | ACADEMIC CAREER | UNIVERSITY EDUCATED |
| | ANNUAL INCOME | $70,000 - 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | - |
| | EMPLOYMENT OF SPOUSE | YES |
| | HOLIDAYS OF SPOUSE | EVERY SATURDAY AND SUNDAY |
| | BLOOD TYPE | TYPE A |
| | VISION LEVEL | 20/40 |
| | ASTIGMATISM | LIGHT |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | OPTION NAME | NO |
| ADDITIONAL INFORMATION TABLE | MONDAY STAPLE PROCESS | STAPLE PROCESSED |
| | TUESDAY STAPLE PROCESS | STAPLE PROCESSED |
| | WEDNESDAY STAPLE PROCESS | STAPLE PROCESSED |
| | THURSDAY STAPLE PROCESS | STAPLE PROCESSED |
| | FRIDAY STAPLE PROCESS | STAPLE PROCESSED |
| | SATURDAY STAPLE PROCESS | NOT STAPLE PROCESSED |
| | SUNDAY STAPLE PROCESS | NOT STAPLE PROCESSED |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

FIG. 45

LAYOUT SETTING SCREEN

| | | |
|---|---|---|
| SHEET SIZE | A4 (297mm × 210mm) ▶ | |
| ALIGNMENT OF SHEET | ○ PORTRAIT | ○ LANDSCAPE |
| MARGIN | TOP 10mm<br>BOTTOM 10mm | LEFT 10mm<br>RIGHT 10mm |
| BOTH SIDE PRINTING | ○ YES | ● NO |
| COLOR PRINTING | ○ YES | ● NO |
| NUMBER OF PRINTS | 1 ▶ | ● AUTOMATIC |
| STAPLE POSITION | RIGHT TOP ▶ | |

PRINTER MODEL NAME ▶

PRINTER OPTION INFORMATION ▶

OK    Cancel

FIG. 48

PERSONAL INFORMATION INPUT SCREEN

DATE OF BIRTH  1970/01/01

OCCUPATION  ENGINEER ▶

ACADEMIC CAREER  UNIVERSITY EDUCATED ▶

MARITAL STATUS  ○ UNMARRIED  ● MARRIED

NUMBER OF CHILDREN  1 ▶

EMPLOYMENT OF SPOUSE  ● YES  ○ NO

BLOOD TYPE  A ▶

PLACE OF READING  RAILCAR ▶

SEX  ● MALE  ○ FEMALE

HOLIDAYS  EVERY SATURDAY AND SUNDAY ▶

ANNUAL INCOME  $70,000 – 80,000 ▶

NUMBER OF FAMILY MEMBERS  3 ▶

AGE OF CHILDREN/UP TO CHILDREN  10 ▶

HOLIDAYS OF SPOUSE  EVERY SATURDAY AND SUNDAY ▶

VISION LEVEL  20/40  ASTIGMATISM  ○ NO  ● LIGHT  ○ SEVERE

OK    Cancel

FIG. 49

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | HOLIDAYS | EVERY SATURDAY AND SUNDAY |
| | ACADEMIC CAREER | UNIVERSITY EDUCATED |
| | ANNUAL INCOME | $70,000 - 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | - |
| | EMPLOYMENT OF SPOUSE | YES |
| | HOLIDAYS OF SPOUSE | EVERY SATURDAY AND SUNDAY |
| | BLOOD TYPE | TYPE A |
| | VISION LEVEL | 20/40 |
| | ASTIGMATISM | LIGHT |
| | PLACE OF READING | RAILCAR |
| | PASSWORD | ******** |
| PRINT LAYOUT TABLE | SHEET SIZE | A4 |
| | ALIGNMENT OF SHEET | AUTOMATIC |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | OPTION NAME | NO |
| ADDITIONAL INFORMATION TABLE | SHEET ALIGNMENT | PORTRAIT |
| | STAPLE POSITION | TOP RIGHT |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

FIG. 51

PERSONAL INFORMATION INPUT SCREEN

DATE OF BIRTH  1970/01/01   SEX  ● MALE  ○ FEMALE

OCCUPATION  ENGINEER ▶   HOLIDAYS  EVERY SATURDAY AND SUNDAY ▶

ACADEMIC CAREER  UNIVERSITY EDUCATED ▶   ANNUAL INCOME  $70,000 – 80,000 ▶

MARITAL STATUS  ○ UNMARRIED  ● MARRIED   NUMBER OF FAMILY MEMBERS  3 ▶

NUMBER OF CHILDREN  1 ▶   AGE OF CHILDREN/UP TO CHILDREN  10 ▶

EMPLOYMENT OF SPOUSE  ● YES  ○ NO   HOLIDAYS OF SPOUSE  EVERY SATURDAY AND SUNDAY ▶

BLOOD TYPE  A ▶   VISION LEVEL  20/40   ASTIGMATISM  ○ NO  ● LIGHT  ○ SEVERE

MAIN PLACE OF READING  RAILCAR ▶   AGE  30 ▶

NATIONALITY  JAPANESE ▶

OK   Cancel

FIG. 52

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | HOLIDAYS | EVERY SATURDAY AND SUNDAY |
| | ACADEMIC CAREER | UNIVERSITY EDUCATED |
| | ANNUAL INCOME | $70,000 - 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | - |
| | EMPLOYMENT OF SPOUSE | YES |
| | HOLIDAYS OF SPOUSE | EVERY SATURDAY AND SUNDAY |
| | BLOOD TYPE | TYPE A |
| | VISION LEVEL | 20/40 |
| | ASTIGMATISM | LIGHT |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | OPTION NAME | NO |
| ADDITIONAL INFORMATION TABLE | TEXT PROFILE | PROFILE A |
| | DRAWING PROFILE | PROFILE B |
| | IMAGE PROFILE | PROFILE C |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

FIG. 55

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | HOLIDAYS | EVERY SATURDAY AND SUNDAY |
| | ACADEMIC CAREER | UNIVERSITY EDUCATED |
| | ANNUAL INCOME | $70,000 ~ 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | - |
| | EMPLOYMENT OF SPOUSE | YES |
| | HOLIDAYS OF SPOUSE | EVERY SATURDAY AND SUNDAY |
| | BLOOD TYPE | TYPE A |
| | VISION LEVEL | 20/40 |
| | ASTIGMATISM | LIGHT |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | OPTION NAME | NO |
| ADDITIONAL INFORMATION TABLE | CAPTION FONT SIZE | 16 POINTS |
| | TEXT FONT SIZE | 8 POINTS |
| | CHARACTER SPACING | MIDDLE |
| | LINE SPACING | MIDDLE |
| | DATA PROCESSING DEFINITION | 600 DPI |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

FIG. 57

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | HOLIDAYS | EVERY SATURDAY AND SUNDAY |
| | ACADEMIC CAREER | UNIVERSITY EDUCATED |
| | ANNUAL INCOME | $70,000 - 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | - |
| | EMPLOYMENT OF SPOUSE | YES |
| | HOLIDAYS OF SPOUSE | EVERY SATURDAY AND SUNDAY |
| | BLOOD TYPE | TYPE A |
| | VISION LEVEL | 20/40 |
| | ASTIGMATISM | LIGHT |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | OPTION NAME | NO |
| ADDITIONAL INFORMATION TABLE | CAPTION FONT SIZE | 16 POINTS |
| | TEXT FONT SIZE | 8 POINTS |
| | CHARACTER SPACING | MIDDLE |
| | LINE SPACING | MIDDLE |
| | DITHER PATTERN | HIGH DEFINITION |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

FIG. 58

PERSONAL INFORMATION INPUT SCREEN

| DATE OF BIRTH | 1970/01/01 | SEX | ● MALE ○ FEMALE |
| --- | --- | --- | --- |
| OCCUPATION | ENGINEER ▶ | HOLIDAYS | EVERY SATURDAY AND SUNDAY ▶ |
| ACADEMIC CAREER | UNIVERSITY EDUCATED ▶ | ANNUAL INCOME | $70,000 – 80,000 ▶ |
| MARITAL STATUS | ○ UNMARRIED ● MARRIED | NUMBER OF FAMILY MEMBERS | 3 ▶ |
| NUMBER OF CHILDREN | 1 ▶ | AGE OF CHILDREN/UP TO CHILDREN | 10 ▶ |
| EMPLOYMENT OF SPOUSE | ● YES ○ NO | HOLIDAYS OF SPOUSE | EVERY SATURDAY AND SUNDAY ▶ |
| BLOOD TYPE | A ▶ | VISION LEVEL | 20/40  ASTIGMATISM ○ NO ● LIGHT ○ SEVERE |
| BODY HEIGHT | 173 cm | BETTER ARM | RIGHT ▶ |

[ OK ]   [ Cancel ]

FIG. 60

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | ENGINEER |
| | COMMUTING MEANS | PUBLIC TRANSPORTATION |
| | HOLIDAYS | EVERY SATURDAY AND SUNDAY |
| | ACADEMIC CAREER | UNIVERSITY EDUCATED |
| | ANNUAL INCOME | $70,000 - 80,000 |
| | MARITAL STATUS | MARRIED |
| | NUMBER OF FAMILY MEMBERS | 3 |
| | NUMBER OF CHILDREN | 1 |
| | AGE OF FIRST CHILD | 10 |
| | AGE OF SECOND CHILD | - |
| | EMPLOYMENT OF SPOUSE | YES |
| | HOLIDAYS OF SPOUSE | EVERY SATURDAY AND SUNDAY |
| | BLOOD TYPE | TYPE A |
| | BODY HEIGHT | 173 cm |
| | VISION LEVEL | 20/40 |
| | ASTIGMATISM | LIGHT |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | OPTION NAME | NO |
| ADDITIONAL INFORMATION TABLE | CAPTION FONT SIZE | DEFAULT 16 POINTS |
| | TEXT FONT SIZE | DEFAULT 8 POINTS |
| | CHARACTER SPACING | MIDDLE |
| | LINE SPACING | NARROW |
| | PRONUNCIATION GUIDE FONT SIZE | 4 POINTS |
| | GRADE | FOURTH-YEAR STUDENT IN PRIMARY SCHOOL |
| | STITCHING DIRECTION | LONG SIDE |
| | STITCHING WIDTH | 4 mm |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

MEMORY MAP OF STORAGE MEDIUM

FIG. 69

| USER INFORMATION TABLE | | |
|---|---|---|
| PERSONAL INFORMATION TABLE | NAME | TARO SIMOMARUKO |
| | PRONUNCIATION | TAROU SIMOMARUKO |
| | POSTAL CODE | 148-8501 |
| | ADDRESS | SIMOMARUKO, OHTA-KU, TOKYO |
| | TELEPHONE NUMBER | 03-xxxx-xxxx |
| | FAX NUMBER | 03-xxxx-xxxx |
| | CELLULAR PHONE NUMBER | 090-xxxx-xxx |
| | E-MAIL ADDRESS | simomarukotarou@cxxxx.co.jp |
| | DATE OF BIRTH | 1970/1/1 |
| | SEX | MALE |
| | OCCUPATION | PRIMARY SCHOOL STUDENT |
| | COMMUTING MEANS | - |
| | HOLIDAYS | - |
| | ACADEMIC CAREER | - |
| | ANNUAL INCOME | - |
| | MARITAL STATUS | - |
| | NUMBER OF FAMILY MEMBERS | - |
| | NUMBER OF CHILDREN | - |
| | AGE OF FIRST CHILD | - |
| | AGE OF SECOND CHILD | - |
| | EMPLOYMENT OF SPOUSE | - |
| | HOLIDAYS OF SPOUSE | - |
| | BLOOD TYPE | TYPE A |
| | VISION LEVEL | 20/40 |
| | ASTIGMATISM | NO |
| | PASSWORD | ******** |
| PRINT LAYOUT TABLE | SHEET SIZE | A4 |
| | ALIGNMENT OF SHEET | LANDSCAPE |
| | PRINT AREA (TOP) | 10mm |
| | PRINT AREA (BOTTOM) | 10mm |
| | PRINT AREA (LEFT) | 10mm |
| | PRINT AREA (RIGHT) | 10mm |
| | BOTH SIDE PRINTING | NO |
| | COLOR PRINTING | NO |
| | NUMBER OF PRINTS | 1 |
| | PRINTER MODEL NAME | NO |
| | OPTION NAME | NO |
| ADDITIONAL INFORMATION TABLE | CAPTION FONT SIZE | DEFAULT 16 POINTS |
| | TEXT FONT SIZE | DEFAULT 8 POINTS |
| | CHARACTER SPACING | MIDDLE |
| | LINE SPACING | NARROW |
| | PRONUNCIATION GUIDE FONT | 4 POINTS |
| | GRADE | FOURTH-YEAR STUDENT IN PRIMARY SCHOOL |
| | OBJECT PRIORITY | PHOTOGRAPHS AND DRAWINGS |
| CONTRACT TABLE | CONTRACT PERIOD | 6 MONTHS |
| | CONTRACT BY COURSE | NO |
| | CONTRACT BY CATEGORY | YES |
| | FIRST PRIORITY CATEGORY | DOMESTIC SOCIETY |
| | SECOND PRIORITY CATEGORY | DOMESTIC POLITICS |
| | THIRD PRIORITY CATEGORY | DOMESTIC SPORTS |
| | FOURTH PRIORITY CATEGORY | LOCAL AREA INFORMATION |
| | FIFTH PRIORITY CATEGORY | DOMESTIC ECONOMY |
| | SIXTH PRIORITY CATEGORY | WORLD GENERAL |
| | CONTRACT BY KEYWORD | NO |
| | DATE OF DELIVERY | EVERYDAY |
| | FREQUENCY OF DELIVERY | 1 |
| | TIME OF DELIVERY | 6 : 00 |

LAYOUT APPARATUS, LAYOUT METHOD, AND PROGRAM PRODUCT

CROSS REFERENCE TO RELATED APPLICATIONS

This application is a divisional of U.S. patent application Ser. No. 10/863,645, filed Jun. 7, 2004, which claims the benefit of Japanese Patent Laid-Open No. 2003-170040, filed Jun. 13, 2003 and Japanese Patent Laid-Open No. 2003-170038, filed Jun. 13, 2003, which are hereby incorporated by reference herein in their entirety.

BACKGROUND OF THE INVENTION

1. Field of the Invention

The present invention relates to a layout apparatus, a layout method, and a program product for laying out a document in accordance with registered information of a user.

2. Description of the Related Art

As the Internet is in widespread use, a variety of information providing services under the Internet environment is contemplated.

For example, Japanese Patent Laid-Open No. 2000-357068 (U.S. patent application Ser. No. 09/548,404 filed Apr. 12, 2000) discloses an apparatus that lays out and outputs data acquired in response to a designation by a user in an information providing service in a network environment.

In the disclosed apparatus, the user designates a code, called P code, unique to information. A service controller collects and lays out output data responsive to the P code, lays out the output data, generates and outputs print data so that a terminal having a printing device prints the print data.

The layout method performed by the service controller takes the following procedure.

The size of output data is determined with "priority placed on ease of seeing (at an original output size of the output data)" or with "priority placed on the number of pages (with the output data reduced in size)", and a sheet size is then determined based on a ratio of the output data size with all data finalized to an area for reserved advertisement.

The advertisement area is assured based on the advertisement ratio by taking into consideration a layout in each service or a predetermined layout. The output data is then arranged in a size with priority placed on the ease of seeing or with priority placed on the number of pages so that the output data may not intrude into the advertisement area. The advertisement area is finally determined to complete the layout process.

In a series of layout process steps, a user may designate a basic sheet size, an advertisement ratio, back page printing for advertisement, advertisement printing on a different sheet, and determination of whether to place priority on the ease of seeing or on the number of pages. Referencing these pieces of user information, the user lays out the document.

However, the information layout in accordance with the user information reflecting the above-mentioned user designation does not take into consideration a small size of the acquired output data. In the above system, an information provider may designate a character font point and permissible expansion ratio and contraction ratio to video data when the information provider registers output data.

Layout-processed printout provided to the user does not necessarily satisfy the user or the information provider.

If the original output data is a text, the text may be output in a predetermined small font size or in a further reduced font size. The resulting text data is hard to read.

This is because the user is forced to contract the data to lay out the data identified by the user if the amount of data is large.

The output layout setting designated by the user covers only a minimum number of items required for an actual physical layout, and is not a layout setting appropriate for the user for achieving a layout reflecting the user registered information that could not be directly related to layout. A system that prints layout-processed data is subject to a setting pre-registered in a printer or a default condition uniquely set in the system unless a user particularly designates print settings such as switching between color printing and monochrome printing, and setting a print density, the number of prints, and a sheet discharge method.

To satisfy these requirements, the user must perform complex setting. Providing print results in a print attribute appropriate for the user is difficult.

SUMMARY OF THE INVENTION

It is an object of the present invention to provide a data processing apparatus that presents a convenient data processing environment under which a print job is generated to result in an excellent printout customized for each user.

By referencing personal information registered by each user, the data processing apparatus customizes print attribute data that is attached to the print job to be output, and processes the print job in accordance with the personal information registered by the user even when no print setting is performed on the print job by the user.

The data processing apparatus of the present invention in a first aspect includes a layout unit for laying out data to be printed under a predetermined layout condition, a print job production unit for producing a print job that contains, as print attribute data, a layout result that is laid out by the layout unit, a sending unit for sending, to another data processing apparatus, the print job produced by the print job production unit, a storage unit for storing detailed personal information that contains data that is registered to be delivered and contains at least a data acquisition condition set from the other information processing apparatus, and other data, and a controller that controls the production of individual print attribute data to be attached to the print job based on user information of a destination of the print job and the detailed personal information.

A layout apparatus of the present invention in a second aspect includes an input unit for inputting user information, and a layout unit for laying out a document based on the user information input by the input unit.

A layout method of the present invention in a third aspect includes the steps of inputting user information, and laying out a document based on the user information input in the input step.

A computer readable program product of the present invention in a fourth aspect includes program code for performing the steps of inputting user information, and laying out a document based on the user information input in the input step.

Further objects, features and advantages of the present invention will become apparent from the following description of the preferred embodiments with reference to the attached drawings.

BRIEF DESCRIPTION OF THE DRAWINGS

FIG. 9 illustrates one example of a user interface in the data processing system of FIG. 1.

FIG. 10 illustrates another example of the user interface in the data processing system of FIG. 1.

FIG. 11 illustrates yet another example of the user interface in the data processing system of FIG. 1.

FIG. 12 illustrates still a further example of the user interface in the data processing system of FIG. 1.

FIG. 13 illustrates a further example of the user interface in the data processing system of FIG. 1.

FIG. 17 illustrates a user registration information managing table managed by an external memory of the data processing apparatus of FIG. 2.

FIG. 18 illustrates the structure of the data stored in the external memory of the information providing data source server of FIG. 1.

FIG. 19 is a flowchart illustrating a data processing procedure of the data processing system of the present invention.

FIG. 20 diagrammatically illustrates the database structure of output data produced in the external memory of the data processing apparatus of FIG. 2.

FIG. 21 diagrammatically illustrates the database structure of the output data produced in the external memory of the data processing apparatus of FIG. 2.

FIG. 29 illustrates the data structure of a user information table managed in the external memory of the data processing apparatus of FIG. 2.

FIG. 32 illustrates a user interface in the data processing system of FIG. 1.

FIG. 33 illustrates another user interface in the data processing apparatus of FIG. 1.

FIG. 36 illustrates a user registration information management table managed in an external memory of the data processing apparatus of FIG. 1.

FIG. 40 illustrates a user information table managed in the external memory of the data processing apparatus of FIG. 1.

FIG. 43 illustrates a user registration information management table managed in the external memory of the data processing apparatus of FIG. 1.

FIG. 45 illustrates a layout setting screen displayed on a cathode-ray tube (CRT) of the data processing apparatus of FIG. 1.

FIG. 48 illustrates a personal information input screen displayed on the CRT of the data processing apparatus of FIG. 1.

FIG. 49 illustrates a user registration information management table managed in the external memory of the data processing apparatus of FIG. 1.

FIG. 51 illustrates a personal information input screen displayed on the CRT of the data processing apparatus of FIG. 1.

FIG. 52 illustrates a user information table managed by the external memory of the data processing apparatus of FIG. 1.

FIG. 55 illustrates a user registration information management table managed in the external memory of the data processing apparatus of FIG. 1.

FIG. 57 illustrates a user registration information management table managed in the external memory of the data processing apparatus of FIG. 1.

FIG. 58 illustrates a personal information input screen displayed on a CRT of a host personal computer (PC) of FIG. 1.

FIG. 60 illustrates a user information table managed in the external memory of the data processing apparatus of FIG. 1.

FIG. 69 illustrates a user information table managed in the external memory of the data processing apparatus of FIG. 1.

DESCRIPTION OF THE PREFERRED EMBODIMENTS

First Embodiment

Figure 1:
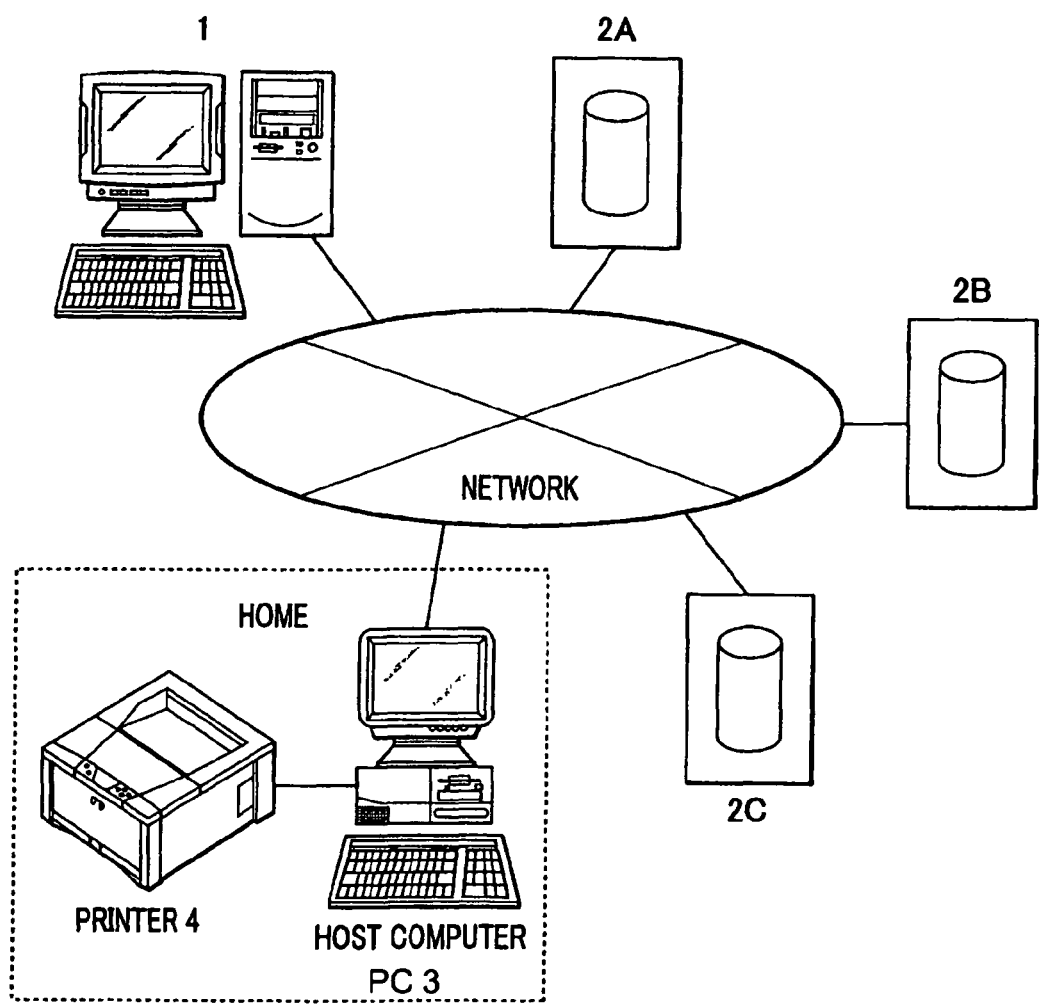
FIG. 1 illustrates an information providing service system incorporating a data processing apparatus of a first embodiment of the present invention.

FIG. 1 illustrates an information providing service system incorporating a data processing apparatus 1 of a first embodiment of the present invention. The data processing apparatus 1 collects a plurality of output data from data source servers 2A, 2B, and 2C in accordance with preregistered user information. The data processing apparatus 1 edits and lays out the output data for printing, and delivers the edited data to a host personal computer (hereinafter referred to as PC) 3 at a user's home to cause a printer 4 connected to the PC 3 to print the edited data.

As shown, the data processing apparatus 1 provides service, searches and collects output data from the data source servers 2A, 2B, and 2C in accordance with user registration information relating to a service contract. The data processing apparatus 1 references the user registration information to lay out the searched and collected output data for printing, edits and lays out the collected data, and delivers edited print data in a series of server process steps. The data source servers 2A, 2B, and 2C deliver information, and function as a server having a database with a predetermined data format or a web server, for example, used by a newspaper to send information via the Internet.

A home printing system enclosed broken-line box shown in FIG. 1 is a user's home system. The home printing system includes the PC 3 which is a general-purpose personal computer connected to the Internet through line in provider service or directly communicating with the data processing apparatus 1 through a modem, and the printer 4 that is connected to the PC 3 through a Centronix interface or a universal serial bus (USB) or through a home local-area network (LAN).

Figure 2:
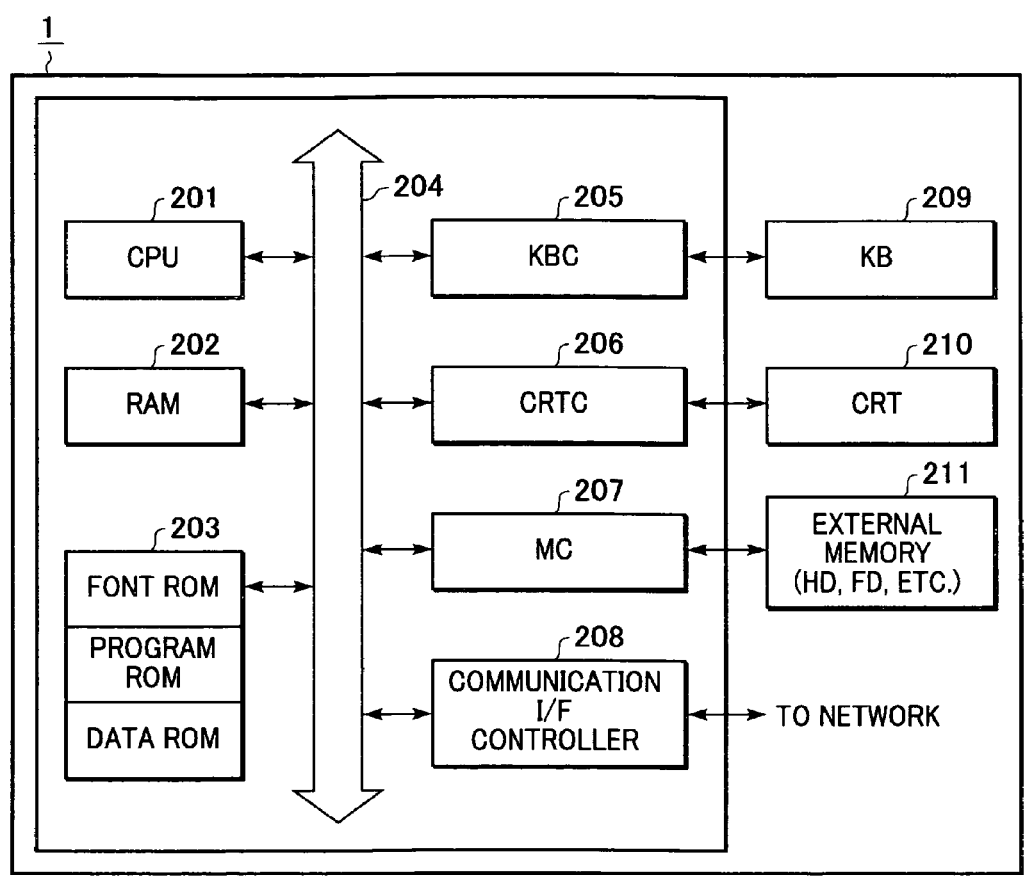
FIG. 2 is a block diagram illustrating a data processing apparatus in accordance with the first embodiment of the present invention.

FIG. 2 is a block diagram illustrating the data processing apparatus 1 of the first embodiment of the present invention shown in FIG. 1.

Referring to FIG. 2, a central processing unit (CPU) 201 searches and acquires output data by communicating with an external apparatus through a communication I/F controller 208 in accordance with a program in a program ROM of a ROM 203 (program to be discussed with flowcharts) or a program stored in a large-capacity external memory 211. The CPU 201 processes output data containing a mixture of drawings, images, text, tables, and manages a database (containing a user information table to be discussed with reference to FIG. 17) stored in the external memory 211.

The data processing apparatus 1 converts layout-processed output data into script data, such as page description language (PDL), hyper text markup language (HTML), extensible hyper text markup language (XHTML), extensible markup language (XML)+extensible stylesheet language (XSL), etc., and sends the data to the PC 3 of a user in accordance with an information output protocol or a communication protocol.

The data processing apparatus 1 decompresses compressed data or converts the script data into an image for editing if information from an external data source is compressed or above-mentioned script data.

The CPU 201 generally controls devices connected to a system bus 204. One of a program ROM area of the ROM 203 and the external memory 211 stores an operating system (OS), which is a control program of the CPU 201.

One of a font ROM area of the ROM 203 and the external memory 211 stores font data, which is used to process the output data. One of a data ROM area of the ROM 203 and the external memory 211 stores a variety of data used when the output data is processed. A RAM 202 serves as a main memory, a working memory area, etc. of the CPU 201.

A keyboard controller (KBC) 205 controls key inputs from a keyboard (KB) 209 and a pointing device (not shown). A cathode-ray tube (CRT) controller 206 controls a display function of a CRT display 210.

These elements are used by a user as necessary, and are not closely related to the present invention. An external memory controller (MC) 207 controls accesses to the external memory 211 such as a hard disk (HD) or floppy disk (FD). The external memory 211 stores a boot program, a variety of application programs, font data, user files, edit files, a printer control command generating program (hereinafter referred to as a printer driver), etc. The communication I/F controller 208 is linked to the host PC 3, and the data source servers 2A, 2B, and 2C as external apparatuses, and performs a communication and control process in network.

The CPU 201 rasterizes an outline font on a display information area in the RAM 202, thereby displaying information on the CRT 210. The CPU 201 receives a command from a user with a mouse and a cursor (not shown) displayed on a screen.

The data processing apparatus 1 stores a program for compressing and decompressing video data in the external memory 211. Using one of a variety of compression methods, the CPU 201 compresses the video data or decompresses a compressed file.

The data processing apparatus 1 also stores, in the external memory 211, a program for producing script data. Using the program, the CPU 201 edits and converts data collected from the data source servers 2A, 2B, and 2C into the script data. Here, the script data refers to data in the form of interpreter of the PDL or the like.

Figure 3:
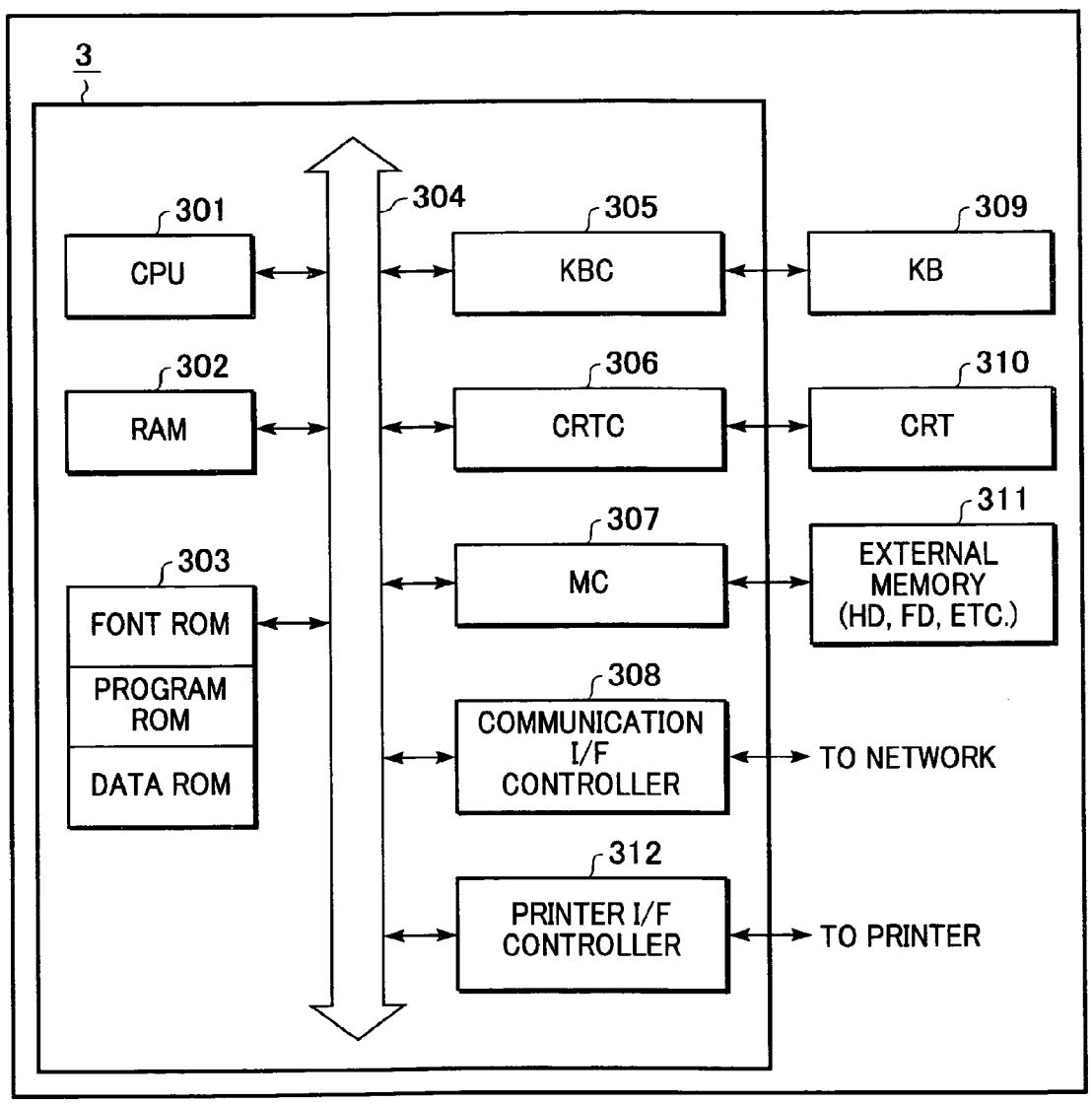
FIG. 3 is a block diagram illustrating the structure of a user personal computer of FIG. 1.

FIG. 3 is a block diagram illustrating the structure of the PC 3 of the user's home system illustrated in FIG. 1. The PC 3 is substantially identical to the data processing apparatus 1 in general hardware structure.

Referring to FIG. 3, a CPU 301 receives the output from the data processing apparatus 1, converts the output data into print data, and outputs the print data to a printer 4 owned by the user, under the control of a program (a program to be discussed with reference to a flow chart) in a program ROM area of a ROM 303 or a program stored in a large-capacity external memory 311.

The CPU 301 generally controls devices connected to a system bus 304.

One of the program ROM area of the ROM 303 and the external memory 311 stores an operating system (OS). One of a font ROM area of the ROM 303 and the external memory 311 stores font data that is used in the processing of the output data.

A data ROM area of the ROM 303 and the external memory 311 stores a variety of data for use in the processing of the output data. A RAM 302 serves as a main memory, a working area, etc. of the CPU 301.

A keyboard controller (KBC) 305 controls key inputs from a keyboard (KB) 309 and a pointing device (not shown). A cathode-ray tube (CRT) controller 306 controls a display function of a CRT display 310. These elements are used by a user as necessary, and are not closely related to the present invention.

An external memory controller (MC) 307 controls accesses to the external memory 311 such as a hard disk (HD) or floppy disk (FD). The external memory 311 stores a boot program, a variety of application programs, font data, user files, edit files, a printer control command generating program (hereinafter referred to as a printer driver), etc.

A communication I/F controller 308 is linked to the data processing apparatus 1 using a modem (not shown) and performs a communication and control process in network.

A printer interface controller 312 initiates and controls the printer driver stored in the external memory 311 to compress the output data received from the data processing apparatus 1 through the network or converts the output data into script data and outputs the resulting data to the printer 4. A printer interface used here is an interface for a home LAN network connection using TCP/IP, or a local interface such as Centronix or USB.

The CPU 301 rasterizes an outline font on a display information area in the RAM 302, thereby displaying information on the CRT 310. In response to a command the user inputs using a mouse and a cursor (not shown) on the CRT 310, the CPU 301 opens a variety of windows to process data of user registration, for example.

The PC 3 stores, in the external memory 311, a program for compressing and decompressing video. Using one of a variety of compression methods, the CPU 301 compresses the video data or decompresses a compressed file.

The PC 3 also stores, in the external memory 311, a program for producing and displaying script data. Using the program, the CPU 301 edits and converts data collected from the external apparatus such as the data processing apparatus 1 and data produced by an application program in the PC 3 into the script data. Here, the script data refers to data in the above-mentioned PDL data or the like.

Figure 4:
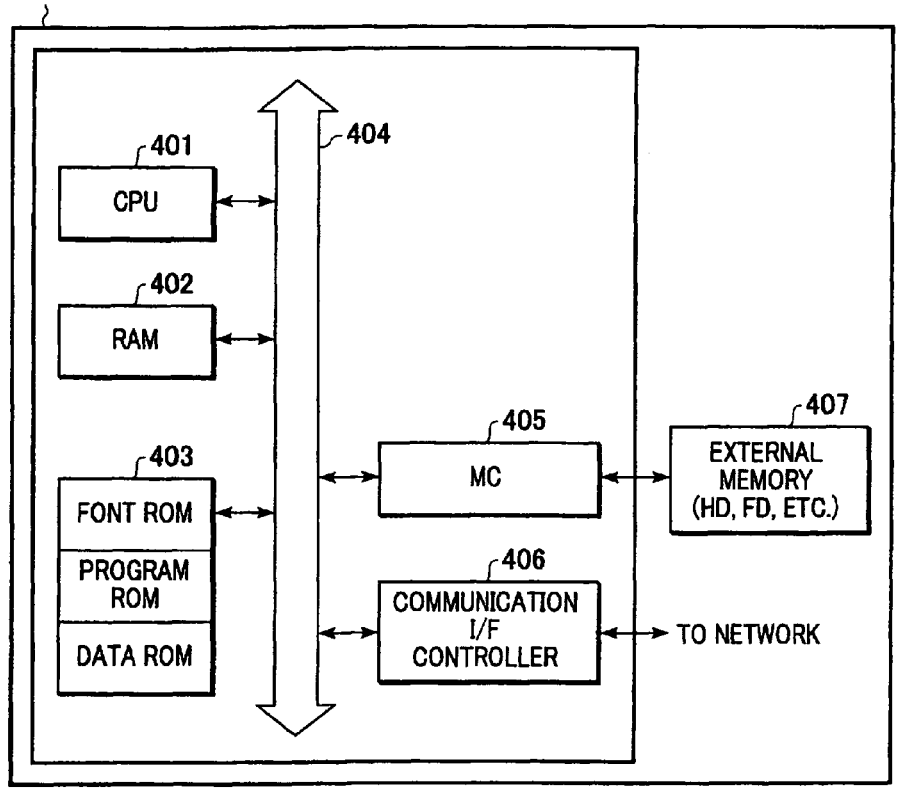
FIG. 4 illustrates the structure of a data source server of FIG. 1.

FIG. 4 illustrates the structure of the data source servers 2A, 2B, and 2C of FIG. 1. Each of the data source servers 2A, 2B, and 2C is substantially identical to the data processing apparatus 1 in general hardware structure.

Referring to FIG. 4, a CPU 401 controls the transmission of information through the network under the control of a program stored in one of a program ROM area of a ROM 403 and a large-capacity external memory 407.

The data source servers 2A, 2B, and 2C in the first embodiment send data from the external memory 407 in response to an access from the data processing apparatus 1.

The CPU 401 generally controls devices connected to the system bus 404. One of the program ROM area of the ROM 403 and the external memory 407 stores an operating system (OS), which is a control program of the CPU 401.

One of a font ROM area of the ROM 403 and the external memory 407 stores font data. A data ROM area of the ROM 403 or the external memory 407 stores a variety of data for use in the processing of the output data. A RAM 402 serves as a main memory, a working area, etc. of the CPU 401.

An external memory controller (MC) 405 controls accesses to the external memory 407 such as a hard disk (HD) or floppy disk (FD). The external memory 407 stores a boot program, a variety of application programs, font data, user files, edit files, a printer control command generating program (hereinafter referred to as a printer driver), etc. A communication I/F controller 406 is linked to the Internet through a network and performs a communication and control process to send information requested from the outside through a modem (not shown).

A keyboard and a CRT are connected to each of the data source server 2A, 2B, and 2C for a user to input information. Since the keyboard and the CRT are not closely related to the present invention, the discussion thereof is omitted here.

Figure 5:
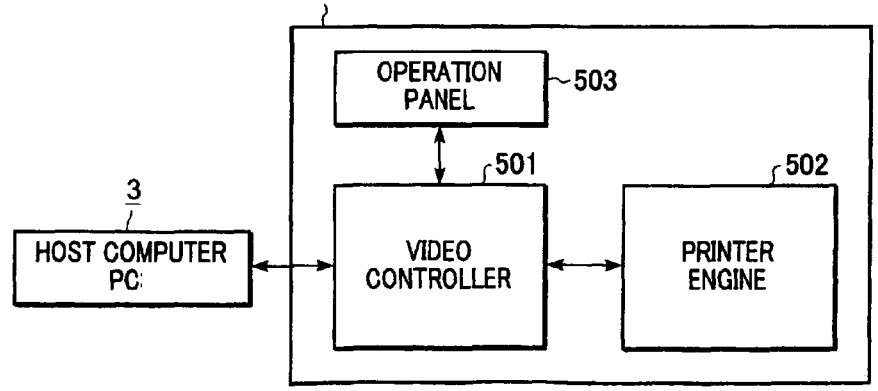
FIG. 5 diagrammatically illustrates the structure of a home printing system containing the host personal computer and printer of FIG. 1.

FIG. 5 illustrates a home printing system including the host PC 3 and the printer 4 of FIG. 1.

As shown in FIG. 5, the PC 3 functions as a source of video information and a controller of the printer 4. In the first embodiment, the printer 4 is not limited to a laser beam printer. The printer 4 may be an ink-jet printer or any other type of printer.

A video controller 501 produces raster data on a per page basis based on video information (such as image data or page description language) supplied from the PC 3, and outputs the video data to a printer engine 502.

The printer engine 502 produces a latent image on a photoconductive drum in response to the raster data supplied from the video controller 501, causes toner to adhere to the latent image on the drum, and transfers and fixes the toner image onto a recording medium (in an electrophotographic method). The image is thus recorded.

The operation panel 503 is used as a user interface. The user issues a command for a desired operation by operating the operation panel 503.

Figure 6:
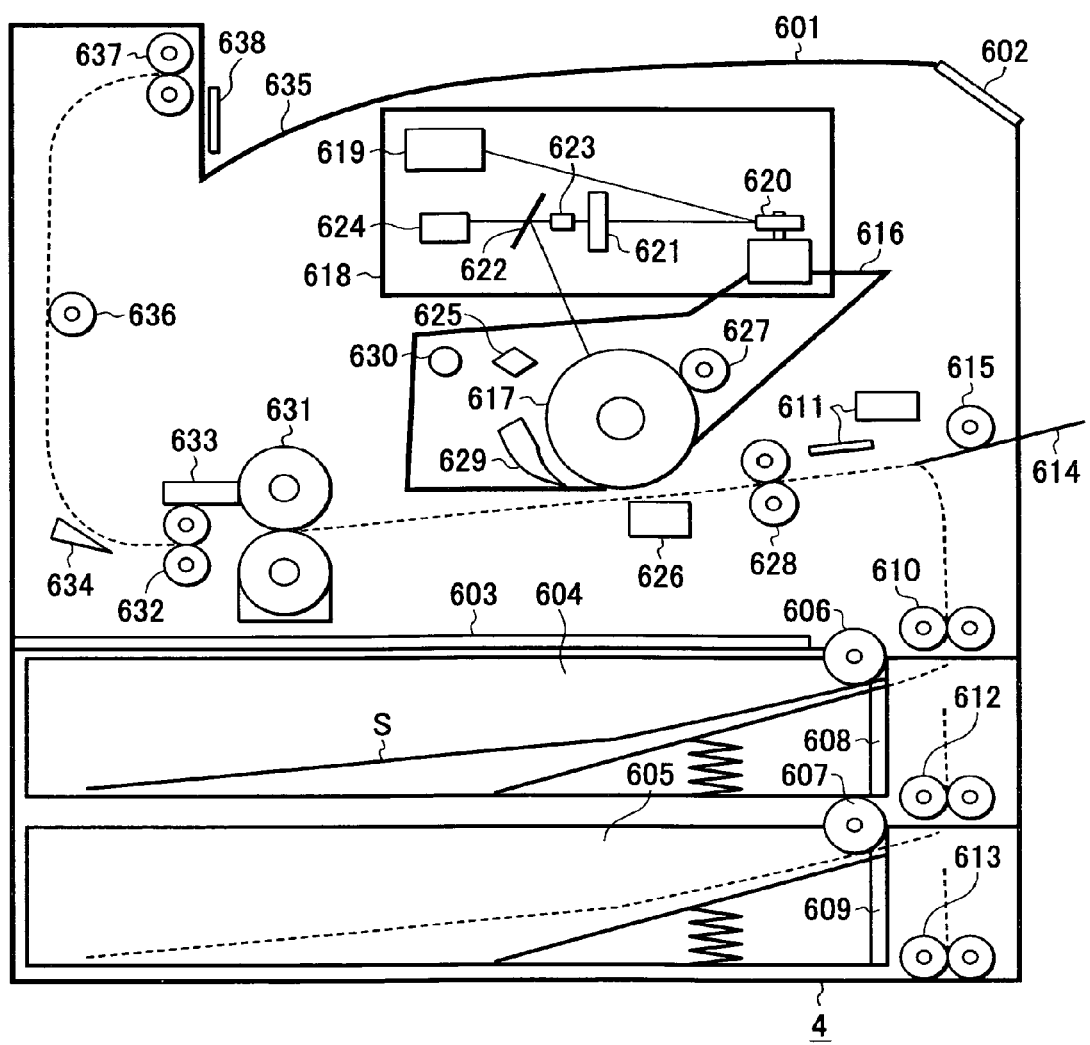
FIG. 6 is a cross-sectional view of a printer of FIG. 5.

FIG. 6 is a cross-sectional view of the printer 4 of FIG. 5. In the example shown in FIG. 6, the engine of the printer 4 is a laser beam printer engine. However, the printer is not so limited and can be any type of printer.

Referring to FIG. 6, an operation panel 602 on a printer casing 601 has switches that the user uses to input various commands, a light-emitting diode (LED) display or a liquid-crystal display (LCD) to display messages and a content of setting thereof. A board container 603 houses boards bearing electronic circuits of the video controller 501 and the printer engine 502.

Paper cassettes 604 and 605 hold sheets (recording media) S. Each of the paper cassettes 604 and 605 has a mechanism containing a partitioning plate (not shown) to electrically detect the size of each sheet. Cassette clutches 606 and 607 are respectively provided in the paper cassettes 604 and 605 to pick up the top sheet S of the sheet stack held in the paper cassettes 604 and 605, and to feed the picked sheet S. Paper sensors 608 and 609 respectively detect the quantities of sheets S held in the paper cassettes 604 and 605.

Paper feed rollers 610 convey the sheet S so that the leading edge of the sheet S reaches a timing shutter 611. Paper feed rollers 612 convey the sheet S so that the leading edge of the sheet S reaches the paper feed rollers 610. Optional paper feed rollers 613 (paper conveyance rollers) convey the sheet S supplied from an optional paper feed unit (not shown) into the printer 4. The timing shutter 611 suspends the supply of the sheet S by pressing it.

Also shown in FIG. 6 are a manual feed tray 614 and a manual feed clutch 615. The manual feed clutch 615 conveys the sheet S until the leading edge thereof reaches the timing shutter 611. For recording, the sheet S is supplied from one of the paper cassettes 604 and 605, and the manual feed tray 614 selected as paper feeder means.

The printer engine 502 shown in FIG. 5 communicates with the video controller 501 in accordance with a predetermined protocol, selects one from the paper cassettes 604 and 605, and the manual feed tray 614 in response to a command from the video controller 501, and conveys the sheet S to the timing shutter 611 from the paper feeder means selected in response to a print start command. The printer engine 502 includes the paper feeder means, an electrophotographic mechanism for generating a latent image, transferring and fixing a toner image, discharge means, and control means for controlling these elements.

An image recorder 616 includes a photoconductive drum 617 and a toner container, and produces a toner image on the sheet S in the electrophotographic process. A laser scanner 618 supplies the image recorder 616 with image information using a laser beam.

In the laser scanner 618, a laser unit 619 drives a semiconductor laser inside in response to a video signal (/VIDEO signal) sent from the video controller 501 to emit a laser beam. A polygon mirror 620 causes the laser beam emitted from the laser unit 619 to scan through a focusing lens group 621 and a reflective mirror 622, thereby forming a latent image on the photoconductive drum 617. A beam detector 623 detects the laser beam emitted from the laser unit 619, and outputs a main scan synchronization signal. A light quantity sensor 624 detects the quantity of laser beam emitted from the laser unit 619.

In the image recorder 616, the latent image that is formed on the photoconductive drum 617 with the laser scanner 618 charged by a primary charge unit 625 is converted into a toner image by a development unit 627. A transfer charge unit 626 transfers the toner image, developed by the development unit 627 on the photoconductive drum 617, to the sheet S supplied from timing rollers 628. A cleaner 629 removes toner residing on the photoconductive drum 617. A pre-exposure lamp 630 exposes the photoconductive drum 617 to light for discharging. A fixing unit 631 thermally fixes the toner image, formed by the image recorder 616, onto the sheet S.

Conveyance rollers 632 convey and discharge the sheet S. A discharge sensor 633 detects a discharge state of the sheet S. A discharge flapper 634 selects the direction of conveyance of the sheet S having the image recorded thereon toward one of a face-down discharge tray 635, a face-up discharge tray (not shown), and a discharge option unit (not shown). Discharge rollers 636 and 637 discharge the sheet S conveyed by the discharge flapper 634 to the face-down discharge tray 635.

A discharge paper stack amount sensor 638 detects the amount of discharge paper sheets stacked in the face-down discharge tray 635.

The printer 4 may also accommodate the option cassette or an optional unit such as an envelope feeder.

Figure 7:
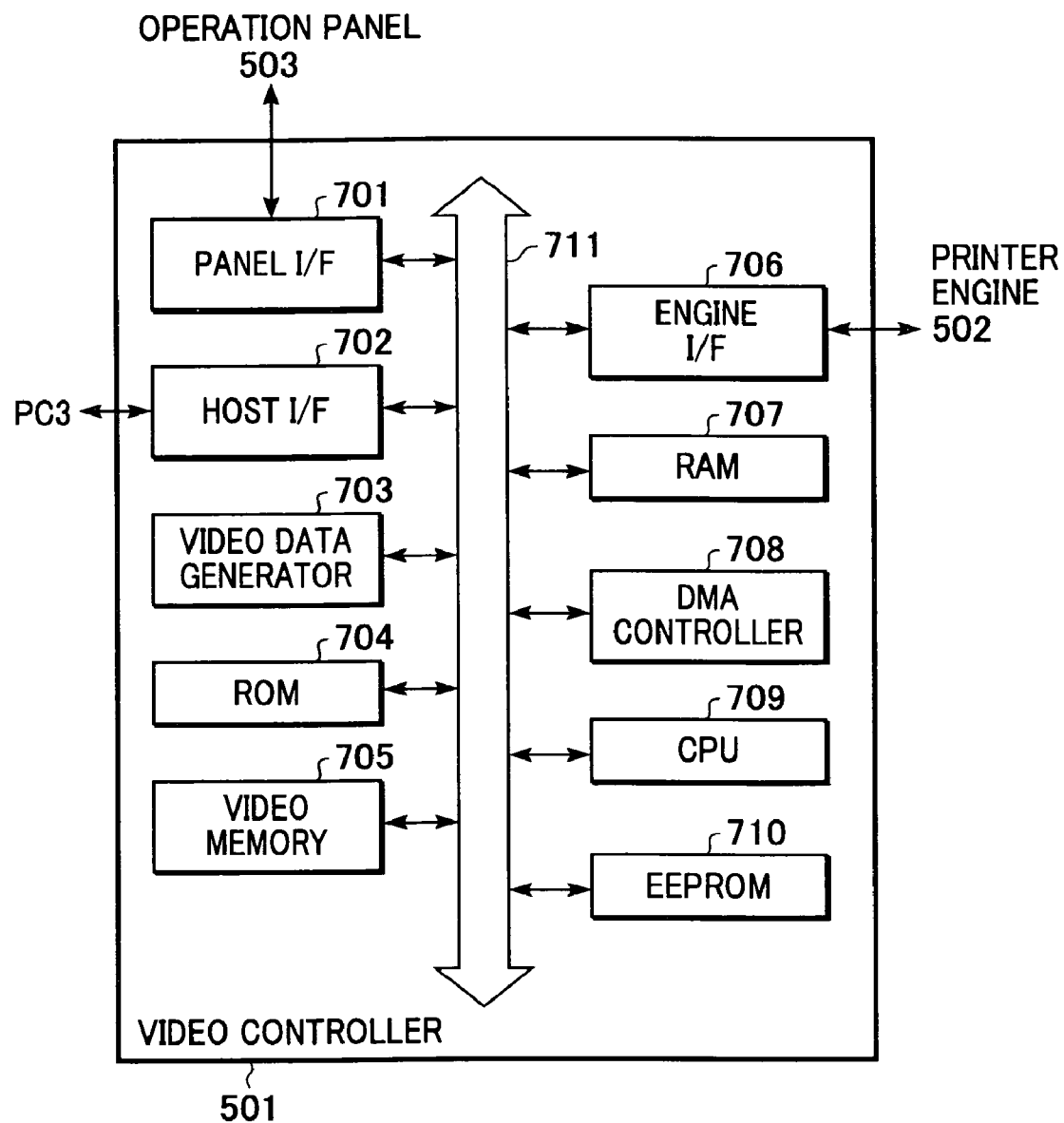
FIG. 7 is a block diagram illustrating an engine controller of FIG. 5.

FIG. 7 is a block diagram illustrating the structure of the video controller 501 of FIG. 5.

As shown, a panel interface 701 communicates data with the operation panel 503. Through the panel interface 701, a CPU 709 recognizes the content of settings and commands that the user enters on the operation panel 503. A host interface 702 establishes a two-way communication link with the host PC 3 such as a host computer through the network.

An engine interface 706 performs communications with the printer engine 502. The CPU 709 controls signals through the engine interface 706, thereby recognizing the status of signals, thus, the status of the printer engine 502.

A video data generator 703 generates bit-map data to be supplied to the printer engine 502, based on the video information supplied from the PC 3. A video memory 705 temporarily stores the generated bit-map data.

The CPU 709 controls devices connected to a CPU bus 711 based on a control program code stored in an ROM 704.

A RAM 707 serves as a memory that the CPU 709 temporarily uses. An EEPROM 710 is a non-volatile memory, and stores control information such as a density correction table. A DMA controller 708 transfers the bit-map data in the video memory 705 to the engine interface 706 in response to a command from the CPU 709.

A CPU bus 711 includes an address bus, a data bus, and a control bus. The panel interface 701, the host interface 702, the video data generator 703, the ROM 704, the video memory 705, the engine interface 706, the RAM 707, the DMA controller 708, the CPU 709, and the EEPROM 710 are respectively accessible to any of the devices connected to the CPU bus 711.

Figure 8:
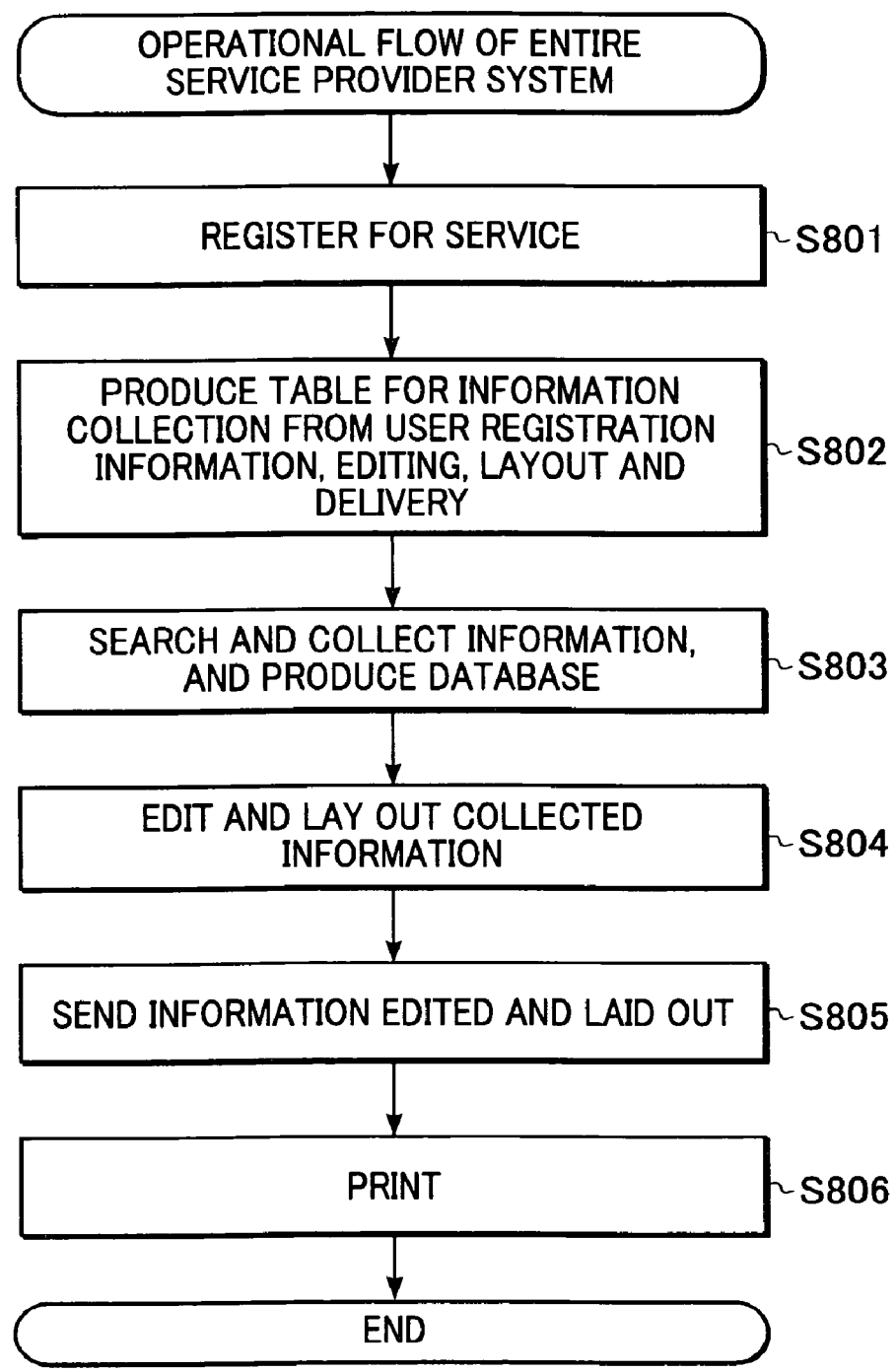
FIG. 8 is a flowchart illustrating a data processing procedure in a data processing system in accordance with the present invention.

FIG. 8 is a flowchart illustrating a data processing procedure of the data processing system in accordance with the present invention. The flowchart of FIG. 8 corresponds to the general procedure of the service providing operation of the system. S801 through S806 represent respectively steps.

The user performs user registration to receive service from the system (step S801). Using a web browser on the PC 3, the user accesses a web server of the service providing data processing apparatus 1 through an HTTP protocol, completes a contract with the data processing apparatus 1, and inputs a search condition for desired information and personal information for registration.

The data processing apparatus 1 collects information for each user according to the user registration information registered in step S801, edits and lays out the collected information, and generates a user personal information table to be delivered (step S802).

Based on the user information table, the data processing apparatus 1 searches for and collects required information directly from a server of an information provider present on the network or in a database of the output data already produced in an external memory within the data processing apparatus 1 itself (step S803).

The data processing apparatus 1 edits and lays out the output data that is searched for and collected in step S803 based on the user information table produced in step S802 (step S804).

Upon completing the layout of the output data in step S804, the data processing apparatus 1 sends the layout data to a contract user in accordance with delivery time stored in the user information table (step S805).

The PC 3 of the user receives the layout data, and issues a print command for a print job to the printer 4, thereby causing the printer 4 to print the layout data (step S806).

FIGS. 9 through 13 illustrate user interfaces of the data processing apparatus 1 of FIG. 1, and are various registration screens which are displayed on the CRT 310 of the PC 3. To receive service, the user inputs registration information on the registration screens.

Through the PC 3 at home, the user accesses the data processing apparatus 1 through the network, and inputs information required for registration on the screens illustrated in FIGS. 9 through 13.

The user enters his name and contact address on the registration screen shown in FIG. 9. On the screen (password setting screen for a new registrant) shown in FIG. 10, the user enters a password required to modify the content of user registration subsequent to the completion of the contract. In the case of a new registration, the user sets a password. To modify the content of contract later, the user must enter the password that is set at the new registration. A password modification screen is not closely related to the present invention, and the discussion thereof is omitted here.

The user enters the content of contract on the registration screen (contract content screen) shown in FIG. 11. Since it is difficult to lay out a great deal of information on a limited space on a sheet, the user may prioritize beforehand the contract content according to category.

As shown in FIG. 11, the contract content contains a contract period and contract conditions. The user may select one from a package contract, a contract by category, and a contract by keyword information collection in the contract conditions. The user may select a combination of these contracts. In the package contract, the user may select domestic society, domestic politics, and domestic sports in one package, for example. Furthermore, the user may collect a variety of information by combining the package contract and the keyword contract, for example.

FIG. 12 illustrates a registration screen (personal information input screen) on which the user may register personal information. Information individually input affects the editing and layout of the output data.

FIG. 13 illustrates an input screen (layout setting screen) on which information required to lay out the output data for delivery is input.

The user enters information required to edit and lay out the output data that the data processing apparatus 1 has searched for and collected. As shown in FIG. 13, for example, the user may set the size of sheets, the alignment of the sheets, both side printing, color printing, the number of layout prints, etc. If the user sets a greater number of layout prints, more detailed information may be acquired, but information providing service fee also becomes higher.

If the user completes entering all these data, a basic fee is calculated and shown. The calculation of the fee is not closely related to the present invention, and is not discussed here.

Figure 14:
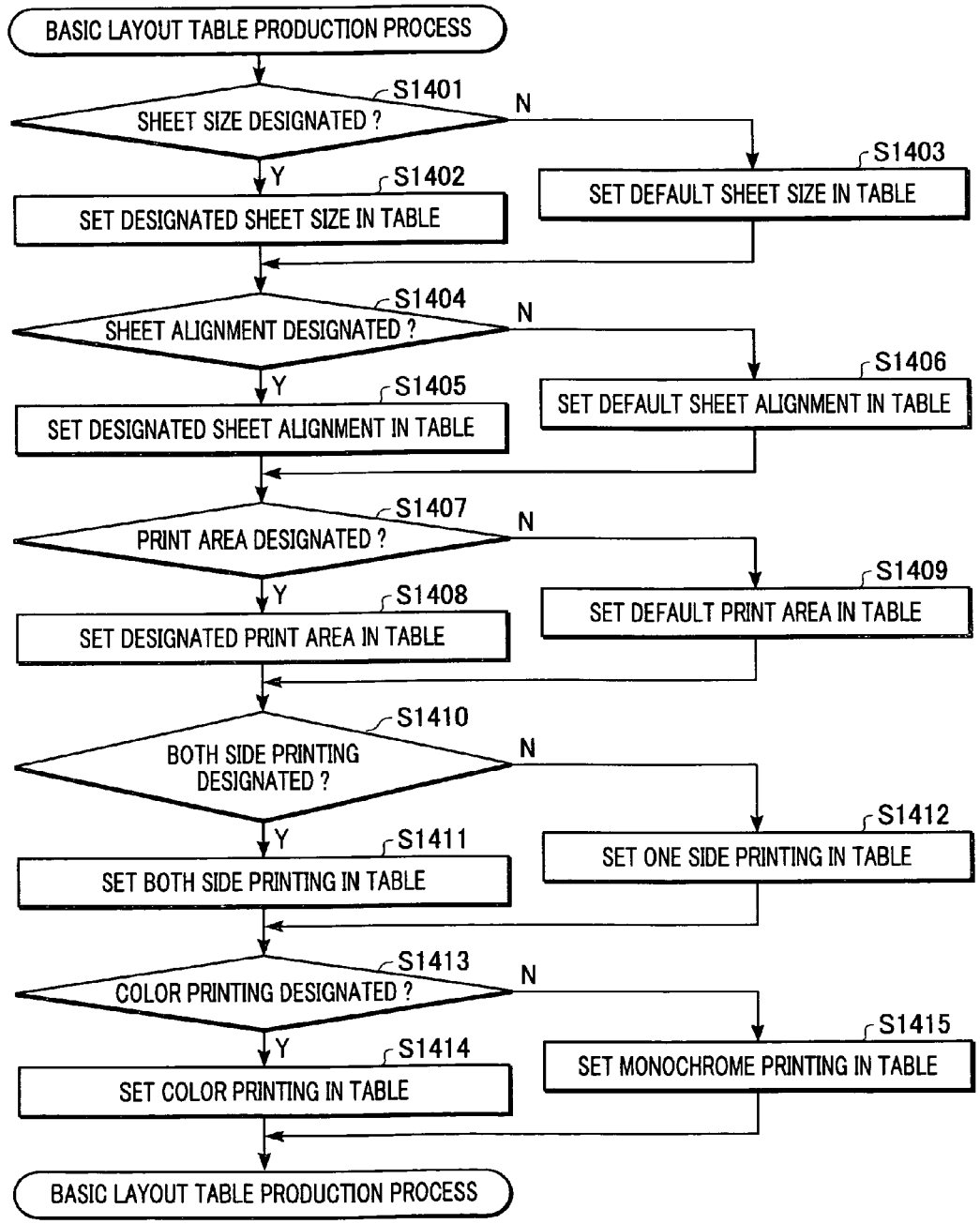
FIG. 14 is a flowchart illustrating a data processing procedure of the data processing apparatus of the present invention.

FIG. 14 is a flowchart illustrating a data processing procedure of the data processing apparatus 1 of the present invention. In the data processing procedure including steps S1401-S1415, a layout table is produced subsequent to the input of the user data.

In this procedure, a table of basic items required to lay out the collected output data is produced during the user registration. The workload on the data processing apparatus 1 may increase if this procedure is performed when the data is collected and delivered. Once the table is generated by performing this procedure beforehand, it may be repeatedly used as long as layout conditions remain unchanged.

In step S1401, the data processing apparatus 1 determines whether any sheet size is designated in the layout setting screen shown in FIG. 13. If it is determined that a sheet size is designated, the designated sheet size is set in a table (step S1402), and the algorithm proceeds to step S1404. If it is determined that a sheet size is not designated, a default sheet size is set in the table (S1403) and processing proceeds to step S1404.

In step S1404, the data processing apparatus 1 determines whether any sheet alignment is designated in the layout setting screen shown in FIG. 13. If it is determined that sheet alignment is designated, the designated sheet alignment is set in the table (step S1405), and the algorithm proceeds to step S1407.

If it is determined in step S1404 that no sheet alignment is designated, a default sheet alignment is set in the table (step S1406), and the algorithm proceeds to step S1407. In this way, the setting of the sheet alignment is complete.

Figure 15:
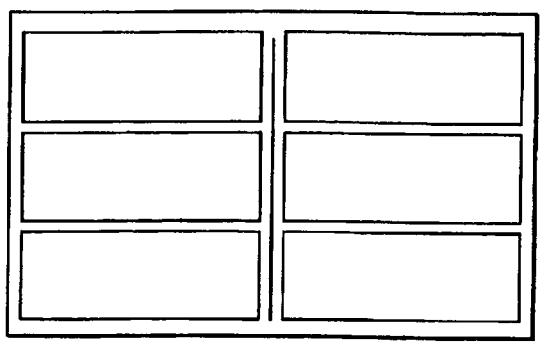
FIG. 15 illustrates a basic layout designated by the user in the data processing apparatus of the present invention.

When the sheet alignment is set in this way, a basic layout of three columns is set on each of facing pages as shown in FIG. 15, for example.

FIG. 15 illustrates an example of a basic layout designated by the user in the data processing apparatus 1 of the present invention. Each of the rectangular outlines in FIG. 15 is one column, and six print areas are shown. Line feed frequently takes place in each column of the layout frame if a default font size is large. Depending on the default font size, the layout frame may have two column rather than three column. The user may be allowed to select the number of columns at the time of contract.

In step S1407, it is determined whether the print area is designated in the layout setting screen of FIG. 13. If it is determined in step S1407 that the print area is designated, the designated print area is set in the table (step S1408), and the algorithm proceeds to step S1410. If it is determined in step S1407 that no print area is designated, a default print area is set in the table (step S1409), and the algorithm proceeds to step S1410. The setting of the print area is thus completed.

In step S1410, it is determined whether both side printing is designated. If it is determined in step S1410 that both side printing is designated, both side printing is set in the table (step S1411), and the algorithm proceeds to step S1413.

If it is determined in step S1410 that both side printing is not designated, one side printing is set in the table (step S1412), and the algorithm proceeds to step S1413. The setting of both side printing or one side printing is thus complete.

In step S1413, it is determined whether color printing is designated on the layout setting screen of FIG. 13. If it is determined in step S1413 that color printing is designated, the color printing is set in the table (step S1414), and the process is complete.

If it is determined in step S1413 that no color printing is designated, monochrome printing is set in the table (step S1415). The color printing is thus complete.

Depending on whether the color printing is set, the data processing apparatus 1 determines whether the data produced therewithin is color data. Here, character font size, line spacing, and character spacing are set to default values.

Figure 16:
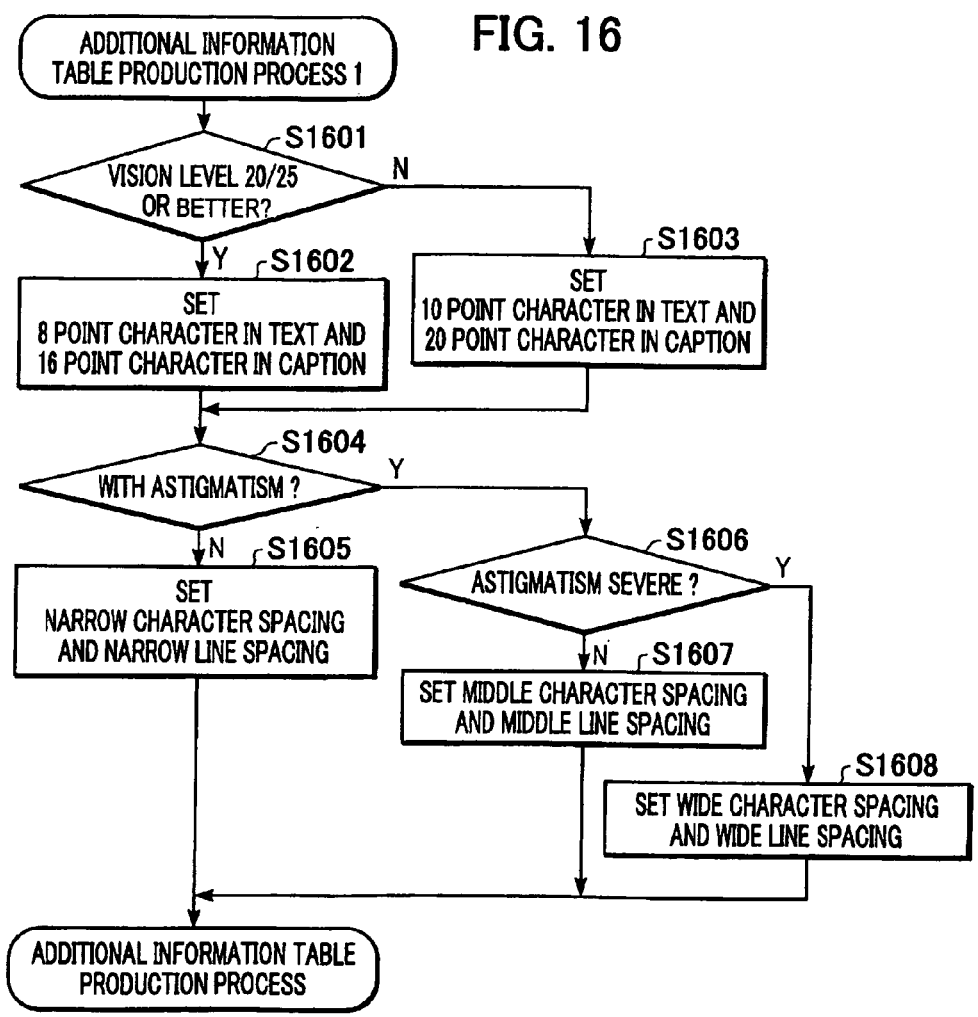
FIG. 16 is a flowchart illustrating a data processing procedure of the data processing apparatus of the present invention.

FIG. 16 is a flowchart illustrating a data processing procedure of the data processing apparatus 1 of the present invention. In the data processing procedure containing step S1601-S1608, additional layout information is generated based on the user registration information other than registration information required for layout.

To deliver a great deal of information, the output data must be laid out with narrow line spacing and narrow character spacing using a font as small as possible. However, if the same layout condition is applied to all users, some users may like it but others may not.

User information, not closely related to the layout information, may be included as parameters of the layout information. The data processing apparatus 1 thus inserts output data as much as possible in a layout satisfying the preference of each user.

For example, "vision information (vision level, and degree of astigmatism)" of the user information settable on the personal information input screen of FIG. 12 is now discussed.

In step S1601, vision information is extracted. If a user has a vision level of 20/25 or better on each of his two eyes, the character font of the text may be set to be 8 points, and the caption character font may be set to be 16 points (step S1602). If the user has a vision level worse than 20/25, the text character font may be set to be 10 points, and the caption character font may be set to be 20 points (step S1603).

In step S1604, it is determined whether or not the user suffers from astigmatism. If it is determined that the user is free from astigmatism, the character spacing and the line spacing are set to be small values (step S1605). The process is complete.

If it is determined in step S1604 that the user suffers from astigmatism, the degree of astigmatism (three levels in this embodiment) settable on the personal information input screen of FIG. 12 is determined (step S1606). If the degree of astigmatism is light, the character spacing and the line spacing are set to be middle values (step S1607). If the degree of astigmatism is severe, the character spacing and the line spacing are set to be large values (step S1608). The user who suffers from astigmatism is unable to sharply focus his vision on the video and sees the video in a blurred state. This setting is intended to help the user to distinguish between one character and another. If no vision information is input, default values (of a person who has a vision level of 20/20 and free from astigmatism) are set.

The data processing apparatus 1 generates the layout basic table and the additional layout table, and then lays out the searched and collected output data referencing these tables.

FIG. 17 illustrates a user registration information management table (user information table) managed in the external memory 211 of the data processing apparatus 1.

With a minimum amount of data, required for the layout, set by the user, or with the registration information, even if not closely related to the layout, set by the user, the information set may be utilized for layout. The resulting layout becomes more appropriate for each user.

It is also possible to cause each user to enter this setting beforehand. However, if the user performs a detailed setting such as setting for the character font, the line spacing, and the character spacing, the output results may look different depending on the resolution of the CRT of the PC 3. This setting is preferably left to the responsibility of the system rather than the responsibility of the user.

FIG. 18 illustrates the structure of data stored in the external memory 407 of each of the information providing data source servers 2A, 2B, and 2C of FIG. 1.

In the first embodiment, the data structure provided by the data source servers 2A, 2B, and 2C is standardized. Each data is divided into "update time", "caption (text data)", "summary text (text data)", "detail text (text data)", and "photograph (video data)". The output data, which is sorted according to category, is stored. The summary text refers to a summary of the output data and is smaller in word count than the detail text of the same output data.

As shown in FIG. 18, a series of period marks " . . . " does not mean any missing portion of the text but means an abbreviated portion of the text.

The data processing apparatus 1 communicates with each of the data source servers 2A, 2B, and 2C through the network using a lower layer communication protocol and a higher layer command (at least higher than a session layer). Under the control of the program and data in the ROM 203 and the external memory 211, the data processing apparatus 1 controls the communication I/F controller 208, thereby sending and receiving the commands. The data processing apparatus 1 sends, to the data source servers 2A, 2B, and 2C, the command that contains data (such as a keyword, and a category of the output data) for searching. Under the control of the program in the ROM 403 or the external memory 407, each of the data source servers 2A, 2B, and 2C receives the data for the searching, and extracts data satisfying the search condition from among the data stored in the external memory 407, and sends the extracted data to the data processing apparatus 1. The data processing apparatus 1 stores the output data received from the data source servers 2A, 2B, and 2C in the external memory 211 of own terminal.

FIG. 19 is a flowchart illustrating the data processing procedure of the data processing system of the present invention. The data processing apparatus 1 generates an output database in the external memory 211 of its own terminal. Steps S1901, S1902, and S1906-S1909 are performed by the data processing apparatus 1, while steps S1903-S1905 are performed by one of the data source servers 2A, 2B, and 2C.

To deliver data at delivery time requested by a user, the data processing apparatus 1 starts the data processing procedure taking into consideration information acquisition time determined from past data concerning communication traffic in a delivery time slot, and time required for a layout process to be discussed later, and a delivery process.

The data processing apparatus 1 acquires contract content information from the user information table managed in the external memory 211 (step S1901). The data processing apparatus 1 recognizes the category from which information needs to be acquired, a keyword group, and a condition required to acquire information about the update time of the desired information. For example, under the condition selected in FIG. 11, the categories for the desired data are "domestic society", "domestic politics", "domestic sports", "local area information", "domestic economy", and "world general" in the order from high to low priority. Other conditions the output data must satisfy are "everyday", "once a day", and "6:00" as delivery information, and update time 6:00 yesterday as of now.

The conditions for acquiring the output data determined in step S1901 are sent to the data source servers 2A, 2B, and 2C (step S1902). Each of the data source servers 2A, 2B, and 2C receives the condition for acquiring information (step S1903), and searches for output data satisfying the condition (step S1904). Each of the data source servers 2A, 2B, and 2C sends the data found in the search to the data processing apparatus 1 (step S1905).

The data processing apparatus 1 receives the output data from each of the data source servers 2A, 2B, and 2C (step S1906), and examines the output data.

The data processing apparatus 1 picks up a frequently occurring keyword from the output data received, and determines the output data having a similar content. An output data group containing a larger number of output data determined as being similar is prioritized as a top priority group (step S1907). If a plurality of groups has the same number of data, any group having more data updated at latest update time is prioritized as a higher priority group.

In step S1908, the data processing apparatus 1 prioritizes the output data within each output data group. For example, output data containing the largest number of the keywords used in the similarity determination may be set to have a higher priority within the same group.

In the summary section, the output data containing the large number of the keywords used in the similarity determination is set to be higher in priority, or within the similar output data group, the output data updated at the latest update time is set to be higher in priority. Using these criteria, the output data groups are prioritized on a per category basis, and the output data is prioritized within each output data group. The prioritized groups and data are then organized in a database (step S1909), and the process is complete.

FIGS. 20 and 21 diagrammatically illustrate the structure of the database of the output data produced in the external memory 211 of the data processing apparatus 1 of FIG. 2. The present invention is not limited to this arrangement. Alternatively, the data processing apparatus 1 may store attribute information (such as a determined priority and a data source server name) of the data, and actual data may be stored and managed in each of the data source servers 2A, 2B, and 2C.

In FIGS. 20 and 21 as in FIG. 18, a series of period marks "..." does not mean any missing portion of the text but means an abbreviated portion of the text.

Figure 22:
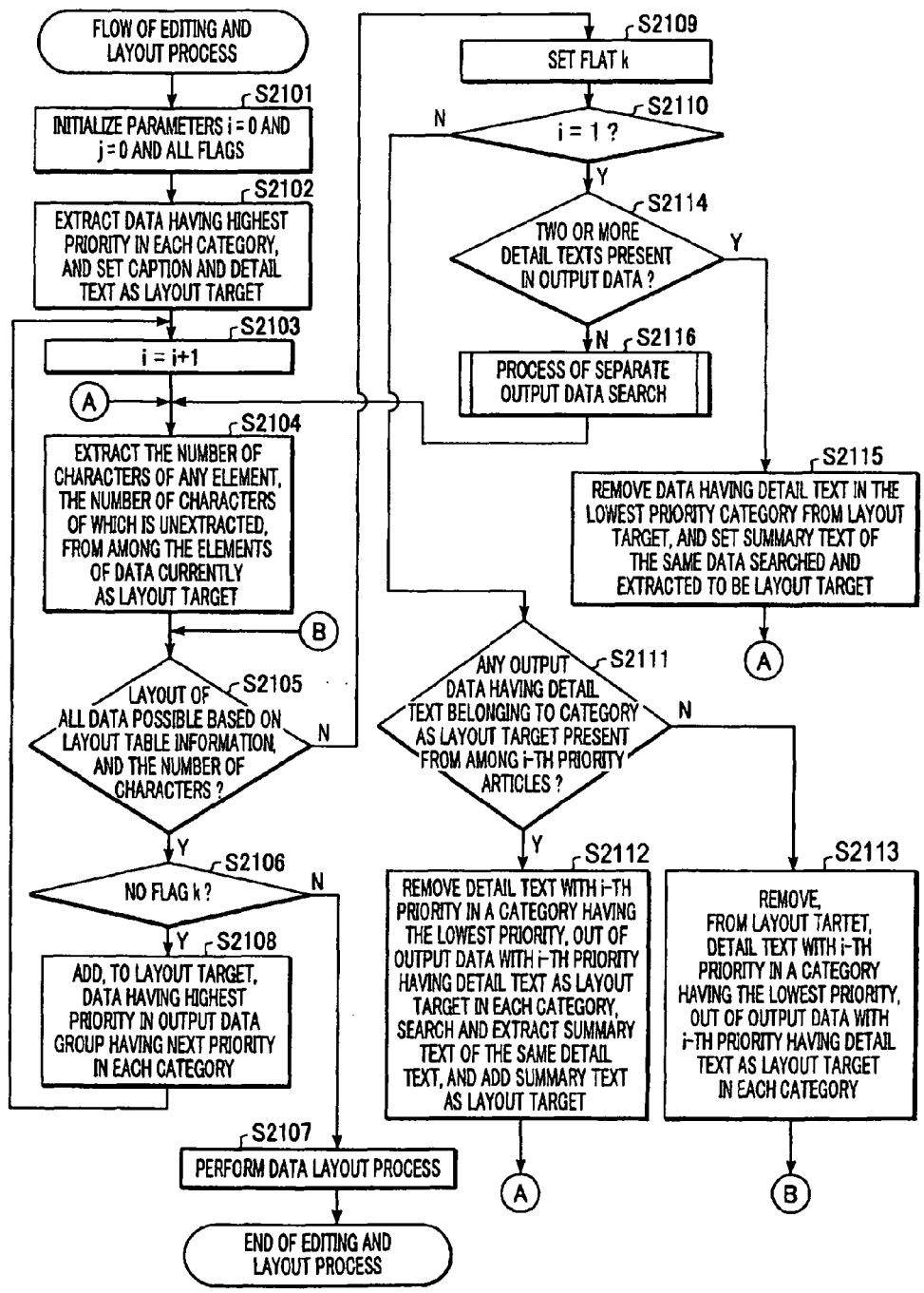
FIG. 22 is a flowchart illustrating a data processing procedure of the data processing apparatus of the present invention.

FIG. 22 is a flowchart of a data processing procedure of the data processing apparatus 1. In the data processing procedure containing steps S2101-S2116, the data processing apparatus 1 of FIG. 2 lays out the acquired information.

The output data as a layout target to be delivered must satisfy the following criteria 1) through 5).

1) A category or a keyword group having the highest priority must contain detail output data (detail text element in the first embodiment).

2) The output data in each category must be laid out in a format of "caption+detail text" or "caption+summary text".

3) The number of categories to be laid out must be increased to be as many as possible rather than loading a great deal of data in a single category.

4) In the highest priority category, output data having a priority as high as possible must be laid out.

5) If the output data of the highest priority category becomes relatively low priority data for convenience of layout, the output data of another category is heightened.

The data processing apparatus 1 lays out delivery data in accordance with the layout condition based on the output data searched and collected from the data source servers 2A, 2B, and 2C, taking into consideration the above-mentioned criteria for the output data and the user information table.

Referring to FIG. 22, a parameter "i" indicating the priority, a parameter "j" managing the category number, and a flag "k" indicating whether the corresponding data has been determined as being impossible to lay out are initialized (step S2101). Output data having the highest priority is extracted in each category or a keyword group (hereinafter collectively referred to as category), and a caption and a detail text of each output data are set as a layout target (step S2102). To identify the priority of the output data as the layout target, the parameter "i" is set to be (i+1) (step S2103). Here, the parameter first becomes i=1.

In step S2104, the data processing apparatus 1 extracts, in each output data currently as a layout target, the number of characters of one element with the number thereof unextracted, from among a caption element, and one of a summary text element and a detail text element of the output data.

In step S2105, the data processing apparatus 1 references a basic layout frame structure, print area, character font size (of a caption and text), line spacing, and character spacing in the information of the layout basic table and the additional layout information table. The data processing apparatus 1 determines whether all layout elements of the output data as a current layout target can be laid out, from the number of characters of the caption and the number of characters of the text extracted in step S2104, and the print area, the character font size, the line spacing and the character spacing determined from the basic layout. To actually arrange characters, data of each font, such as the size of a bounding box and a virtual body from font type to font type, is referenced, and the number of characters of a particular font type of a given point is thus determined. If the data processing apparatus 1 determines in step S2105 that layout is possible, the data processing apparatus 1 then determines in step S2106 whether or not a flag "k" is present. The flag "k" is used to determine whether layout impossible has already been determined in step S2105. Once layout impossible has already been determined, the flag "k" is set in bit. Since layout impossible has already been determined, a process of increasing data to be laid out is performed in step S2108. A layout process is performed on data that remains at this point of time (step S2107), and edit and layout process is thus complete.

If it is determined in step S2106 that no flag is present, all data as current layout elements can be laid out, and there is a possibility that further information may be laid out. In this case, the highest priority data of an output data group having a priority next to the output data as the current layout target is set as a layout target on a per category basis. In step S2108, the caption and the detail text of that output data are added as a layout target and the algorithm loops to step S2103.

In the determination of step S2105 of whether or not to lay out, the data processing apparatus 1 calculates all data areas of all data accounting for the area that is determined by the font information, the number of characters of the "caption", the caption font size, the character spacing, and the line spacing of the output data as the layout target, the area that is determined from the number of characters, the text font size, the character spacing, and the line spacing of the "detail (summary) text", and other data as to not allowing the caption to be continued by the text body thereof, and a blank area of each line feed. By comparing all data areas calculated here with a printable area, the data processing apparatus 1 performs the determination of whether layout is possible.

If it is determined in step S2105 that layout is impossible, the flag "k" indicating that layout impossible is determined is set in step S2109, and the algorithm proceeds to step S2110. In step S2110, the data processing apparatus 1 determines the priority level of the out data currently being subjected to the layout process. The parameter i=1 means that no output data is yet layout possible, and that the output data as the current layout target is only data in a data group having the highest priority level in each category. The parameter i≠1 (i?2) means that the output data as the current layout target contains data in a data group having a priority level of 2 or lower in each category. In other words, at least one such output data that is possible to lay out is present in each category.

In the case of the parameter i≠1 (i?2) in step S2110, the data processing apparatus 1 determines in step S2111 whether the output data having an i-th priority contains a detail text element as a layout target in a category. If it is determined in step S2111 that the output data having the detail text element as a layout target is present, the algorithm proceeds to step S2112. In step S2112, the data processing apparatus 1 removes, from the layout target, a detail text element having the i-th priority in the category having the lowest priority level from among the output data having the i-th priority having the detail text element as a layout target, searches for and extracts the summary text element of the same output data, and adds the summary text element of the same output data as the layout target. The algorithm loops to step S2104. In step S2104, the number of characters of the summary text element newly added is detected.

If there is in step S2111 no category in which the detail text element is treated as the layout target, processing proceeds to step S213 and the data processing apparatus 1 removes, from the layout target, the output data (containing the caption and the summary text) of the category having the lowest priority from among the categories having the output data with the i-th priority, and loops to step S2105. Here, the number of characters removed from the layout target is managed and is then subtracted from the total number of characters in the determination in step S2105.

In the case of the parameter i=1 in step S2110, there is no output data that can be laid out. The output data having the highest priority is not available for layout in each category. In step S2114, the data processing apparatus 1 determines whether at least two detail text elements of the output data as the layout target are present. Since the output data criteria specify that the detail text element be laid out in a category of the highest priority, at least one detail text element must remain. If two or more categories with the detail text elements thereof treated as the layout target are available, the data processing apparatus 1 removes, from the layout target, the detail text element of the output data in the lowest priority category from among the categories of the output data with the detail text element falling within the layout target in step S2115, searches for and extracts the summary text of the same data, and loops to step S2104.

If the number of detail text elements of the output data as the layout target is only one in step S2114, the algorithm proceeds to step S2116. The data processing apparatus 1 extracts another output data. In this operation, the data processing apparatus 1 leaves the "caption"+"detail text" of the highest priority output data in the highest priority category, while converting a detail text in another category into a summary text. This operation makes room for more layout.

If the detail text of the output data in each category cannot be arranged, the summary text having a smaller layout size is substituted for the detail text to allow room for layout.

The summary text corresponding to the same content is substituted for the detail text. Furthermore, completely different output data may be newly set as the layout target.

A separate output data search process in step S2116 will now be discussed.

Figure 23:
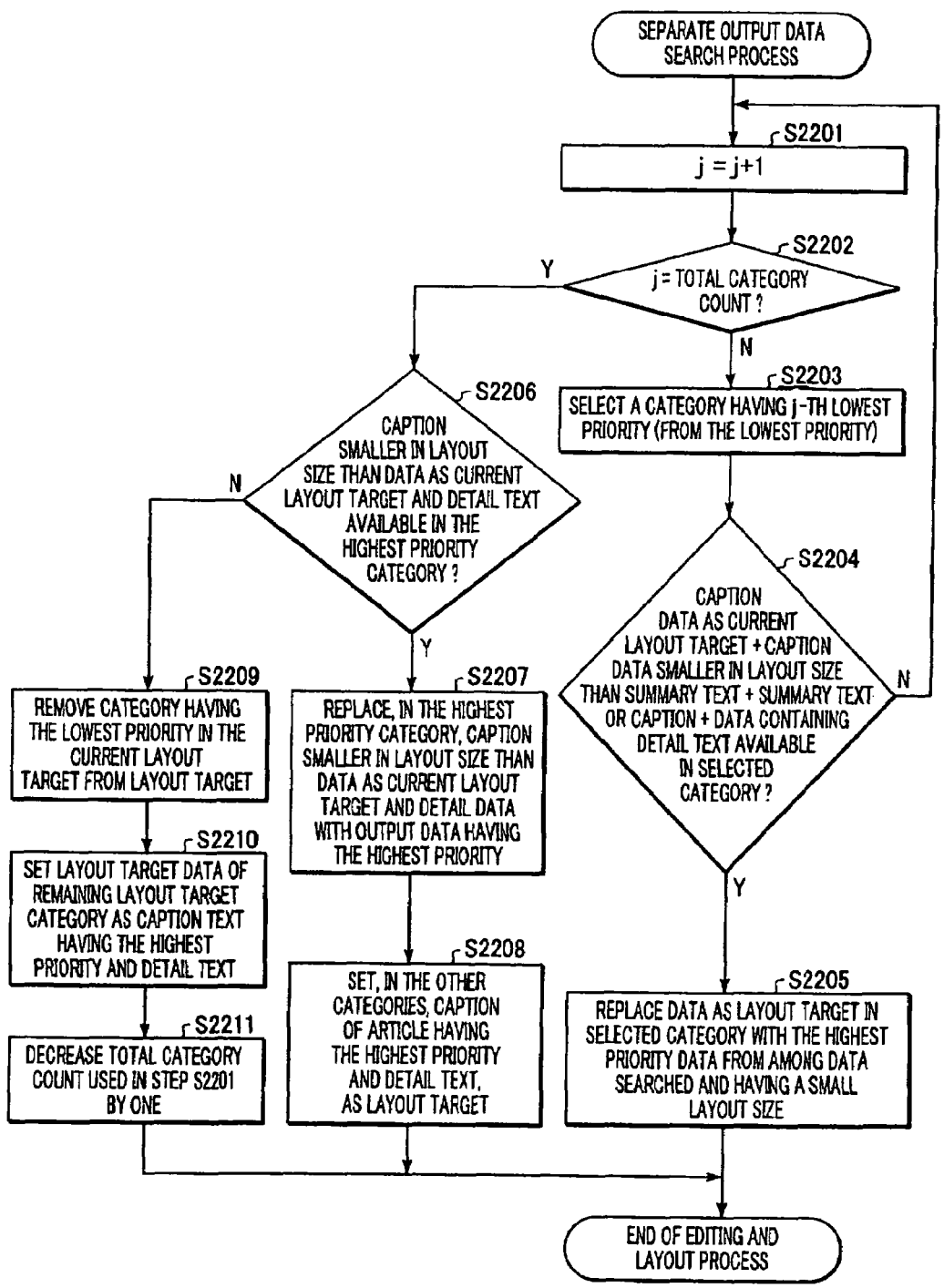
FIG. 23 is a flowchart illustrating a data processing procedure of the data processing apparatus of the present invention.

FIG. 23 is a flowchart of a data processing procedure of the data processing apparatus 1. In the data processing procedure containing steps S2201-S2211, separate output data is searched.

The count of categories as the layout target is managed so that the parameter j is set to j=j+1 to change the output data from the one having a lower priority (step S2201). The data processing apparatus 1 determines whether the parameter j becomes the total count of categories as the layout targets (step S2202).

If j is not equal to the total count of categories in step S2202, the algorithm proceeds to step S2203. The data processing apparatus 1 searches for the data having a smaller layout size starting with a lower priority category. In step S2203, the data processing apparatus 1 selects a category having a j-th lowest priority. In other words, the lowest priority category is selected first. In step S2204, the data processing apparatus 1 searches for another output data laid out in the "caption+summary text" form or the "caption+detail text" form in a layout size smaller than the output data currently as the layout target in the category selected in step S2203 laid out in the "caption+summary text" form. If no output data having a smaller layout size is present, the algorithm loops to step S2201. If output data having a smaller layout size is present, the data processing apparatus 1 replaces the "caption+summary text" of the output data currently as the layout target in the category selected in step S2205 with the output data having the highest priority from among the output data having a small layout size searched in step S2204. The substitute output data is preferably extracted from among the same output data group.

In step S2202, if the output data is posted in all categories when j becomes the total count of categories currently as the layout target, the detail text of the output data having the highest priority in the highest priority category cannot be laid out. If j="total count of categories" in step S2202, the algorithm proceeds to step S2206. It is now learned that no detail text is included, unless the count of categories as the layout target is reduced, or unless the output data in the data group having the highest priority in the highest priority category is replaced with another output data.

In step S2206, the data processing apparatus 1 searches for the output data of the "caption+detail text" form having a smaller layout size than the "caption+detail text" output data in the layout state thereof currently as the layout target in the highest priority category. Like in step S2204, the substitute output data is preferably extracted from the same output data group.

If the output data having a small layout size is present in step S2206, the data processing apparatus 1 replaces in step S2207 the "caption+detail text" form of the output data currently as the layout target in the highest priority category with the output data having the highest priority from among the output data having a small layout size searched and found in step S2206.

The output data of the other categories are again replaced with the "caption+detail text" of the output data having the highest priority (step S2208). Although the output data having the highest priority category is replaced with the output data having a lower priority, the output data in the other categories is heightened in category level with the content thereof shown in more detail.

If it is determined in step S2206 that no output data having a small layout size in the highest priority category is present, the algorithm proceeds to step S2209. The data processing apparatus 1 removes the category having the lowest priority from among the categories intended as the layout target, thereby reducing the category count (step S2209).

Figure 24:
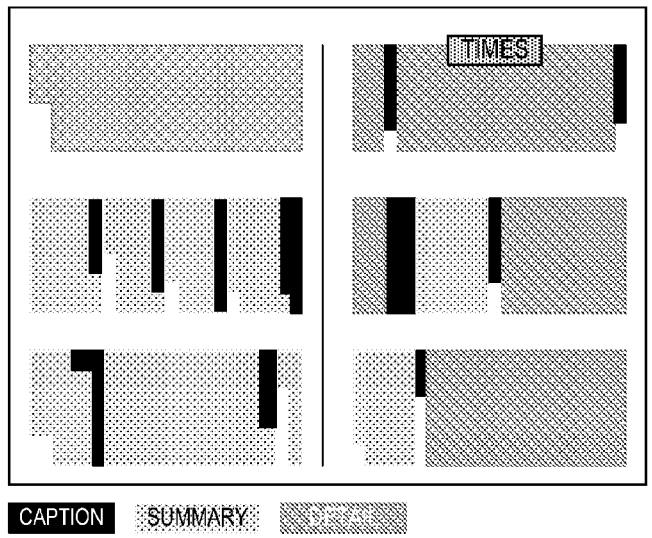
FIG. 24 illustrates results of a layout of the data processing apparatus of FIG. 1.

In step S2210, the data processing apparatus 1 replaces the output data in the category as the layout target with the "caption+detail text" of the output data having the highest priority among all data again. By repeating step S2209, the data processing apparatus 1 finally runs out of the output data as the layout target, thereby initiates an error process. For simplicity, this process is not shown in the flowchart of FIG. 23. In step S2111, the count of the categories used in step S2202 is reduced by one. FIG. 24 shows the results of layout.

When the extracted data cannot be laid out, that data is replaced with another data. This method avoids a difficult-to-see layout that may be caused by a layout method of scale-contracting data to force the data into a column. For example, a detail text may be replaced with a summary text as a layout target, and totally different output data (article) acquired from the data source servers 2A, 2B, and 2C may be used.

Figure 25:
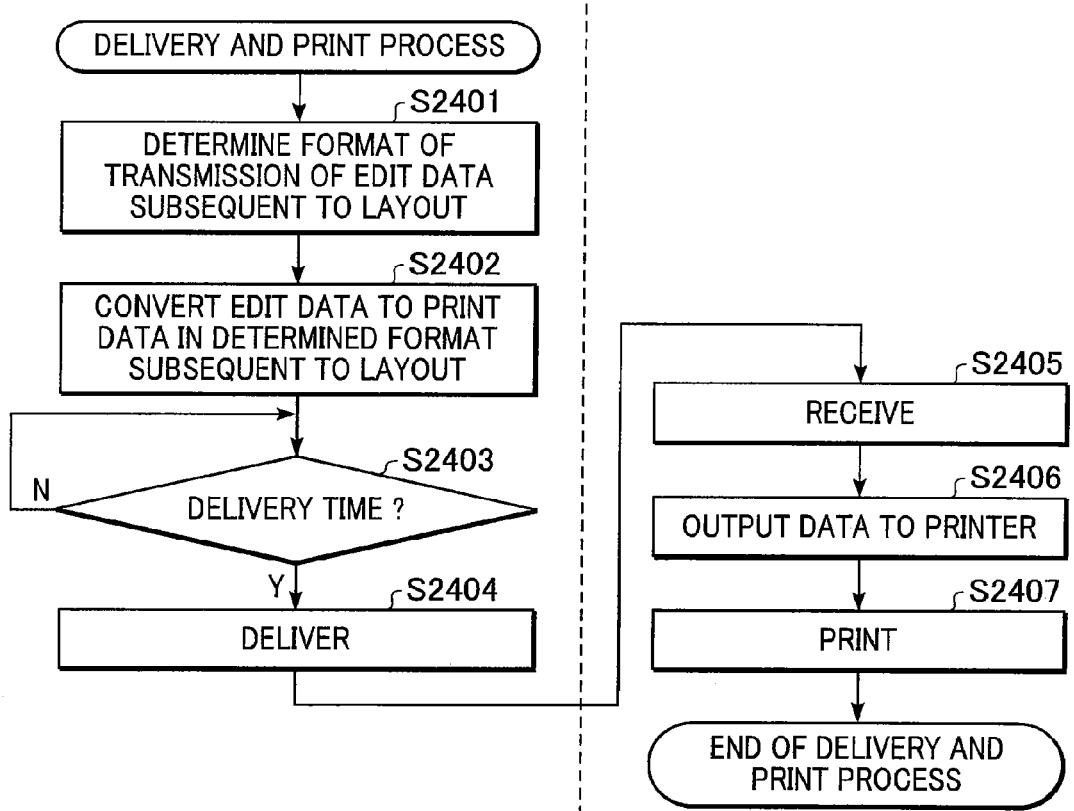
FIG. 25 is a flowchart illustrating a data processing procedure of the data processing system in accordance with the present invention.

FIG. 25 is a flowchart of a data processing procedure of the data processing system of the present invention. In the data processing procedure containing steps S2401-S2407, the home printing system prints the received data. Steps S2401-S2404 are performed by the data processing apparatus 1, while steps S2405-S2407 are performed by the PC 3 and the printer 4.

The data processing apparatus 1 determines whether or not to send the layout-processed and edited data as video data or PDL data within a predetermined duration of time before the delivery time registered by the user.

The data processing apparatus 1 converts the edited data to script data in step S2401. For example, if the printer model of the user is registered as the user information, the data processing apparatus 1 determines whether or not the PDL data supported by the user registered printer can be generated. This determination depends on whether a printer driver of the user registered printer is pre-stored in the data processing apparatus 1. If no particular printer is designated for printing, the edited data is sent as the video data.

In step S2402, the data processing apparatus 1 generates print data from the PDL data or the video data.

The data processing apparatus 1 hands the layout-processed and edited data to the printer driver. Upon receiving the data, the printer driver modifies object data contained in the data produced by a layout program to PDL data the controller of the printer 4 can interpret.

When the sending of the video data is determined in step S2401, the data processing apparatus 1 compresses the layout-processed and edited data to send it as the video data. The edited data produced through the layout program in the data processing apparatus 1 is converted to bit-map data as the print data. The bit-map data as the print data is compressed using any appropriate compression technique such as JPEG, JBIG, LZ, Packbits, or delta compression. The print data is then stored in the external memory 211 of the data processing apparatus 1.

When the data processing apparatus 1 detects the coming of the delivery time in step S2403, the data processing apparatus 1 establishes communication with the PC 3 of the user in the home printing system and sends the print data to the PC 3 in step S2404.

This process is performed when the data processing apparatus 1 controls associated devices and controllers therewithin under the control of the program stored in the program ROM area of the ROM 203 or the external memory 211.

The data processing apparatus 1 has thus delivered the print data. The operation of the host PC 3 and the printer 4 in response to the reception of the print data will now be discussed.

Upon receiving the print data (step S2405), the host PC 3 transfers the print data to the printer 4 (step S2406).

If the data processing apparatus 1 has compressed the edited data in step S2402, the host PC 3 decompresses the print data. Under the control of the program stored in the program ROM area of the ROM 303 or the external memory 311, the host PC 3 receives the print data, establishes a local connection, and transfers the print data to the printer 4 connected through a local connection, a home LAN, or the like.

The printer 4 receives the print data in step S2407, and prints the print data. The process is complete.

In the above-described embodiment, the data processing apparatus 1 generates the database of the output data in the external memory 211, and searches the data in the database in the external memory 211 in accordance with the layout flowcharts of FIGS. 22 and 23. The present invention is not limited this arrangement. For example, the external memory 211 may store data of categories, data for managing the priority of each data, and data for identifying a data supply source of each data. The CPU 201 may acquire actual output data from each data supply source in steps S2108, S2112, S2113, S2115, S2204, S2205, S2206, and S2207 in the flowcharts of FIGS. 22 and 23 under the control of the program stored in the ROM 203 or the external memory 211.

In the above-described embodiment, the print data searched and collected from the data source servers 2A, 2B, and 2C is the PDL data or the bit-map data. The layout-processed and edited data may be sent as script data such as HTML, XML+CSS or XSL, and the user may view the data on the monitor of the host PC 3 using an application having a browsing function.

In above discussion, the general system for providing service converts the layout-processed and edited data into the print data before sending the data to the home printing system (including the host PC 3 and the printer 4), the host PC 3 receives the print data, and the printer 4 then prints out the print data. The print data sent from the data processing apparatus 1 has a print job format containing the layout-processed print data and attribute information.

Figure 26:
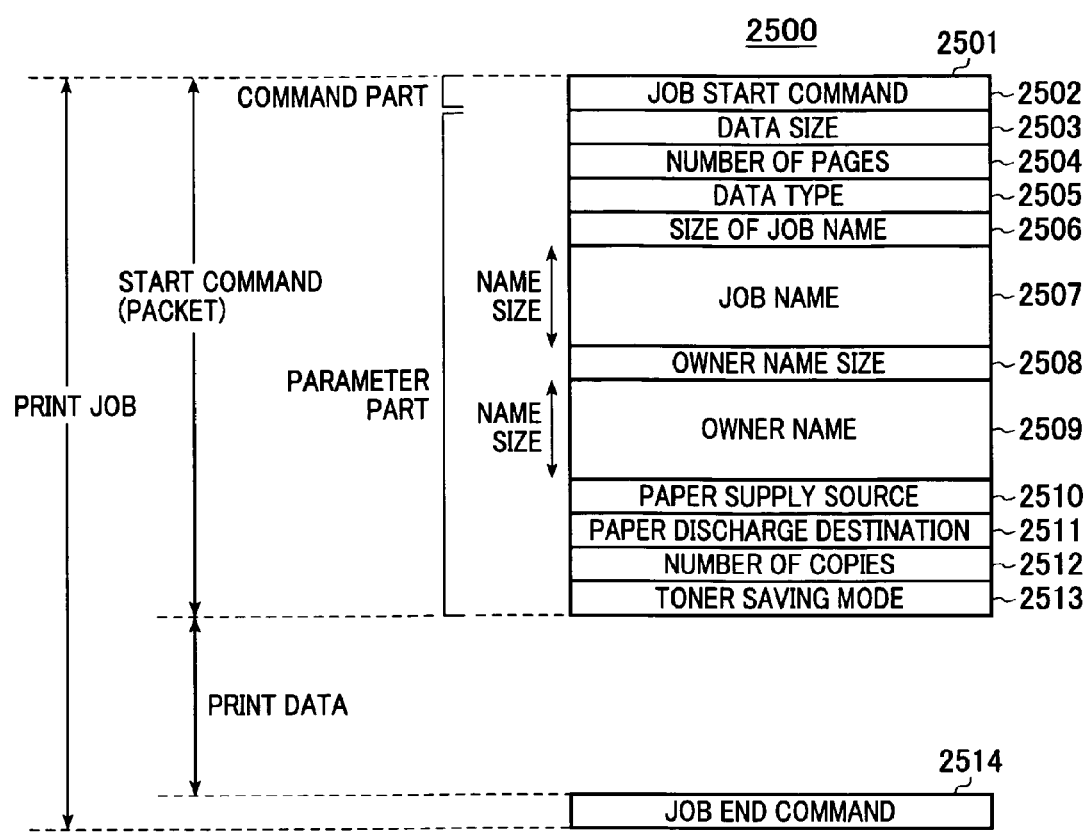
FIG. 26 illustrates the data structure of a print job sent to the home printing system from the data processing apparatus of FIG. 1.

FIG. 26 illustrates the data structure of the print job sent from the data processing apparatus 1 of FIG. 2 to the home printing system.

As shown, a print job 2500 for causing the home printer 4 to print out the layout-processed print data contains a start command 2501, the print data, and a job end command 2514. The print job 2500 starts with the start command 2501, and ends with the job end command 2514.

The start command 2501 contains an ID portion identifying that the command is a job start command 2502, a data size 2503 of the print data, the number of pages 2504 of the print data, a data type 2505, a size of job name 2506, a job name 2507, an owner name size 2508, an owner name 2509, a paper supply source 2510, a paper discharge destination 2511, a number of copies 2512, and a toner saving mode 2513.

The data type 2505 indicates whether the data is a text, an image, or a drawing. Each parameter is set by a printer driver program. The printer driver program is stored in the ROM 203 of the data processing apparatus 1 or the external memory 211, and is used to produce the data of the print job 2500. The printer driver program is initiated when the data processing apparatus 1 performs a series of process steps for collecting data, laying out the data, and delivering service. During data delivery, the printer driver program generates a variety of parameters for the job start command 2502 using the data of the user information table (see FIG. 17).

The data set in the paper supply source 2510 identifies which of a plurality of paper cassettes 604 and 605 supplies the sheets of paper. The printer 4 prints the data on a sheet supplied from the designated paper cassette.

The printer 4 discussed with reference to FIG. 6 has no plurality of discharge trays. This parameter setting 2511 is effective when a printer has a plurality of paper cassettes and a plurality of discharge trays.

The command may further contain sheet size data for designating the size of sheets on which images are formed, and the type of sheets (medium type) for designating the type of sheets on which images are formed.

As already described, the print data part is the output data laid and edited, and contains image data, compressed image data, and script data such as PDL data.

The data processing apparatus 1 can modify the number of copies 2512 during the service providing in accordance with the user registration at the contract. The default value is one copy.

With the toner saving mode 2513, the bit-map data is image processed during printing to save toner. This parameter will be described in detail later.

The job end command 2514 contains the command ID only.

Each parameter in the start command 2501 is set based on the user information table, and is sent as the print job. One example of parameter setting, here the toner saving mode parameter, will be discussed.

The printer 4 is controlled to reduce toner consumption when the toner saving mode is designated in the print job.

The toner saving function decimates the data other than an edge of characters without destroying the outline of the characters, thereby substantially reducing the toner consumption during printing. The printer 4 examines the received print job, and initiates the toner saving mode when a parameter designating the toner saving mode is contained in the parameter part of the start command discussed with reference to FIG. 26. The toner saving process is performed after the print data is converted into the bit-map data for image forming.

Figure 27:
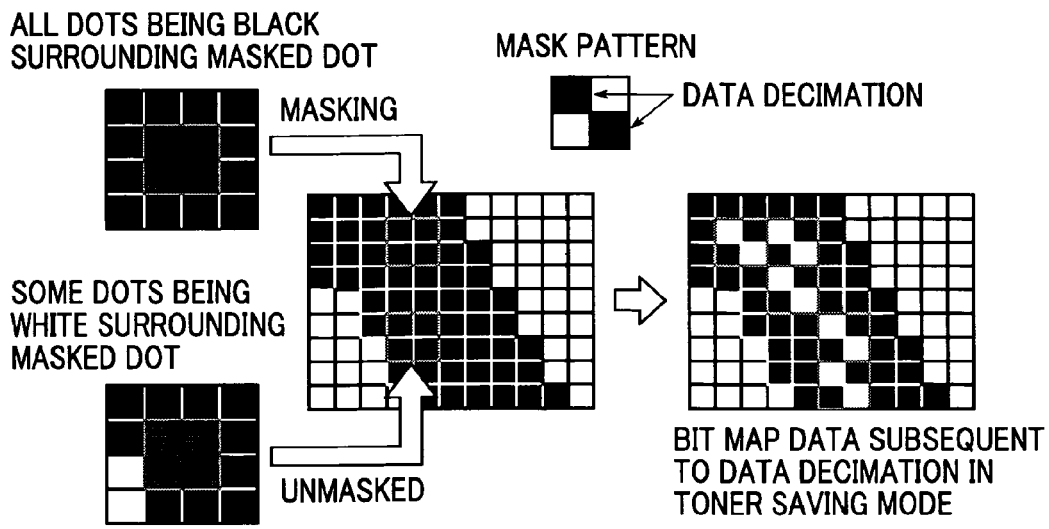
FIG. 27 diagrammatically illustrates a toner saving video processing operation in a toner saving mode of FIG. 25.

FIG. 27 diagrammatically illustrates the toner saving image process in the toner saving mode 2513 discussed with reference to FIG. 26.

In the example of FIG. 27, data decimation is performed using a mask pattern of a total of four dots, namely, two dots in the main scan direction and two dots in the sub-scan direction, at a resolution of 600 dpi. If a portion to be decimated is surrounded by all black dots from up, down, left and right, a mask pattern is placed on that dot data to decimate the data. If any one of surrounding dots is white, no data decimation is performed because that dot is at an edge. Although the print density is lowered during the toner saving mode, toner is substantially saved. The image processing with edge information not missing thus results in an bit-map image data. In this way, the CPU 709 performs the data decimation process the bit-map data, expanded in the video memory 705, under the control of the program of the ROM 704.

Figure 28:
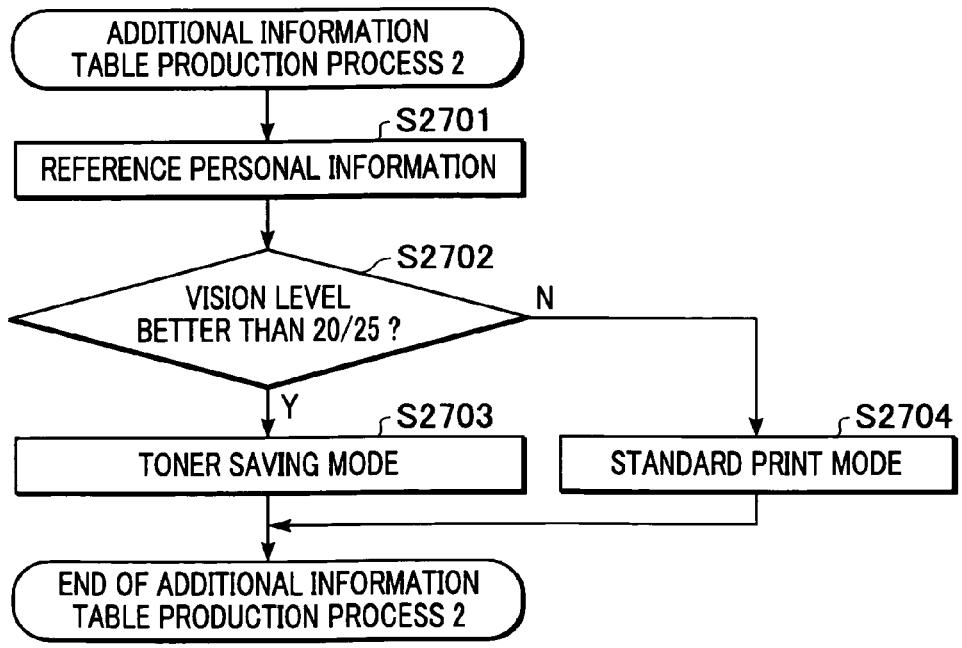
FIG. 28 is a flowchart illustrating a data processing procedure of the data processing apparatus in accordance with the present invention.

FIG. 28 is a flowchart of a data processing procedure of the data processing apparatus 1. In the data processing procedure containing steps S2701-S2704, the parameter of the toner saving mode is set in the additional information table of the user information table managed in the external memory 211 of FIG. 2. The user checks whether the user's vision is acceptable (step S2702), referencing the personal information table the user sets from the personal information during the service registration (step S2701). Here, a vision level of 20/25 is set as being good vision. During the production of the additional information table, the character font size is determined based on the vision information. The discussion of this process is omitted for simplicity.

If the vision level is good in step S2702, the user is considered to recognize small font characters even if the print density is lowered. The toner saving mode is thus set to be on (step S2703), and the process here ends.

If the user has a poor vision level in step S2702, a higher print density allows the user to recognize with ease, and a standard print mode (with the toner saving mode off) is set (step S2704). The process thus ends.

These determined parameters are set beforehand in the additional information table within the user information table.

FIG. 29 illustrates the data structure of the user information table managed in the external memory 211 of the data processing apparatus 1 of FIG. 2. This table corresponds to the user information table containing the additional information table set as illustrated in FIG. 28.

As previously described, during the delivery of the service, the data processing apparatus 1 references the user information table of FIG. 29 and sets each parameter in the job start command 2502 in the production of the print job before sending the data to the user.

The service providing system causes the user to register beforehand the personal information not closely related to data layout, and provides service appropriate for the user by referencing the personal information. By causing the user to enter a variety of information not explicitly related to the data delivery service during the personal information registration, the system of the present invention allows the user to receive service appropriate for the user in terms of output results and cost without the need for understanding the content and meaning of complex setting.

The toner saving mode has been discussed. To reduce toner consumption, information directly designating a print density may be entered when the user has a good vision level. By preparing a plurality of mask patterns for respective print densities, the print density in use is adjusted and toner consumption is also changed accordingly.

Second Embodiment

Figure 30:
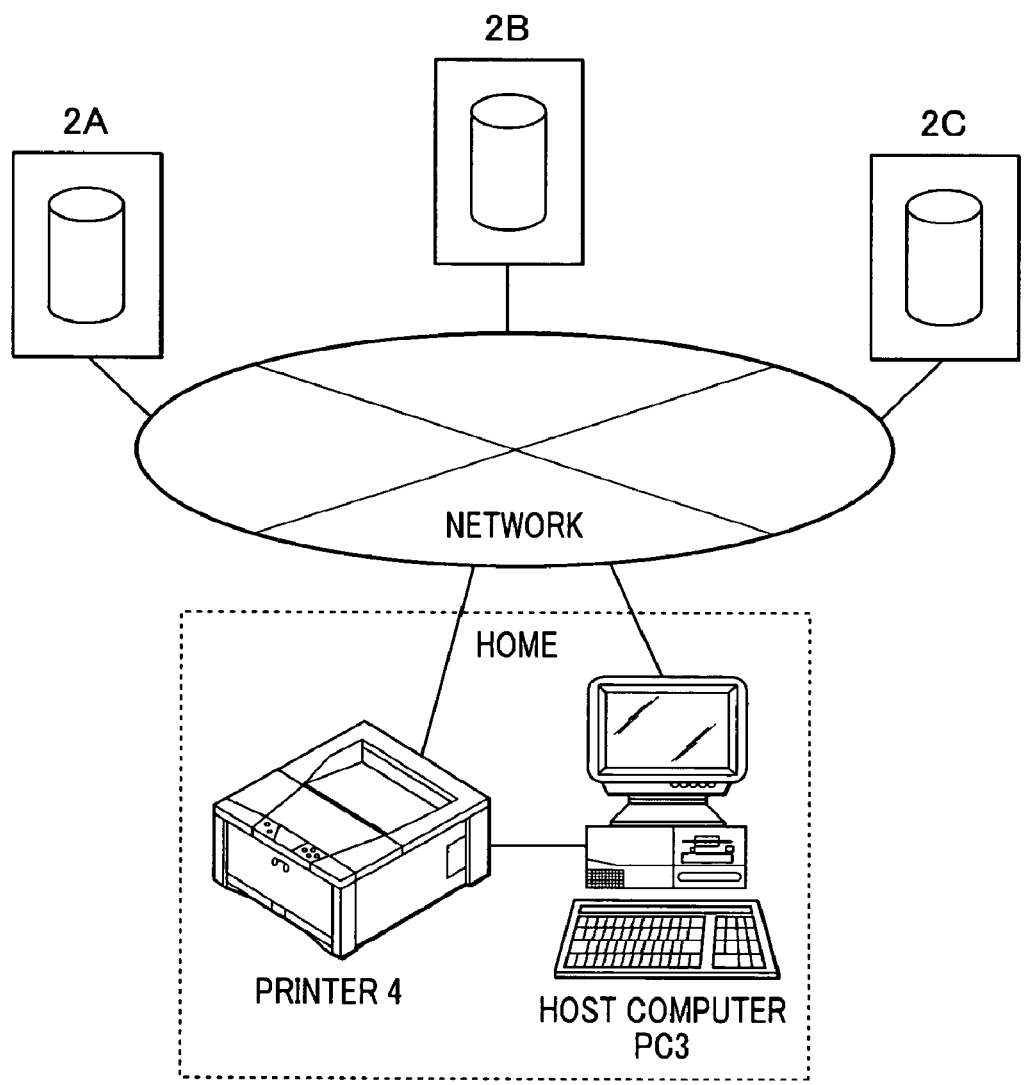
FIG. 30 illustrates the structure of a service providing system incorporating a data processing apparatus of a second embodiment of the present invention.

FIG. 30 illustrates a service providing system incorporating a data processing apparatus 1 in accordance with a second embodiment of the present invention. The same elements described with reference to FIG. 1 are designated with the same reference numerals. In the second embodiment, the function of the data processing apparatus 1 is performed by a printer 4.

Figure 31:
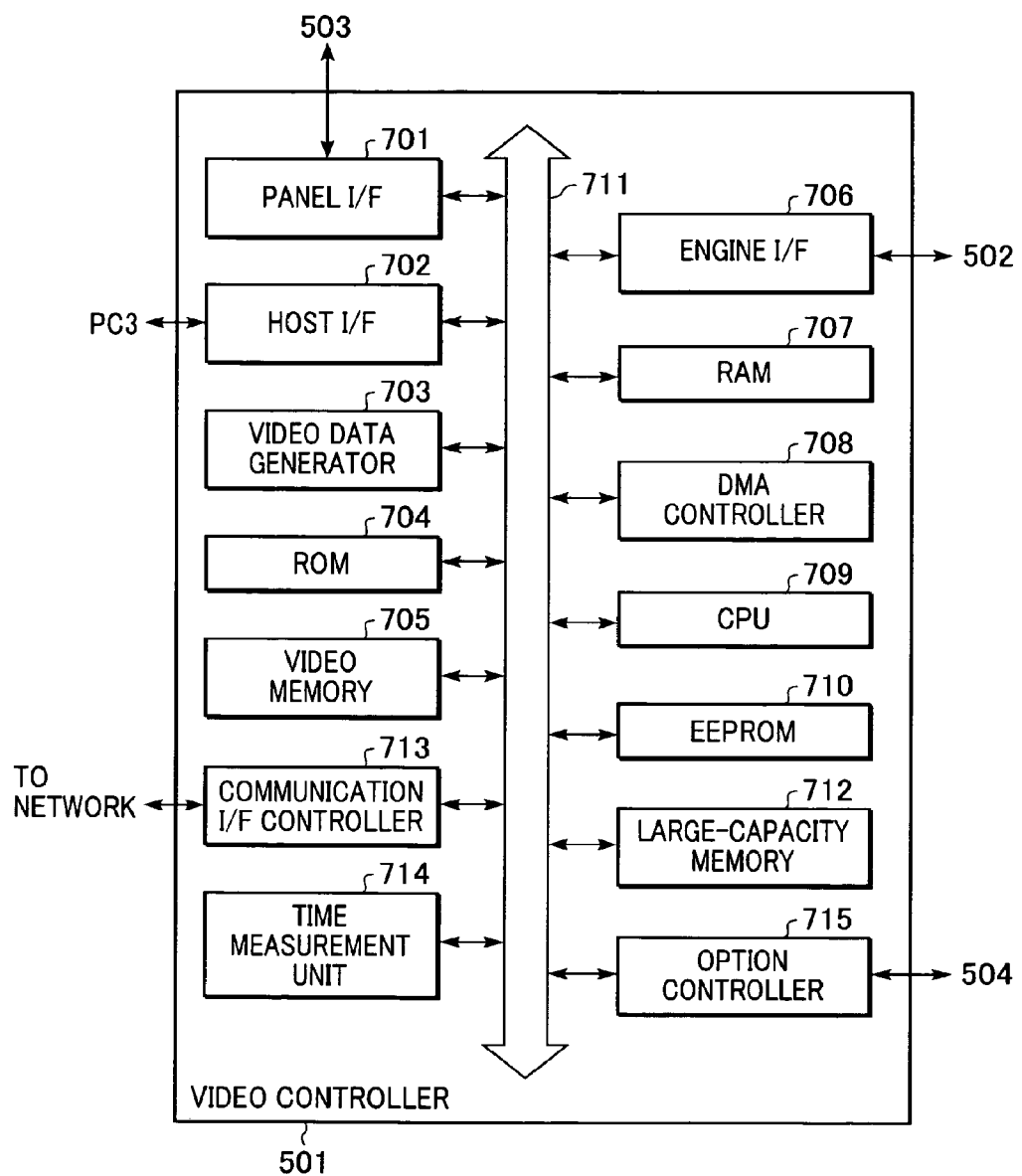
FIG. 31 is a block diagram of another printer in the data processing system in accordance with the second embodiment of the present invention.

FIG. 31 is a block diagram illustrating the structure of the printer 4 in the data processing system of the second embodiment of the present invention. The elements identical to those illustrated in FIG. 7 are designated with the same reference numerals.

The difference between the first embodiment and the second embodiment is that the printer 4 includes a large-capacity memory (HDD) 712 corresponding to the external memory 211 of the data processing apparatus 1 of the first embodiment, a communication I/F controller 713, and a time measurement unit 714.

Referring to FIG. 31, the ROM 704 and the large-capacity memory 712 store a variety of programs executed by the data processing apparatus 1 of the first embodiment. The communication I/F controller 713 is designed to provide an address unique over the network, or to control communications through a modem. In this arrangement, the printer 4 performs the function of the data processing apparatus 1.

Since the print data and the print job are generated in the printer 4, the host PC 3 does not need to receive the layout-processed data.

In the second embodiment, the user registers the personal information on the host PC 3 to the printer 4 through a local connection or a network. The printer 4 produces and registers the additional information table to complete the user information table. When the time measurement unit 714 detects a predetermined time, the printer 4 establishes the data source server 2A or the like, and acquires data from the user registration information. The printer 4 lays out the acquired data, and generates the layout data in accordance with the layout condition from the user registration information. The printer 4 determines print attributes from the user registration information to convert the layout data into the print data, and sends the print data to a printer unit (engine). In this way, the printer 4 performs the function of the data processing apparatus 1 of the first embodiment. In the first embodiment, the printer 4 is an electrophotographic printer. The printer 4 is not limited to an electrophotographic printer. The printer 4 may be an inkjet printer, a copying apparatus with a scanner, or a printer/facsimile integrated apparatus.

Third Embodiment

In the first embodiment, the layout condition is set taking into consideration the user, and the output data is modified in accordance with the layout condition. In the first embodiment, a list of typical personal information (birth, career, family, body height, living conditions, family budget, etc) is shown on the personal information input screen. In accordance with the content set in the displayed personal information, the data processing apparatus 1 optimizes, for each user, the layout condition under which information collected from the data source server 2A or the like is laid out. A printout provided by the printer 4 becomes appropriate for each user. A user, if handicapped, may have difficulty retrieving the printout from the printer 4.

The degree of handicap, if the user is handicapped, may be registered as an item in the personal information input screen of FIG. 12. For example, the discharge destination of sheets in the printer 4 may be designated. The printer 4, if connected to a discharge option unit as will be discussed later, may have a mechanism and a controller that designates a bottom tray as a discharge tray in accordance with the personal information indicating the degree of handicap.

In the third embodiment, the output data is modified taking into consideration the registration information of the user (containing handicap information), and the discharge means for discharging printed matter is appropriately controlled.

FIGS. 32 and 33 illustrate user interfaces in the data processing apparatus 1 of FIG. 1. The user interface is a personal information input screen which is presented on the CRT 310 of the host PC 3 of FIG. 1 and on which the user enters personal information. Information individually input by the user affects the editing and layout of the output data in accordance with the present invention.

The input of the information concerning handicap of the user with reference to FIGS. 32 and 33 will discussed further.

As shown in FIG. 32, the user is not handicapped. A "handicap content input" button and a handicap content input box arranged therebelow are set to an input disabled state, namely, a so-called gray-out state.

As shown in FIG. 33, the user is handicapped. The "handicap content input" button and the handicap content input box arranged therebelow are input enabled.

Although no specific handicap is specified in the handicap content input box, the use of a wheelchair or a walking stick may be stated therewithin. More precise information may be acquired by arranging a specific question (for example, "do you use wheelchair?").

The use of the handicap information will be discussed later. As in the first embodiment, the personal information thus entered is stored in each column in the personal information table within the user information table of FIG. 17.

Figure 34:
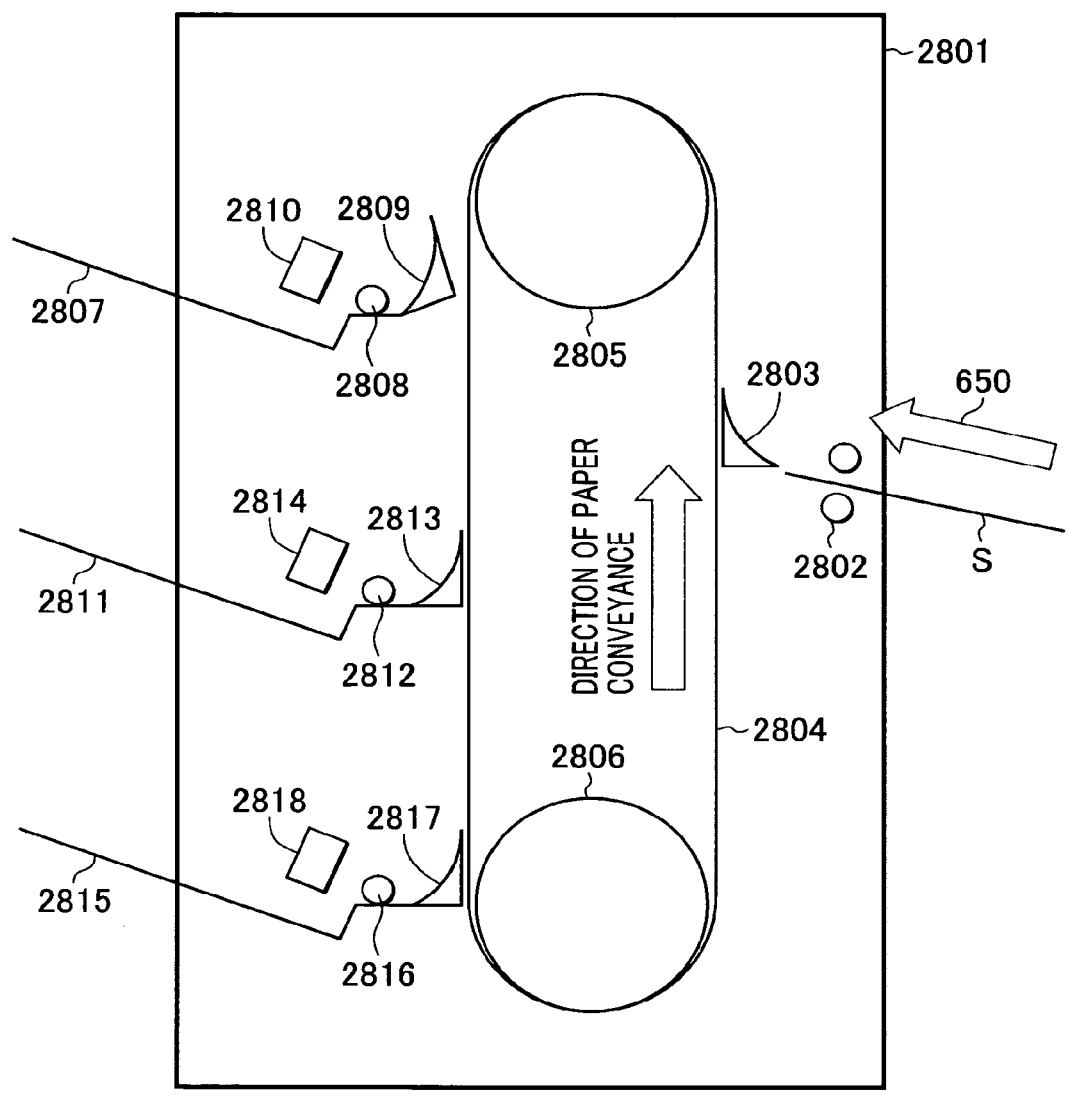
FIG. 34 is a cross-sectional view of a staple finisher optionally connected to the printer of FIG. 6.

FIG. 34 is a cross-sectional view diagrammatically illustrating a staple finisher optionally connected to the printer 4 of FIG. 6. In the printer 4 of FIG. 6, the discharge flapper 634 is switched opposite from the face-down discharge tray 635. A sheet discharged in the direction represented by an arrow 650 is guided into the staple finisher.

Referring to FIG. 34, the arrow 650 indicates the direction of conveyance of sheets discharged from the printer 4. A printed sheet S is discharged by the printer 4. Guide rollers 2802 guide the sheet S into a staple finisher 2801. A guide 2803 guides the sheet S toward a conveyer belt 2804.

The conveyer belt 2804 conveys the sheet S. As shown in FIG. 34, the conveyance belt 2804 rotates counterclockwise. Rollers 2805 and 2806 entrain the conveyer belt 2804. A first discharge bin 2807 is arranged in the staple finisher 2801. A guide roller 2808 guides the sheet S to the first discharge bin 2807.

A flapper 2809 switches the discharging of the incoming sheet S to the first discharge bin 2807.

Referring to FIG. 34, the flapper 2809 of the first discharge bin 2807 is located at a position through which the sheet S passes. In that stationary state, the flapper 2809 does not allow the sheet S to be discharged to the first discharge bin 2807. A stapler 2810 staples the sheets discharged into the first discharge bin 2807. The stapler 2810 drives a staple into the sheets that are aligned by a sheet aligning guide (not shown).

A guide roller 2812 guides the sheet S to a second discharge bin 2811. A flapper 2813 switches the discharging of the incoming sheet S to the second discharge bin 2811.

As shown in FIG. 34, the flapper 2813 of the second discharge bin 2811 is located at the stationary position that allows the conveyed sheet S to be discharged into the second discharge bin 2811. The sheet conveyed by the conveyer belt 2804 is detached from the conveyer belt 2804 at the edge of the flapper 2813 (the top end of the flapper 2813 in FIG. 34), and is then discharged into the second discharge bin 2811. A stapler 2814 staples the sheets discharged into the second discharge bin 2811. The stapler 2814 drives a staple into the sheets discharged into the second discharge bin 2811 and aligned by a sheet alignment guide (not shown).

A guide roller 2816 guides the sheet S to a third discharge bin 2815. A flapper 2817 discharges the conveyed sheet S into the third discharge bin 2815. The third discharge bin 2815 is last bin of the staple finisher 2801 of FIG. 34. The flapper 2817 is always located at a position where printed sheets are always discharged therein.

The sheet S conveyed by the conveyer belt 2804 is detached from the conveyer belt 2804 at the edge of the flapper 2817 (the top end of the flapper 2817 in FIG. 34), and is then discharged into the third discharge bin 2815. A stapler 2818 staples the sheets discharged in the second discharge bin 2817. The stapler 2818 drives a staple into the sheets discharged into the second discharge bin 2815 and aligned by a sheet alignment guide (not shown).

Figure 35:
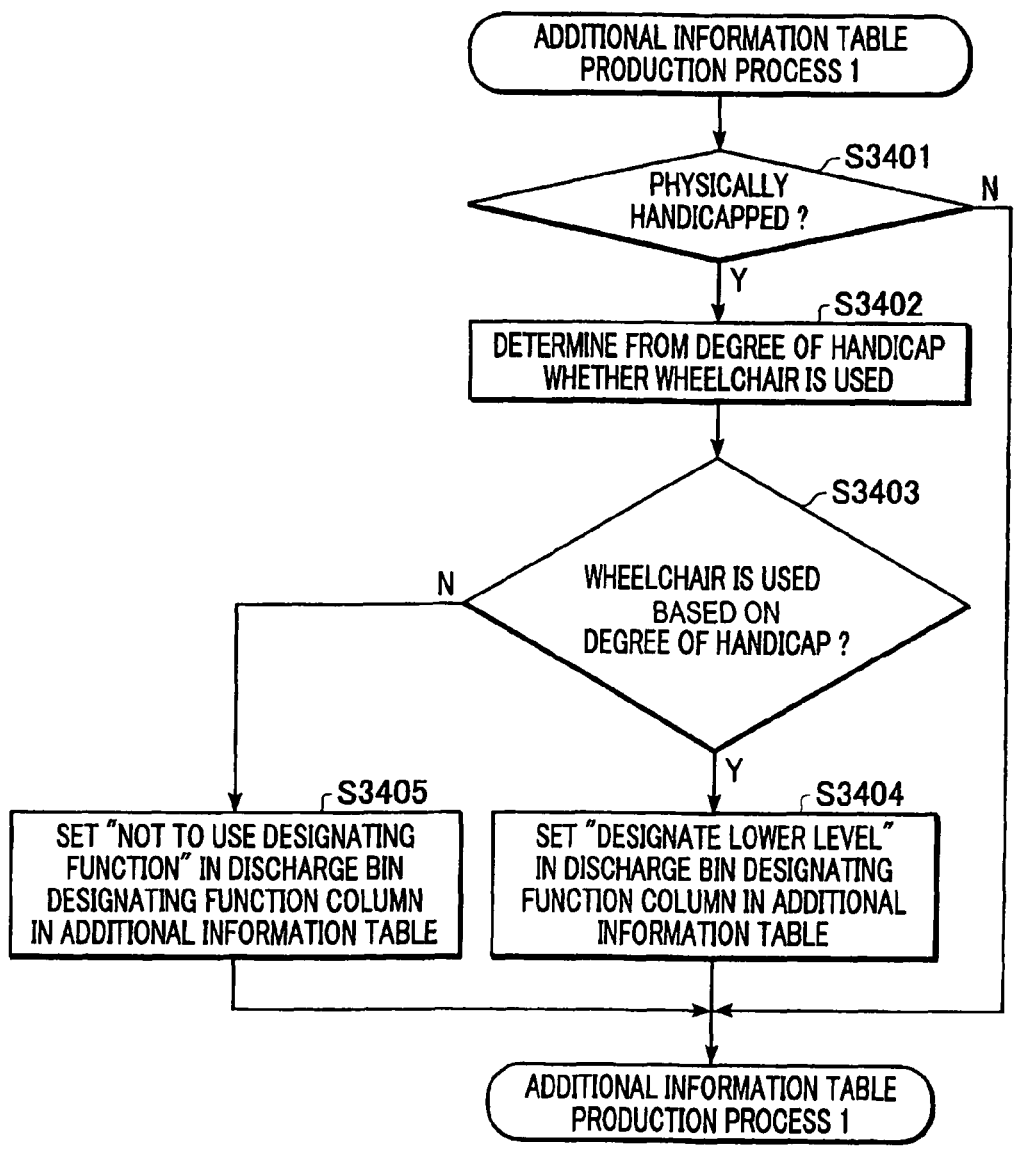
FIG. 35 is a flowchart illustrating a data processing procedure of the data processing apparatus in accordance with the present invention.

FIG. 35 is a flowchart illustrating a data processing procedure of the data processing apparatus 1. In the data processing procedure including steps S3401-S3405, the data processing apparatus 1 generates the additional information table. In this process, a bin receiving the discharged printed matter is designated. Here, the discharge bin receiving the discharged printed matter is controlled in accordance with the registration information of the user.

In the procedure of FIG. 35, information designating the discharge bin receiving the discharged printed matter is generated from the user registration information other than the registration information directly required for layout.

On the screen shown in FIGS. 32 and 33, the user is now assumed to be handicapped. For example, if the user of the data processing system normally uses a wheelchair, the printed matter may be discharged into a discharge bin that is located at a position lower in level than a typical bin location. This arrangement lessens the difficulty with which the user picks up the printed matter from the discharge bin. The additional information table is produced for this setting.

When the production of the additional information table starts, the data processing apparatus 1 checks the handicap of the user registered as the personal information on the personal information registration screen of FIG. 32 (step S3401). If the data processing apparatus 1 determines that the user is handicapped, the data processing apparatus 1 further checks the personal information registration screen of FIG. 33 to determine the degree of handicap from handicap 1 to handicap N. Depending on the result, the data processing apparatus 1 estimates whether or not the user uses a wheelchair (step S3402).

Based on the determination result in step S3402, the data processing apparatus 1 determines whether a wheelchair is used (step S3403). If it is determined that a wheelchair is used, "discharge destination fixed to bin at lower position" is set in a discharge bin designating function of the additional information table within the user information table as shown in FIG. 36 (step S3404). The process is then complete.

If it is determined in step S3403 that no wheelchair is used, "discharge bin designating function unused" is set in the discharge bin designating function of the additional information table (step S3405). The process is thus complete.

The data processing apparatus 1 produces the layout basic table and the additional layout table, lays out the searched and collected output data referencing these tables, and properly controls the discharge bin receiving the discharged printed matter.

FIG. 36 illustrates a user registration information management table managed in the external memory 211 of the data processing apparatus 1 of FIG. 1.

As shown in FIG. 36, if the information of handicap as the user registration information, more specifically, the information concerning the detailed handicap item is registered, information for selecting a discharge bin at a lower position as the discharge bin receiving the printed matter is set and stored in the additional information table.

With minimum data required for layout being simply set by the user, the data processing apparatus 1 designates the output bin of the printed matter from the registration information not closely related to layout. The system of the present invention thus provides a printed matter in a way appropriate for each user.

Although it may be possible for the user to enter these settings, the system preferably controls the setting operation from the standpoint of convenience of use.

The process of the data processing apparatus 1 for delivering and printing the data, and for determining the discharge bin will now be discussed with reference to a flowchart of FIG. 37.

Figure 37:
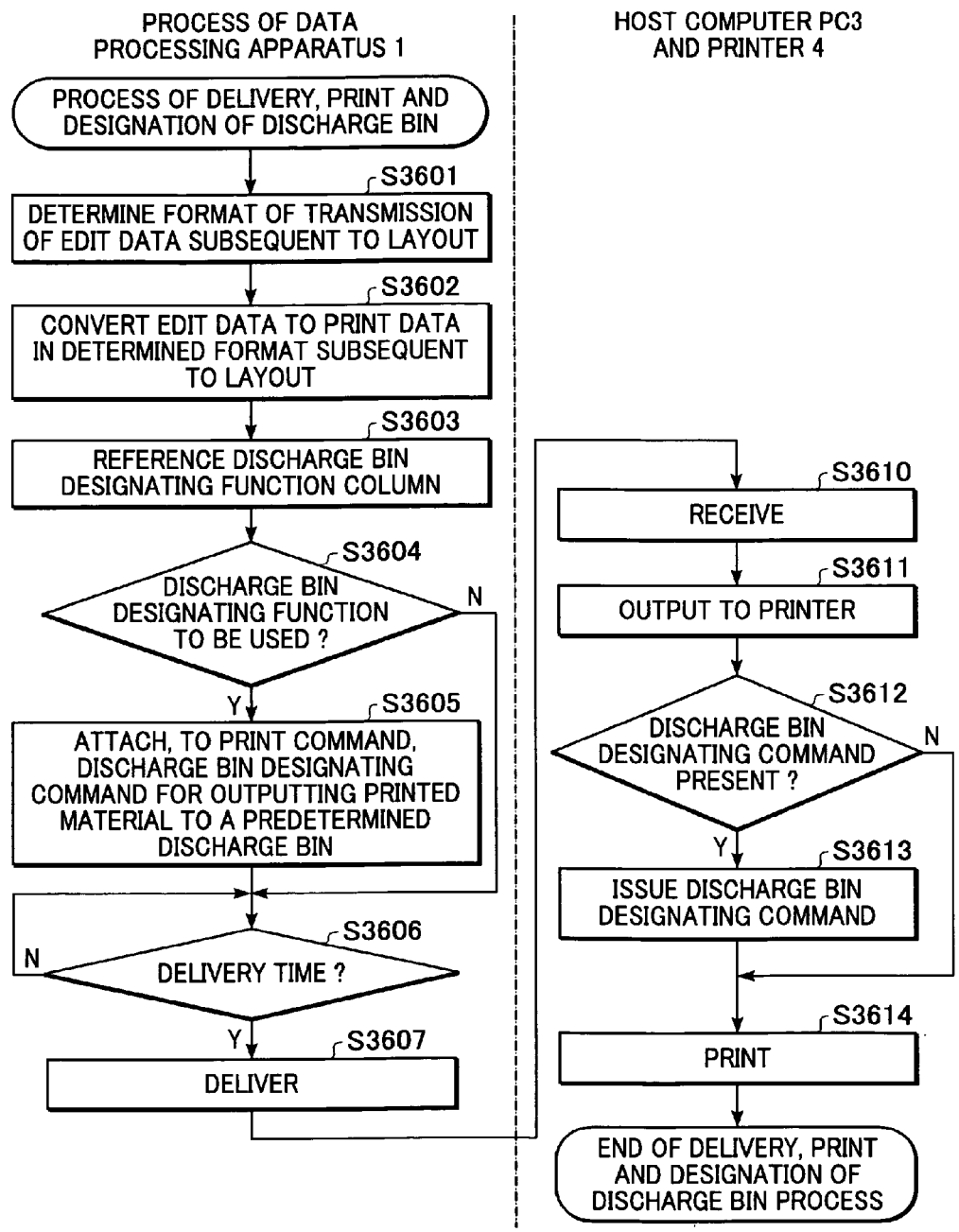
FIG. 37 is a flowchart illustrating a data processing procedure in accordance with the present invention.

FIG. 37 is the flowchart of the data processing procedure of the data processing system. In the data processing procedure containing steps S3601-S3607, and steps S3610-S3614, the data processing apparatus 1 delivers the layout-processed information to the user, and the home printing system prints the received information. The steps S3601-S3607 are performed by the data processing apparatus 1, while the steps S3610-S3614 are performed by the host PC 3 and the printer 4.

The data processing apparatus 1 determines whether or not to send the layout-processed and edited data as video data or PDL data within a predetermined duration of time before the delivery time registered by the user.

In step S3601, the data processing apparatus 1 converts the edited data to script data. For example, if the printer model of the user is registered as the user information, the data processing apparatus 1 determines whether or not the PDL data supported by the user registered printer can be generated. This determination depends on whether a printer driver of the user registered printer is pre-stored in the data processing apparatus 1. If no particular printer is designated for printing, the edited data is sent as the video data.

In step S3602, the data processing apparatus 1 generates print data from the PDL data or the video data.

The data processing apparatus 1 hands the layout-processed and edited data to the printer driver. Upon receiving the data, the printer driver modifies object data, contained in the data produced by a layout program, to PDL data that the controller of the printer 4 can interpret.

When the sending of the video data is determined in step S3601, the data processing apparatus 1 compresses the layout-processed and edited data to send it as the video data.

The edited data produced through the layout program in the data processing apparatus 1 is converted to bit-map data as the print data. The bit-map data as the print data is compressed using any appropriate compression technique such as JPEG, JBIG, LZ, Packbits, or delta compression. The print data is then stored in the external memory 211 of the data processing apparatus 1.

The data processing apparatus 1 determines whether to use the discharge bin designating function (step S3604) by referencing the discharge bin designating function column (step S3603). If the data processing apparatus 1 determines that the discharge bin designating function is used, in other words, that the information designating the discharge bin is held in the discharge bin designating function column of the additional information table, the data processing apparatus 1 attaches a discharge bin designating command to a print command so that the printed matter is discharged into the designated discharge bin (step S3605).

If it is determined in step S3604 that the discharge bin designating function is not used, the algorithm proceeds to step S3606 skipping step S3605.

When the data processing apparatus 1 detects the coming of the delivery time in step S3606, the data processing apparatus 1 establishes communication with the PC 3 of the user in the home printing system and sends the print data to the PC 3 in step S3607.

This process is performed when the data processing apparatus 1 controls associated devices and controllers therewithin under the control of the program stored in the program ROM area of the ROM 203 and the external memory 211. The data processing apparatus 1 has thus delivered the print data.

The operation of the host PC 3 and the printer 4 in response to the reception of the print data will now be discussed.

Upon receiving the print data (step S3610), the host PC 3 transfers the print data to the printer 4 (step S3611).

If the data processing apparatus 1 has compressed the edited data in step S3602, the host PC 3 decompresses the print data. Under the control of the program stored in the program ROM area of the ROM 303 or the external memory 311, the host PC 3 receives the print data, establishes a local connection, and transfers the print data to the printer 4 connected through a local connection, a home LAN, or the like.

Upon receiving the print data in step S3612, the printer 4 checks to see if the discharge bin designating command is attached to the print data. If it is determined that the discharge bin designating command is attached, the printer 4 issues the discharge bin designating command to the staple finisher so that the printed matter is discharged into the designated discharge bin (step S3613).

If it is determined in step S3612 that the discharge bin designating command is not attached, the algorithm proceeds to step S3614 skipping step S3613. In this case, the discharge bin receiving the printed matter is determined based on the specification of the printer 4.

The printer 4 performs the printing process (step S3614), thereby completing a series of printing process steps.

The printed matter is discharged into the discharge bin designated in step S3613, or the discharge bin determined by the specification of the printer 4 if step S3613 is skipped, or a face-up discharge tray or a face-down discharge tray in the printer 4.

Fourth Embodiment

In the third embodiment, the data processing system performs the printing process so that the discharge bin is controlled by the handicap information of the personal information registered by the user. If the user of the data processing system is short in height, the system may be controlled to output the printed matter into a discharge bin at a lower level. A fourth embodiment of the present invention includes such a mechanism.

Figure 38:
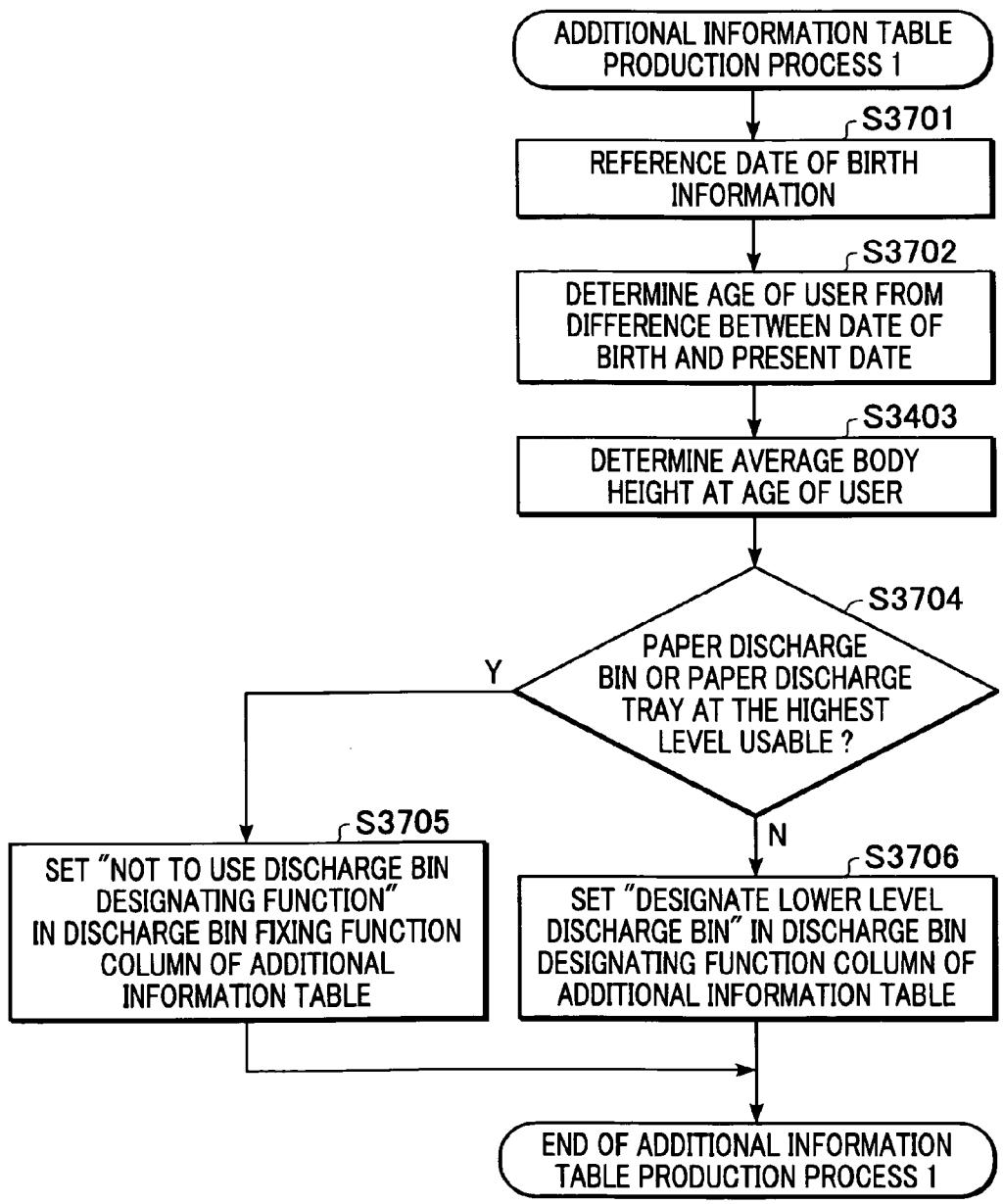
FIG. 38 is a flowchart illustrating a data processing procedure of the data processing apparatus in accordance with the present invention.

FIG. 38 is a flowchart of a data processing procedure of the data processing apparatus 1. In the data processing procedure, information designating a discharge bin receiving the printed matter is produced from the user registration information other than the registration information directly required for layout in the additional information table production process of FIG. 35. Unlike the optional structure shown in FIG. 34, the printer 4 includes two discharge bins, one upper and one lower, and is not provided with the face-up discharge tray and the face-down discharge tray therewithin. The data processing procedure includes steps S3701-S3706.

When the production of the additional information table starts, the data processing apparatus 1 checks date of birth information registered as the personal information (step S3701), and then determines the age of the user from the difference between the current date and the date of birth (step S3702). The data processing apparatus 1 determines the average body height at the age of the user (step S3703). A table listing the average body height at each age is stored beforehand in the ROM 203 of the data processing apparatus 1 or the external memory 211. The data processing apparatus 1 determines the average body height of the user by searching it according to the age of the user.

In step S3703, the data processing apparatus 1 determines whether picking up the printed matter from the upper discharge bin is possible at the determined average height, in other words, whether the discharge bin or the discharge tray at the highest position is reached (step S3704).

In this determination process, the body height at which the printed matter is picked up with ease from the discharge bin is empirically determined beforehand, and is stored in the ROM 203 of the data processing apparatus 1 or the external memory 211. By comparing the average body height with the determined height, the determination process is performed.

If it is determined in step S3704 that the upper discharge bin can be reached with ease, "not to use discharge bin designating function" is set in the discharge bin designating function of the additional information table (step S3705), and the process is complete.

If it is determined in step S3704 that the upper discharge bin cannot be reached with ease, "designate lower discharge bin" is set in the discharge bin designating function of the additional information table (step S3706), and the process is complete.

The data processing apparatus 1 produces the layout basic table and the additional information table, lays out the searched and collected output data for printing, and controls the discharge bin receiving the printed matter after the printing operation.

The user registration information management table thus produced is identical to the user registration information management table of FIG. 36.

Referring to FIG. 36, when the date of birth information is registered as the user registration information, the age of the user calculated from this information and the current date. The average body height is determined at the age of the user. The appropriate discharge bin to receive the printed matter is determined. The printed matter is thus output to the discharge bin at the lower position.

If the user simply sets minimum data required for layout, the data processing apparatus 1 designates the output bin of the printed matter from the registration information not directly related to layout. The system of the present invention thus provides a printed matter in a way appropriate for each user.

It may be possible for the user to enter these settings. Preferably, the system controls the setting operation from the standpoint of convenience of use.

The process of the data processing apparatus 1 of the fourth embodiment for delivering and printing the print data and determining the discharge bin remains unchanged from the third embodiment, and the discussion thereof is omitted here.

Fifth Embodiment

In accordance with the first embodiment, the layout condition is set taking into consideration the vision level of the user, and the output data is modified in accordance with the layout condition. In a fifth embodiment of the present invention, information about children acquired from the user registration information set through the user interface of FIG. 12 is used to organize the output data so that the output data may be read by an average child, and the organized data is laid out and output. The fifth embodiment is now discussed.

Figure 39:
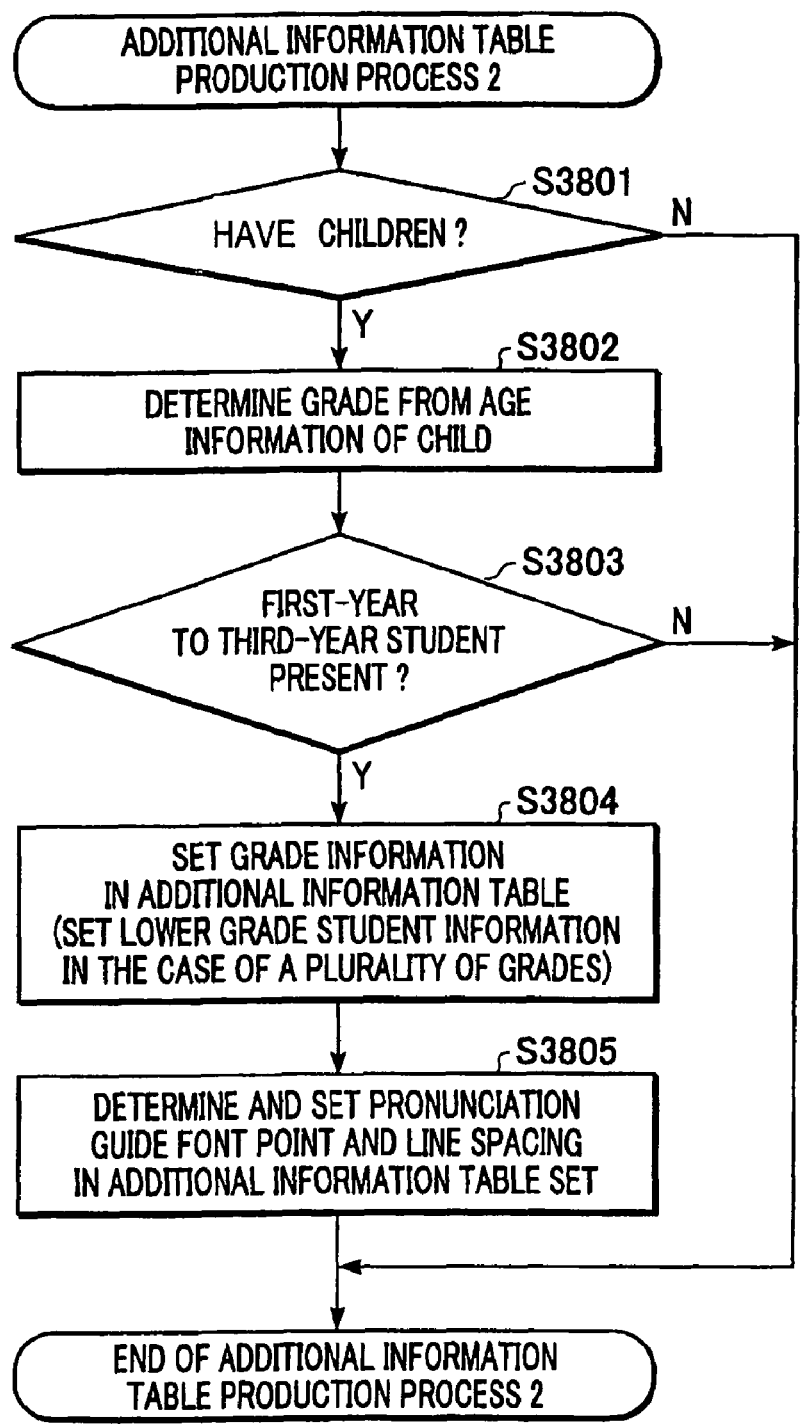
FIG. 39 is a flowchart illustrating a data processing procedure of the data processing apparatus in accordance with the present invention.

FIG. 39 is a flowchart of an data processing procedure of the data processing apparatus 1. The data processing procedure containing steps S3801-S3805 is another production process of the additional information table of FIG. 16, for attaching a pronunciation guide to a kanji-character.

As shown in FIG. 16, data relating to the vision level is extracted from the user registration information unrelated to the layout, and is customized to be output data in a layout preferred by the user. In the fifth embodiment, the information of child acquired from the user registration information is used to lay out the data so that the data may be read by a child.

The data processing apparatus 1 checks to see whether the family of the user includes a child (step S3801). If the family of the user is found to include a child, the data processing apparatus 1 checks the age information of the child, and determines the grade of the child from the age and grade table (not shown) (step S3802). Here, the child is 10 years old at the four-year grade in a primary school. The grade is here determined from the age. Alternatively, this step may be skipped if the grade is entered at the user registration.

In step S3803, the data processing apparatus 1 checks to see if the family of the user includes a child from a first-year grade to a third-year grade.

Kanji-characters for everyday use students must learn in the primary school at each year grade are standardized by the teaching guidelines of Japan. If the user is a four-year grade student, there is no need to attach the pronunciation guide to these kanji-characters, which must be studied below and at the third-year grade.

Under-school-age children rarely read the information of the output data. High-school students or older students are expected to read kanji-characters without the help of the pronunciation guide. The data processing apparatus 1 thus attaches no pronunciation guide.

If it is determined in step S3803 that the family includes a student between the first-year grade and the third-year grade, year-grade information is set in step S3804. Data of spacing between the pronunciation guide font and the line spacing are determined and set in the additional information table (step S3805). The process is thus complete.

The pronunciation guide font number is half the point number of the text character. The pronunciation guide is attached to the detail text only, and is not attached to a caption kanji-character.

A correspondence table between the age and the year grade, a table of kanji-characters to be learned at each grade year, and dictionary information for attaching the pronunciation guide are stored in the external memory 211 of the data processing apparatus 1 of FIG. 2. The CPU 201 executes the procedure of the flowchart under the control of the program stored in the ROM 203.

FIG. 40 illustrates the user information table managed in the external memory 211 of the data processing apparatus 1 of FIG. 1. The user information table is the one produced subsequent to the process of FIG. 39.

Figures 41, 42:
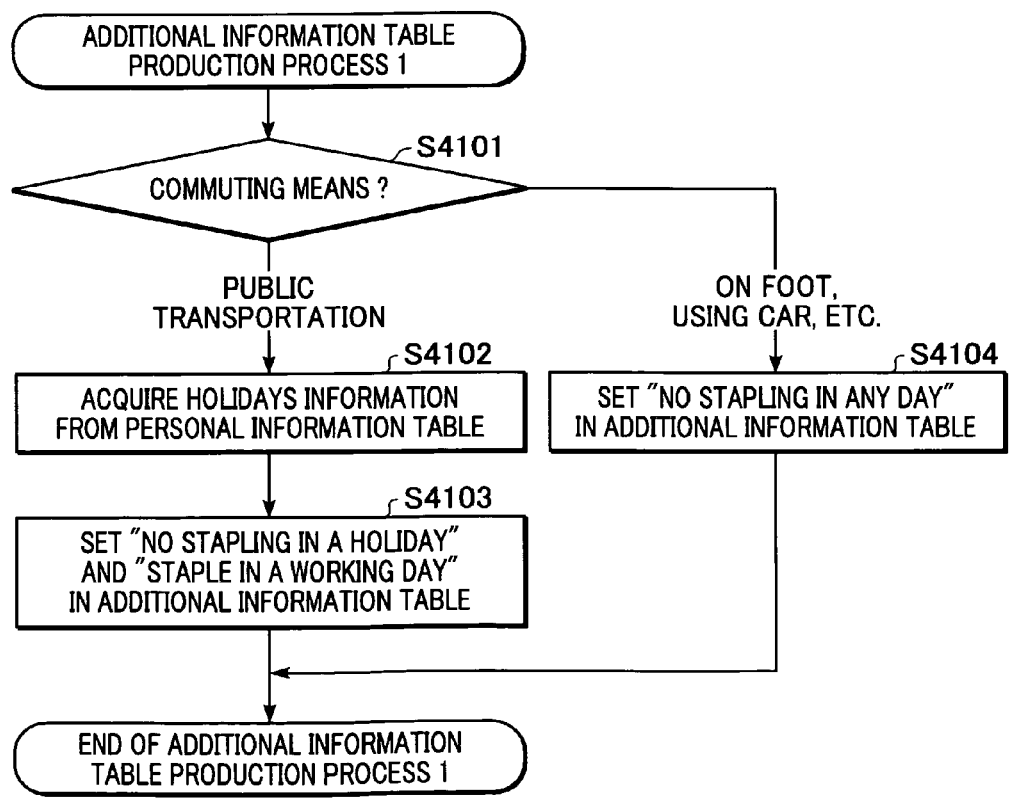
FIG. 41 illustrates print results output from the printer of FIG. 1.
FIG. 42 is a flowchart illustrating a data processing procedure of the data processing apparatus in accordance with the present invention.

FIG. 41 illustrates the printout of the printer 4 of FIG. 1, wherein a pronunciation guide is attached to kanji-characters. The pronunciation guide is phonogramic kana-characters sometimes associating difficult-to-pronounce ideographic kanji-character as a guide for pronunciation. In the printout of FIG. 41, for example, a character 411 is a kanji-character "本" and characters 412 are kana characters "ほん" (pronounced "hon") as a pronunciation guide for the kanji-character "本".

In the first embodiment, the output data is arranged with the data line and the line spacing. However, when the pronunciation guide is attached to kanji-characters, a line having a pronunciation guide font point (half the text font) plus extra one point must be inserted between the lines.

The extra one point is inserted between the pronunciation guide and the output data line. Here, the pronunciation guide font point plus the extra one point are collectively referred to as a pronunciation line. At each line feed, "line spacing+pronunciation line+output data line" is repeated.

During layout, the data processing apparatus 1 must take into consideration the pronunciation line in addition to the line spacing to determine in step S2105 of FIG. 22 whether the output data can be laid out within the print area.

When the layout frame of FIG. 15 is determined, the data processing apparatus 1 learns the number of characters at which each line feed is performed. At each line feed, the number of pronunciation guide lines also increases. The layout possibility determination may be performed regarding the pronunciation guide line as one full line. The data processing apparatus 1 preferably determines the possibility of layout by determining the line spacing in addition to the pronunciation guide line.

Sixth Embodiment

In the previously described embodiments, the layout condition is set taking into consideration the vision level of the user, and the output data is modified in accordance with the layout condition. The printed matter may be provided in the form of newspaper by referring to commuting information of the user acquired from the user registration information set through the user interface of FIG. 12. During commute hours, the user may read the printed matter after obtaining it at home in the morning. If the user read the printed matter in a commuter railcar, for example, the printed matter is preferably stapled for convenience of reading. On a holiday, stapling the printed matter may not be much needed. In a sixth embodiment of the present invention, the data processing apparatus 1 staples the printed matter depending on whether it is a holiday or a working day.

FIG. 42 is a flowchart of a data processing procedure of the data processing apparatus 1 in accordance with the sixth embodiment. In the data processing procedure containing steps S4101-S4104, information designating the stapling of the printed matter is produced as the additional information in the production process of the additional information table of FIG. 16.

When the production of the additional information table starts, the data processing apparatus 1 checks commuting means (stored in the external memory 211 of the data processing apparatus 1 of FIG. 1) registered as the personal information through the user interface of FIG. 12 (step S4101). If a public transportation is used as commuting means, holiday information registered as the personal information is acquired (step S4102).

The data processing apparatus 1 sets "no stapling" on holidays and "stapling" on working days in the additional information table (step S4103), and ends the process.

If it is determined in step S4101 that the user commutes on foot or using the user's own car rather than using a public transportation, the data processing apparatus 1 sets "no stapling" on everyday (step S4104), and ends the process.

The data processing apparatus 1 produces the layout basic table and the additional information table, lays out the searched and collected output data for printing, and controls the stapling process subsequent to printing.

FIG. 43 illustrates the user registration information management table managed in the external memory 211 of the data processing apparatus 1 of FIG. 1.

If the commuting means is registered as the user registration information as shown in FIG. 43, information as to whether or not to staple the printed matter of the delivered information on everyday is stored as the additional information table based on the commuting information and the holiday information.

If the user simply sets minimum data required for layout, the data processing apparatus 1 designates the information of whether to staple the printed matter from the registration information not closely related to layout. The system of the present invention thus provides a printed matter in a way appropriate for each user.

It may be possible for the user to enter these settings. Preferably, the system controls the setting operation from the standpoint of convenience of use.

The process of the data processing apparatus 1 for delivering and printing the data, and for stapling the printed matter will now be discussed with reference to a flowchart of FIG. 44.

Figure 44:
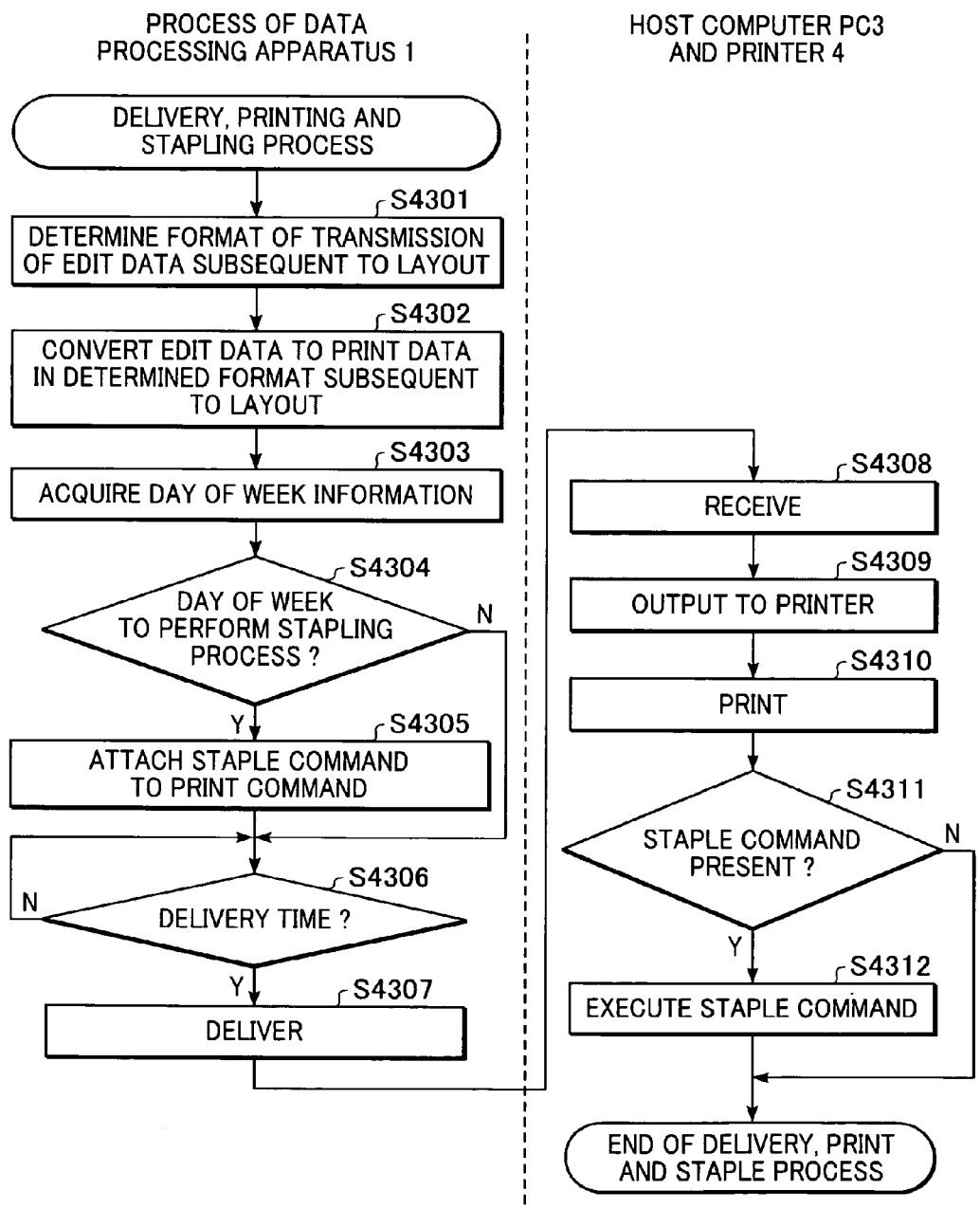
FIG. 44 is a flowchart illustrating a data processing procedure of the data processing system in accordance with the present invention.

FIG. 44 is a flowchart of a data processing procedure of the data processing system. In the data processing procedure containing steps S4301-S4312, the data processing apparatus 1 delivers the layout-processed information to the user, and the home printing system prints the layout-processed information. The steps S4301-S4307 are performed by the data processing apparatus 1, while the steps S4308-S4312 are performed by the host PC 3 and the printer 4.

The data processing apparatus 1 determines whether or not to send the layout-processed and edited data as video data or PDL data within a predetermined duration of time before the delivery time registered by the user.

In step S4301, the data processing apparatus 1 converts the edited data to script data.

For example, if the printer model of the user is registered as the user information, the data processing apparatus 1 determines whether or not the PDL data supported by the user registered printer can be generated.

This determination depends on whether a printer driver of the user registered printer is pre-stored in the data processing apparatus 1. If no particular printer is designated for printing, the edited data is sent as the video data.

In step S4302, the data processing apparatus 1 generates print data from the PDL data or the video data.

The data processing apparatus 1 hands the layout-processed and edited data to the printer driver. Upon receiving the data, the printer driver modifies object data, contained in the data produced by a layout program, to PDL data that the controller of the printer 4 can interpret.

When the sending of the video data is determined in step S4301, the data processing apparatus 1 compresses the layout-processed and edited data to send it as the video data. The edited data produced through the layout program in the data processing apparatus 1 is converted to bit-map data as the print data. The bit-map data as the print data is compressed using any appropriate compression technique such as JPEG, JBIG, LZ, Packbits, or delta compression. The print data is then stored in the external memory 211 of the data processing apparatus 1.

The data processing apparatus 1 acquires day information (step S4303). The day information may be acquired from time measurement function (not shown) of the data processing apparatus 1. The data processing apparatus 1 determines whether the current date is a day of stapling the printed matter (step S4304). This determination may be performed by referencing the additional information table of the user information table of FIG. 43.

If it is a day of stapling the printed matter, the data processing apparatus 1 adds a staple command to the print data (step S4305).

If it is determined in step S4304 that it is not a day of stapling the printed matter, the algorithm proceeds to step S4306.

When the data processing apparatus 1 detects the coming of the delivery time in step S4306, the data processing apparatus 1 establishes communication with the PC 3 of the user in the home printing system and sends the print data to the PC 3 in step S4307.

This process is performed when the data processing apparatus 1 controls associated devices and controllers therewithin under the control of the program stored in the program ROM area of the ROM 203 and the external memory 211.

The data processing apparatus 1 has thus delivered the print data. The operation of the host PC 3 and the printer 4 in response to the reception of the print data will now be discussed.

Upon receiving the print data (step S4308), the host PC 3 transfers the print data to the printer 4 (step S4309).

If the data processing apparatus 1 has compressed the edited data in step S4302, the host PC 3 decompresses the print data. Under the control of the program stored in the program ROM area of the ROM 303 or the external memory 311, the host PC 3 receives the print data, establishes a local connection, and transfers the print data to the printer 4 connected through a local connection, a home LAN, or the like.

Upon receiving the print data in step S4310, the printer 4 starts a printing operation in response to the print data. The printer 4 checks to see if the stapling command is attached to the print data (step S4311). If it is determined that the stapling command is attached, the printer 4 issues the stapling command to the staple finisher and staples the printed matter (step S4312), thereby ending the process.

If it is determined in step S4311 that no stapling command is contained, the printer 4 ends the process without stapling the printed matter.

In the sixth embodiment, the stapling process is performed in response to the commands that an option controller 715 in the video controller 501 of the printer 4 of FIG. 31 exchanges with a staple finisher 504.

Seventh Embodiment

In the sixth embodiment, the layout condition is set taking into account the vision level of the user, the output data is printed in accordance with the layout condition, and the printed matter is stapled. In a seventh embodiment of the present invention, the user decides whether to staple the printed matter referencing a layout setting screen. The position of staple on the printed matter is designated, and the stapling process is controlled depending on the staple position. The seventh embodiment will now be discussed.

FIG. 45 illustrates the layout setting screen displayed on the CRT 210 of the data processing apparatus 1 of FIG. 1, and is substantially the same as that of FIG. 13.

As shown in FIG. 45, the user enters information to edit and lay out the output data searched and collected by the data processing apparatus 1. For example, the user may set, to the user's own preference, various items of FIG. 45 including the size of sheets, the sheet alignment, both side printing, color printing, the number of prints of layout-processed data, and the staple position characteristic of the seventh embodiment of the present invention. If the user sets a larger number of layout prints, more detailed information may be acquired, but information providing service fee also becomes higher.

If the user completes entering all these data, a basic fee is calculated and shown. The calculation of the fee is not closely related to the present invention, and is not discussed here.

Figure 46:
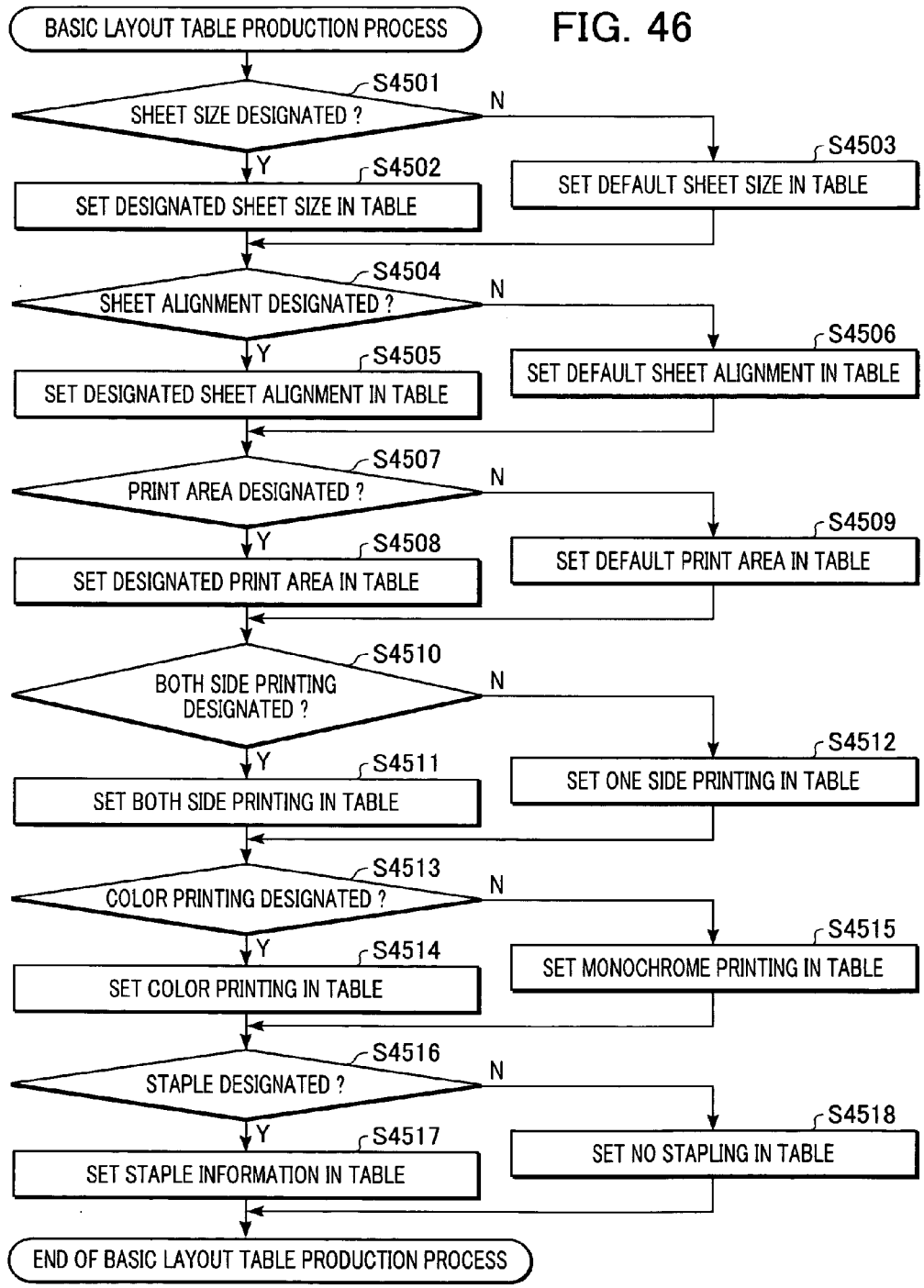
FIG. 46 is a flowchart illustrating a data processing procedure of the data processing system in accordance with the present invention.

FIG. 46 is a flowchart of a data processing procedure of the data processing apparatus 1. In the data processing procedure containing steps S4501-S4518, the data processing apparatus 1 produces the layout table (layout basic table) in the production of the user information table subsequent to the user registration.

In this process, basic items required for the layout of the collected output data are listed in a table subsequent to the user registration. The workload on the data processing apparatus 1 may increase if this procedure is performed when the data is collected and delivered. Once the table is generated by performing this procedure beforehand, it may be repeatedly used as long as layout conditions remain unchanged.

In step S4501, the data processing apparatus 1 determines whether any sheet size is designated in the layout setting screen shown in FIG. 45. If it is determined that a sheet size is designated, the designated sheet size is set in the table (step S4502), and the algorithm proceeds to step S4504. If it is determined in step S4501 that no sheet size is designated, a default sheet size is set in the table (step S4503), and the algorithm proceeds to step S4504. This completes the sheet size setting.

In step S4504, the data processing apparatus 1 determines whether any sheet alignment is designated in the layout setting screen shown in FIG. 45. If it is determined that any sheet alignment is designated, the designated sheet alignment is set in the table (step S4505), and the algorithm proceeds to step S4507.

If it is determined in step S4504 that no sheet alignment is designated, a default sheet alignment is set in the table (step S4506), and the algorithm proceeds to step S4507. In this way, the setting of the sheet alignment is complete.

In step S4507, it is determined whether a print area is designated in the layout setting screen of FIG. 45. If it is determined in step S4507 that a print area is designated, the designated print area is set in the table (step S4508), and the algorithm proceeds to step S4510.

If it is determined in step S4507 that no print area is designated, a default print area is set in the table (step S4509), and the algorithm proceeds to step S4510. This completes the print area setting.

In one embodiment, it is determined in step S4510 in the layout setting screen of FIG. 45 whether both side printing is designated. If it is determined in step S4510 that both side printing is designated, both side printing is set in the table (step S4511), and the algorithm proceeds to step S4513.

If it is determined in step S4510 that both side printing is not designated, one side printing is set in the table (step S4512), and the algorithm proceeds to step S4513. The setting of both side printing or one side printing is thus complete.

In step S4513, it is determined whether color printing is designated on the layout setting screen of FIG. 45. If it is determined in step S4513 that color printing is designated, the color printing is set in the table (step S4514), and the setting of color printing is complete and processing proceeds to step S4516.

If it is determined in step S4513 that no color printing is designated, monochrome printing is set in the table (step S4515). The setting of monochrome printing is thus complete and processing proceeds to step S4516.

The data processing apparatus 1 references the layout setting screen of FIG. 45 to determine in step S4516 whether or not the staple position is designated. If it is determined that the staple position is designated, the staple position is set in the table (step S4517). This completes the staple position setting.

If it is determined in step S4516 that no staple position is set, finishing without stapling is set in the table (step S4518).

Depending on whether the color printing is set, the data processing apparatus 1 determines whether the data produced therewithin is color data. Here, character font size, line spacing, and character spacing are set to default values.

Figure 47:
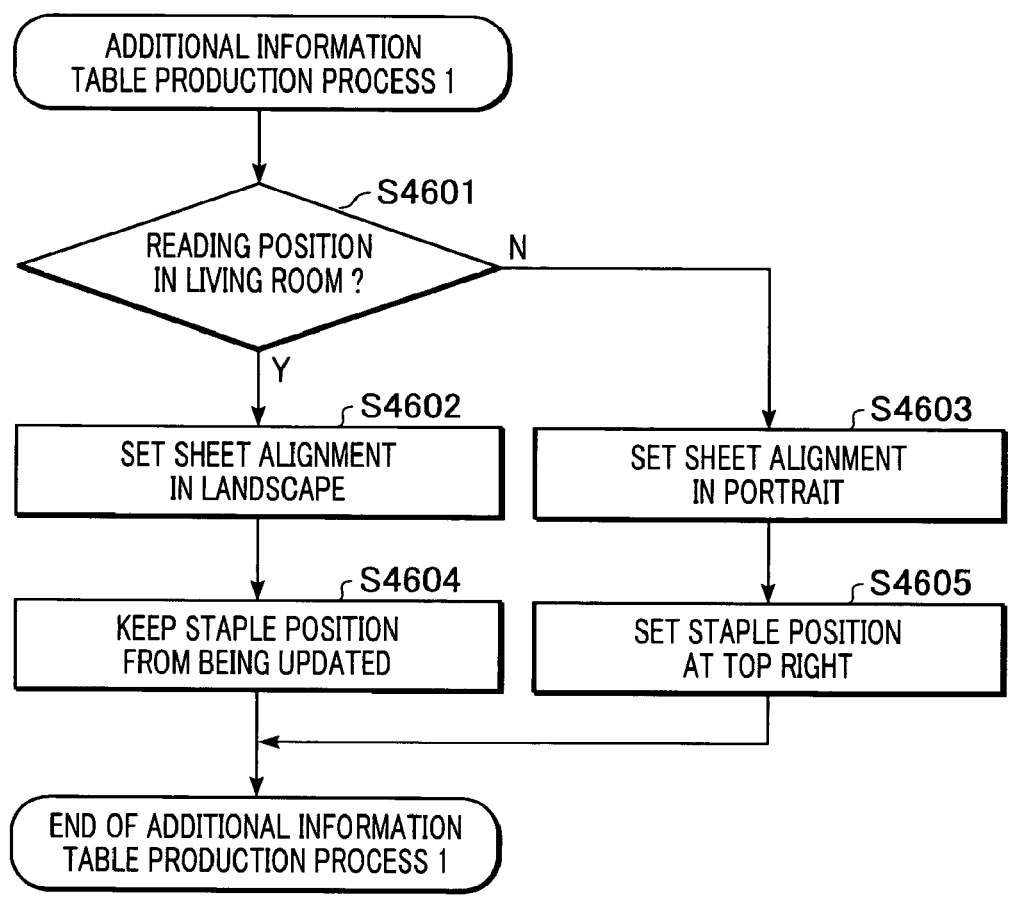
FIG. 47 is a flowchart illustrating a data processing procedure of the data processing apparatus in accordance with the present invention.

FIG. 47 is a flowchart of a data processing procedure of the data processing apparatus 1. In the data processing procedure containing steps S4601-S4605, the data processing apparatus 1 produces additional layout information from the user registration information other than the registration information directly required for layout.

To allow the user to read the printout with ease, the layout must be appropriate under a reading environment. If the same layout is applied to all users, some users may like it, but others may not. By accounting for user registration information, not closely related to the layout information, as a parameter of the layout information, the data processing apparatus 1 provides more output data in a layout satisfying the user's requirement.

The place of reading the printed matter, of the user information, is now considered.

FIG. 48 illustrates the personal information input screen displayed on the CRT 210 of the data processing apparatus 1 of the FIG. 1. The user is allowed to designate a railcar, a home living room, etc., as the main "place of reading" in addition to the items of FIG. 12.

In step S4601, the data processing apparatus 1 extracts the reading place to determine whether the reading place is a living room. If it is determined that the living room is designated, the sheet alignment is set to be landscape (step S4602), and the staple position is set to be unchanged (step S4604). The process is thus complete.

If it is determined in step S4601 that a railcar is designated, the sheet alignment is set portrait (step S4603), and the staple position is set to be at the top right (step S1605), for example. The process is thus complete. The staple position may be appropriately set accounting for other layout output conditions.

The additional information table is effective only when automatic setting is selected on the layout setting screen. When the automatic setting is not selected, the basic layout table is referenced.

The data processing apparatus 1 thus produces the layout basic table and the additional layout table, and lays out the searched and collected output data in accordance with these tables.

FIG. 49 illustrates the user registration information management table managed in the external memory 211 of the data processing apparatus 1 of FIG. 1.

If the user simply sets minimum amount of data required for the layout, or if the user sets the registration information not closely related to the layout, the information set is used for layout. The resulting layout becomes more appropriate for each user.

Eighth Embodiment

In the preceding embodiments of the present invention, the layout condition is set taking into consideration the vision level of the user, the output data is laid out and printed in accordance with the layout condition, and the printout is then stapled. In an eighth embodiment of the present invention, the layout condition is adjusted in color to the preference of the user's nationality. The eighth embodiment will now be discussed.

Figure 50:
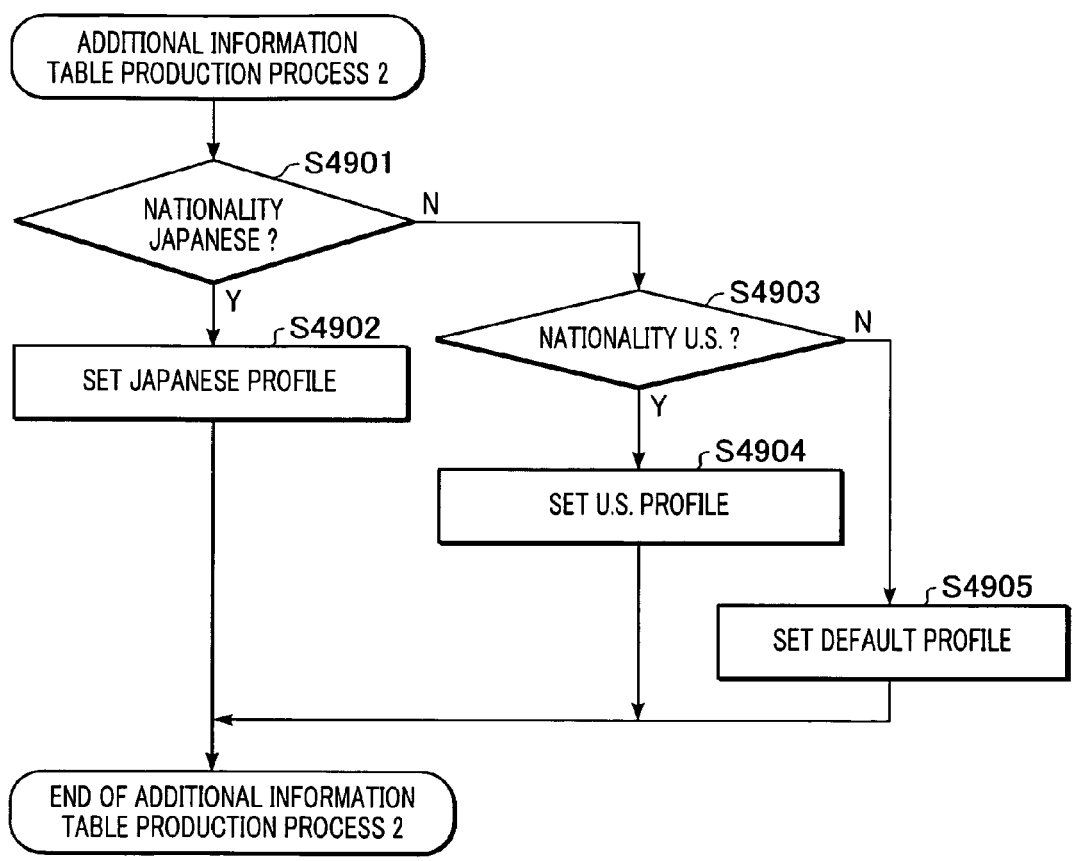
FIG. 50 is a flowchart illustrating a data processing procedure of the data processing apparatus in accordance with the present invention.

FIG. 50 is a flowchart of a data processing procedure of the data processing apparatus 1. In the data processing procedure containing steps S4901-S4905, the data processing apparatus 1 produces additional layout information from the user registration information other than the registration information directly required for layout.

FIG. 51 illustrates the personal information input screen displayed on the CRT 210 of the data processing apparatus 1 of FIG. 1. The difference of the personal information input screen from FIG. 12 is that an item designating nationality is included as personal information.

In step S4901, the data processing apparatus 1 determines the nationality of the user on the personal information table set by the user on the personal information input screen of FIG. 51. If it is determined that the user has a Japanese nationality, the algorithm proceeds to step S4902; otherwise, the algorithm proceeds to step S4903.

In step S4902, the data processing apparatus 1 sets a Japanese program file to select an international color consortium (ICC) profile that performs a color correction matching the preference of Japanese based on a statistically built database if the nationality is Japanese. The process is then complete.

If it is determined in step S4901 that the nationality is not Japanese, the data processing apparatus 1 determines from the personal information table whether the nationality is American. If it is determined that the nationality is American, the algorithm proceeds to step S4904. If it is determined that the user has a different nationality, the algorithm proceeds to step S4905.

It is determined in step S4904 that the nationality is American, the data processing apparatus 1 sets a Japanese program file to select an international color consortium (ICC) profile that performs a color correction matching the preference of Americans based on a statistically built database. The process is then complete.

In step S4905, the data processing apparatus 1 sets, as a default color correction parameter, a Japanese program file to select an international color consortium (ICC) profile that performs a color correction matching the preference of any major nationality group among users who uses the system of the present invention. The process is then complete.

FIG. 52 illustrates the user information table managed in the external memory 211 of the data processing apparatus 1 of FIG. 1.

In the eighth embodiment as shown, a different profile may be selected and set as the additional information table with respect to text, drawing and image.

Figure 53:
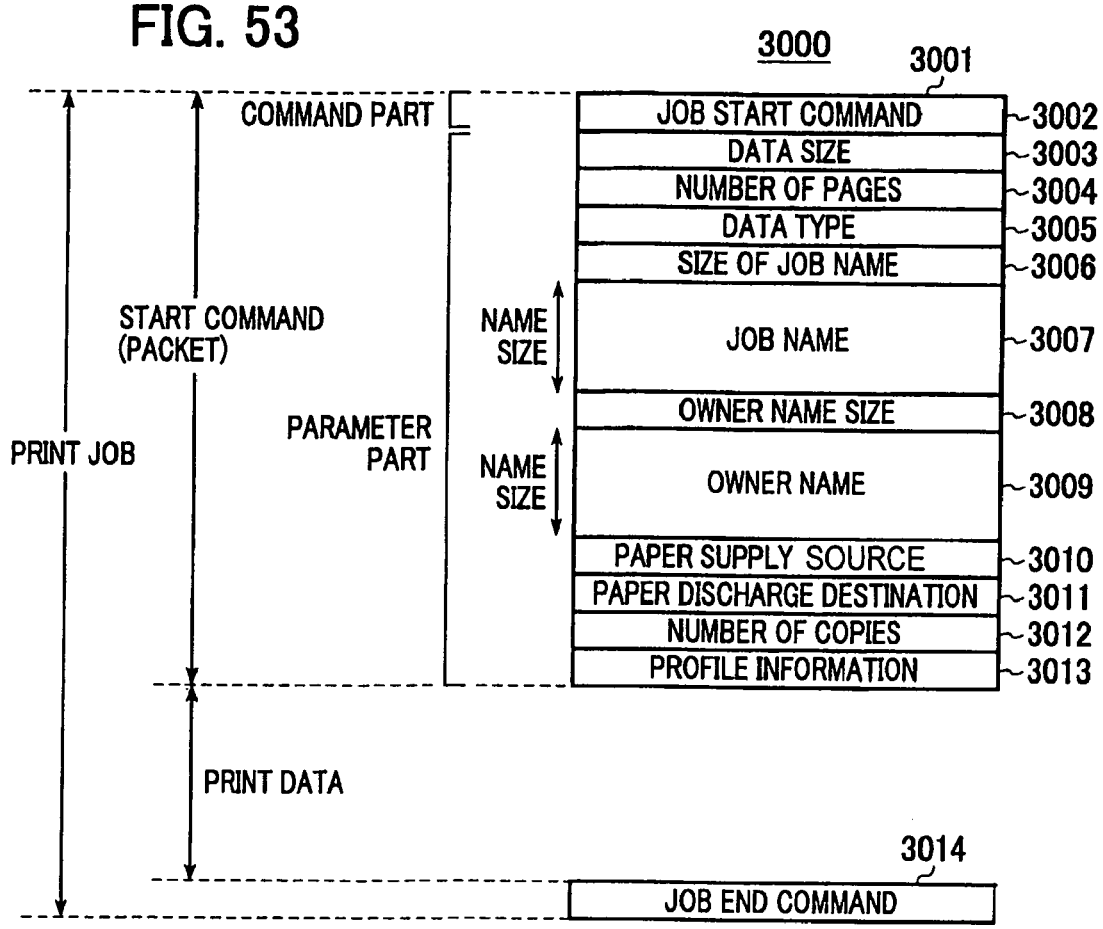
FIG. 53 illustrates the data structure of a print job sent to the home printing system from the data processing apparatus of FIG. 1.

FIG. 53 illustrates the data structure of the print job sent from the data processing apparatus 1 of FIG. 1 to the home printing system.

As shown, a print job 3000 for causing the home printer 4 to print out the layout-processed print data contains a start command 3001, the print data, and a job end command 3014. The print job 3000 starts with the start command 3001, and ends with the job end command 3014.

The start command 3001 contains an ID portion identifying that the command is a job start command 3002, a data size 3003 of the print data, the number of pages 3004 of the print data, a data type 3005, a size of job name 3006, a job name 3007, an owner name size 3008, an owner name 3009, a paper supply source 3010, a paper discharge destination 3011, a number of copies 3012, and profile information 3013.

The data type indicates whether the data is a text, an image, or a drawing. Each parameter is set by a printer driver program. The printer driver program is stored in the ROM 203 of the data processing apparatus 1 or the external memory 211, and is used to produce the data of the print job 3000. The printer driver program is initiated when the data processing apparatus 1 performs a series of process steps for collecting data, laying out the data, and delivering service. During data delivery, the printer driver program generates a variety of parameters for the job start command using the data of the user information table of FIG. 17 or FIG. 51.

The data set in the paper supply source 3010 identifies which of a plurality of paper cassettes 604 and 605 supplies the sheets of paper. The printer 4 prints the data on the sheet supplied from the designated paper cassette.

The printer 4 discussed with reference to FIG. 6 has no plurality of discharge trays. If a printer has a plurality of paper cassettes and a plurality of discharge trays as shown in FIG. 34, data for designating a discharge tray is set in the paper discharge destination 3011.

The command may further contain sheet size data for designating the size of sheets on which images are formed, and the type of sheets (medium type) for designating the type of sheets on which images are formed.

As already described in connection with the first and second embodiments, the print data part is the output data laid and edited, and contains image data, compressed image data, and script data such as PDL data.

The data processing apparatus 1 can modify the number of copies 3012 during the service providing in accordance with the user registration at the contract. The default value is one copy.

The profile 3013 holds an ICC profile corresponding to each of the text, drawing, or image in the additional information table of FIG. 29.

The job end command 3014 contains the command ID only.

Each parameter in the start command 3001 is set based on the user information table, and is sent as the print job. One example of parameter setting, here the profile parameter, has been discussed.

A profile is applied to the print data on a per data type basis (text, drawing, image) for color conversion. The profile information is contained in the print job, and is processed in the printer 4. Alternatively, a color process may be performed on the print data in the data processing apparatus 1.

Ninth Embodiment

In the first embodiment, the layout condition is set taking into consideration the personal information (vision level) of the user, and the output data is modified in accordance with the layout condition (for example, the point number of the output text is changed). In a ninth embodiment of the present invention, the data definition (layout condition) is set to be higher taking into consideration the vision of the level of the user, and the output data is modified in data definition accordingly.

Figure 54:
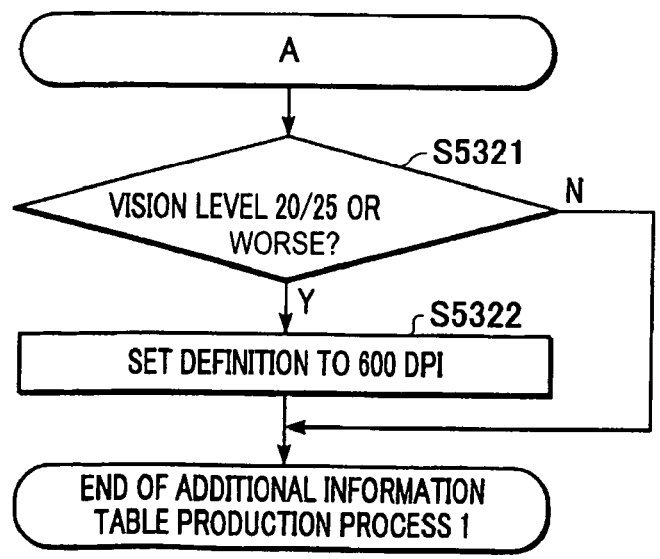
FIG. 54 is a flowchart illustrating a data processing procedure of the data processing apparatus in accordance with the present invention.

FIG. 54 is a flowchart of a data processing procedure of the data processing apparatus 1. In the data processing procedure containing steps S5321 and S5322, the data processing apparatus 1 produces the additional layout information from the user registration information other than the registration information directly required for layout.

In step S5321, the data processing apparatus 1 determines whether the user's vision level is not better than 20/25. If it is determined that the vision level is 20/25 or worse, a resolution of 600 dpi (dot/inch) is set (step S5322). If it is determined that the vision level is better than 20/25, a default data resolution of 300 dpi is set. The process is thus complete.

The data processing apparatus 1 produces the layout basic table and the additional layout table, determines the data processing resolution at the printer, and lays out the searched and collected output data in accordance with these settings.

The data processing resolution is switched at the threshold of vision level of 20/25. The present invention is not limited to this threshold. The resolution is not limited to 300 dpi and 600 dpi. For example, three resolutions with 1200 dpi added may be selectively used.

FIG. 55 illustrates the user registration information management table managed in the external memory 211 of the data processing apparatus 1 of FIG. 1.

As shown, the user information table is produced with the data processing resolution set at a higher value in the additional information table.

If the user simply sets a minimum amount of data required for the layout, or if the user sets the registration information not directly related to the layout, the information set is used for layout. The resulting layout becomes more appropriate for each user.

It is also possible to leave beforehand this setting to each user. However, if the user performs a detailed setting such as setting the character font, the line spacing, and the character spacing, the output results may look different depending on the resolution of the CRT of the PC 3. This setting is preferably left to the responsibility of the system rather than the responsibility of the user.

Tenth Embodiment

In the first embodiment, the layout condition is set taking into consideration the personal information (vision level) of the user, and the output data is modified in accordance with the layout condition (for example, the output text font is modified in point number). In a tenth embodiment of the present invention, a dither pattern (layout condition) is set to be a high resolution taking into consideration the vision level of the user, and the output data is modified (for example, the dither pattern is modified to binarize the output data).

Figure 56:
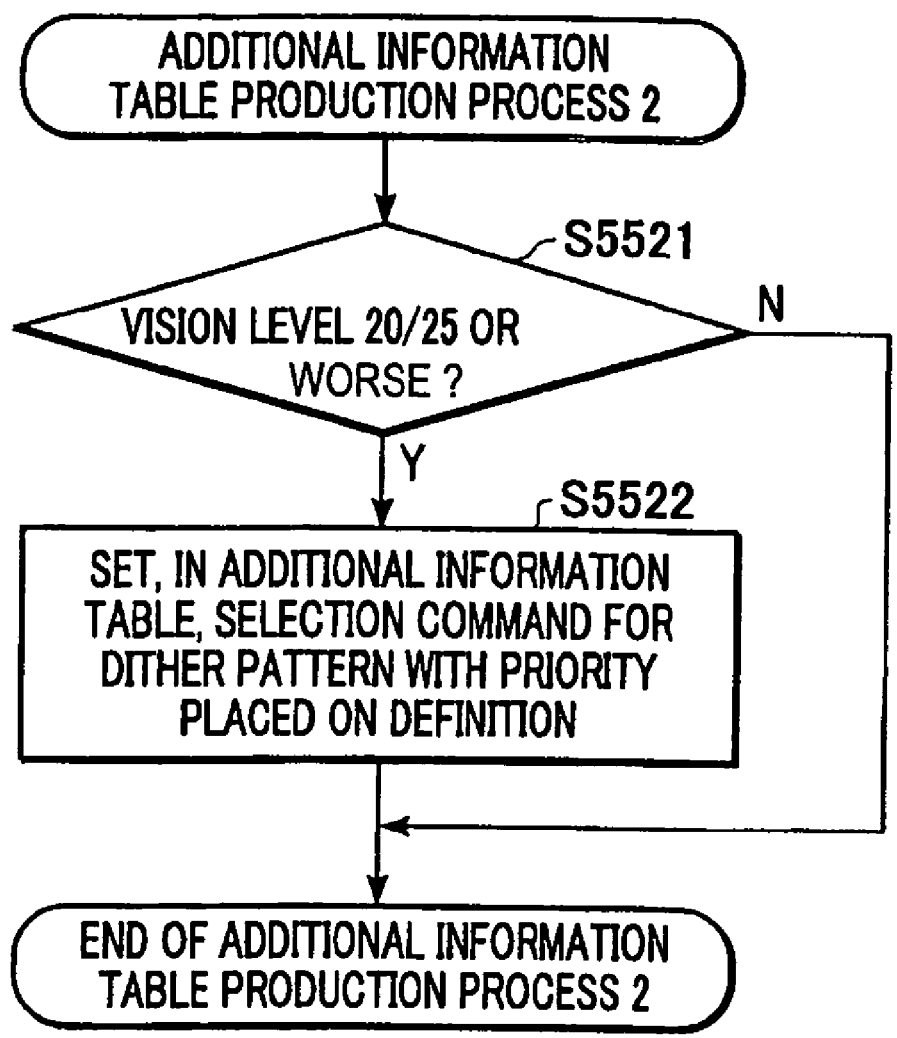
FIG. 56 is a flowchart of a data processing procedure of the data processing apparatus in accordance with the present invention.

FIG. 56 is a flowchart of a data processing procedure of the data processing apparatus 1. In the data processing procedure containing steps S5521 and S5522, the data processing apparatus 1 produces the additional layout information from the user registration information other than the registration information directly required for layout. Furthermore, the data processing apparatus 1 modifies the dither pattern to binarize the output data preferred by the user, using the vision information from the user registration information.

In step S5521, the data processing apparatus 1 checks to see if the user has vision not better than 20/25. If it is determined that the user's vision level is 20/25 or worse, the data processing apparatus 1 sets in step S5522 the additional information table to select a dither pattern with priority placed on resolution. The process is then complete. If it is determined in step S5521 that the vision level is better than 20/25, the data processing apparatus 1 sets the additional information table to select a default dither pattern with priority placed on tonal gradation.

The threshold of vision level to switch the dither pattern is set to 20/25. The present invention is not limited to a threshold of 20/25.

The number of dither patterns are not limited to two. For example, three dither patterns may be selectively used.

Information of correspondence table of the vision level and the dither pattern is stored in the external memory 211 of the data processing apparatus 1 of FIG. 2. The CPU 201 performs the operation of the flowchart under the control of the program stored in the ROM 203.

FIG. 57 illustrates the user registration information management table managed in the external memory 211 of the data processing apparatus 1 of FIG. 1.

As shown, the user information table is produced with the dither pattern set to a high resolution. Like many typically available printers, the printer in the tenth embodiment receives multi-level data from the outside, and binarizes the multi-level data using the dither pattern before printing the data.

The dither pattern is a pattern used to binarize the multi-level data. Depending on the pattern in use, the binarized result is processed with priority placed on resolution or tonal gradation.

If color characters (with 8 bits for each of the three primary colors red, green, and blue) are binarized with the dither pattern having priority placed on the tonal gradation, the outline of each character becomes blurred. A person with a low vision level (poor vision) may have difficulty reading a resulting printout. The dither pattern with priority placed on the resolution is used when the color character is binarized. On the other hand, there is a trade-off between resolution and tonal gradation, and the dither pattern with priority placed on resolution has a disadvantage of low tonal gradation.

A dither pattern appropriate for each user may be used in accordance with the user registration information depending on each type of data including text, photographic images, and drawings.

Eleventh Embodiment

In the first embodiment, the layout condition is set taking into consideration the personal information of the user, and the output data is modified in accordance with the layout condition. In an eleventh embodiment, a stitching direction of the printed matter is set taking into consideration the better arm of the user, and the stitching direction and stitching width are modified in accordance with the better arm of the user.

FIG. 58 illustrates an example of the personal information input screen displayed on the CRT 310 of the host PC 3 of FIG. 1. The difference of the personal information input screen here from FIG. 12 is that a setting item of "better arm" is included.

Figure 59:
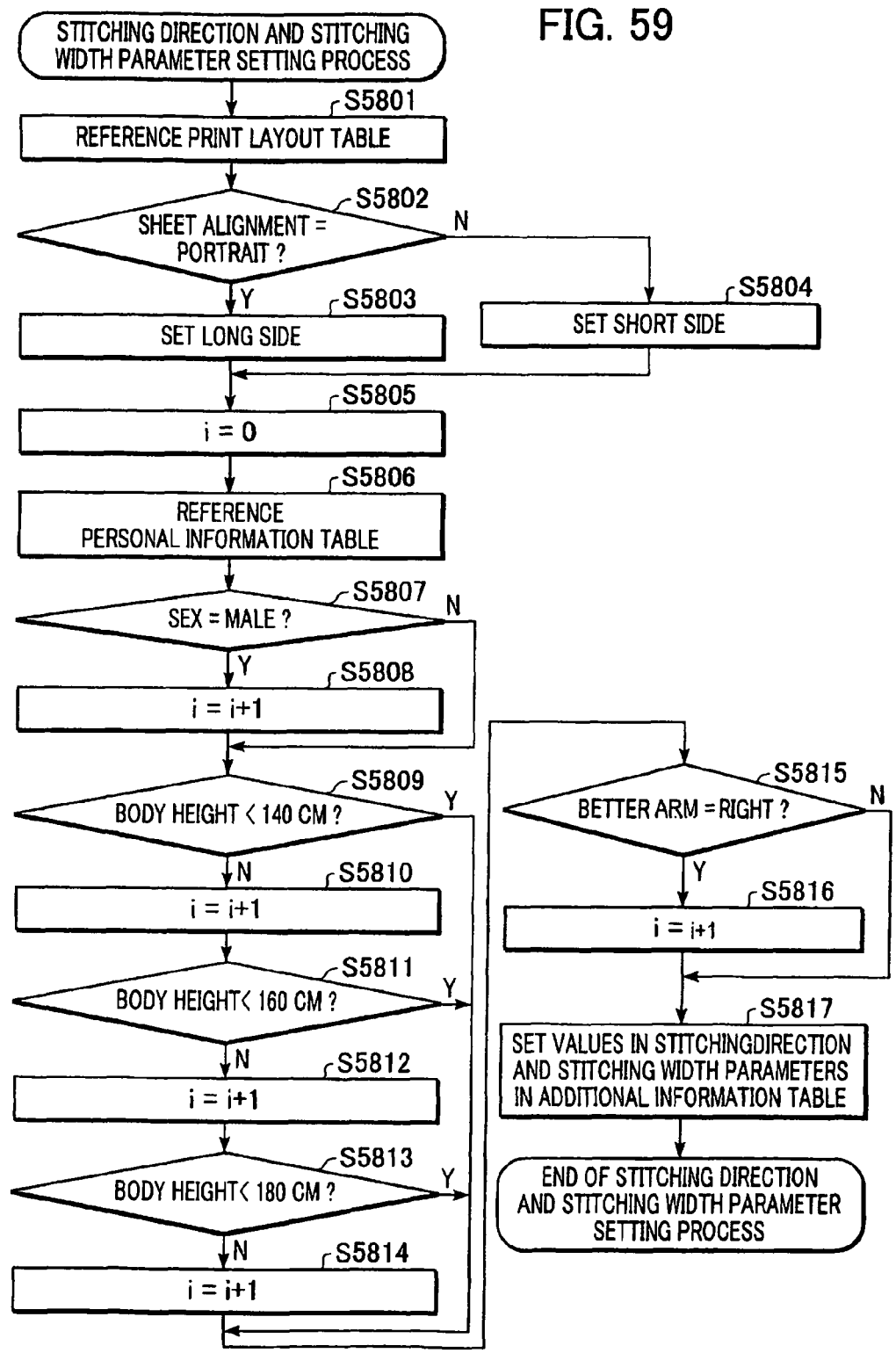
FIG. 59 is a flowchart of a data processing procedure of the data processing apparatus in accordance with the present invention.

FIG. 59 is a flowchart of a data processing procedure of the data processing apparatus 1. In the data processing procedure containing steps S5801-S5817, the data processing apparatus 1 produces the additional layout information (the stitching direction and stitching width parameters) from the user registration information other than the registration information directly required for layout.

The data processing apparatus 1 references in step S5801 the print layout table set from the personal information that is entered by the user during the service registration, thereby determining whether the sheet alignment is in a portrait direction (step S5802). If it is determined that that the sheet is aligned in a portrait direction, the data processing apparatus 1 sets the stitching direction parameter in the additional information table to "long side" (step S5803). If it is determined that the sheet alignment is not in a portrait direction, the data processing apparatus 1 sets the stitching direction parameter to "short side" (step S5804).

The data processing apparatus 1 initializes a parameter "i" for determining the stitching width (step S5805), and references the personal information table managed in the external memory 211 (step S5806).

The data processing apparatus 1 determines whether the user is male (step S5807). If it is determined that the user is male, the parameter "i" is incremented by one (step S5808), and the algorithm proceeds to step S5809.

If it is determined in step S5807 that the user is female, the algorithm directly proceeds to step S5809.

The data processing apparatus 1 determines whether the body height of the user is shorter than 140 cm (step S5809). If it is determined that the user is 140 cm or taller, the data processing apparatus 1 increments a parameter "i" by one (step S5810).

If it is determined in step S5809 that the user is shorter than 140 cm, the algorithm proceeds to step S5815.

The data processing apparatus 1 determines whether the user is shorter 160 cm (step S5811). If it is determined that the user is 160 cm or taller, the data processing apparatus 1 increments a parameter "i" by one (step S5812), and proceeds to step S5813.

If it is determined in step S5811 that the user is shorter than 160 cm, the algorithm proceeds to step S5815.

The data processing apparatus 1 determines whether the user is shorter than 180 cm (step S5813). If it is determined that the user is 180 cm or taller, the data processing apparatus 1 increments a parameter "i" by one (step S5814), and proceeds to step s5815.

If it is determined in step S5813 that the user is shorter than 180 cm, the algorithm proceeds to step S5815.

In step S5815, the data processing apparatus 1 checks to see if the user's better arm is registered as "right-handed" in the better arm item in the personal information input screen of FIG. 58. If it is determined that the user is right-handed, the data processing apparatus 1 increments a parameter "i" by one (step S5816).

The stitching direction and the stitching width parameters are set beforehand in the user information table of the user information table (step S5817), and the process is now complete.

FIG. 60 illustrates an example of the user information table managed in the external memory 211 of the data processing apparatus 1 of FIG. 1.

As shown, the items of the stitching direction and the stitching width are set in the additional information table of the user information table in the process of FIG. 59, and the parameters are entered therewithin.

The additional information table thus produced is attached as attribute information to the print data that is described in step S2402 of FIG. 25.

Figure 61:
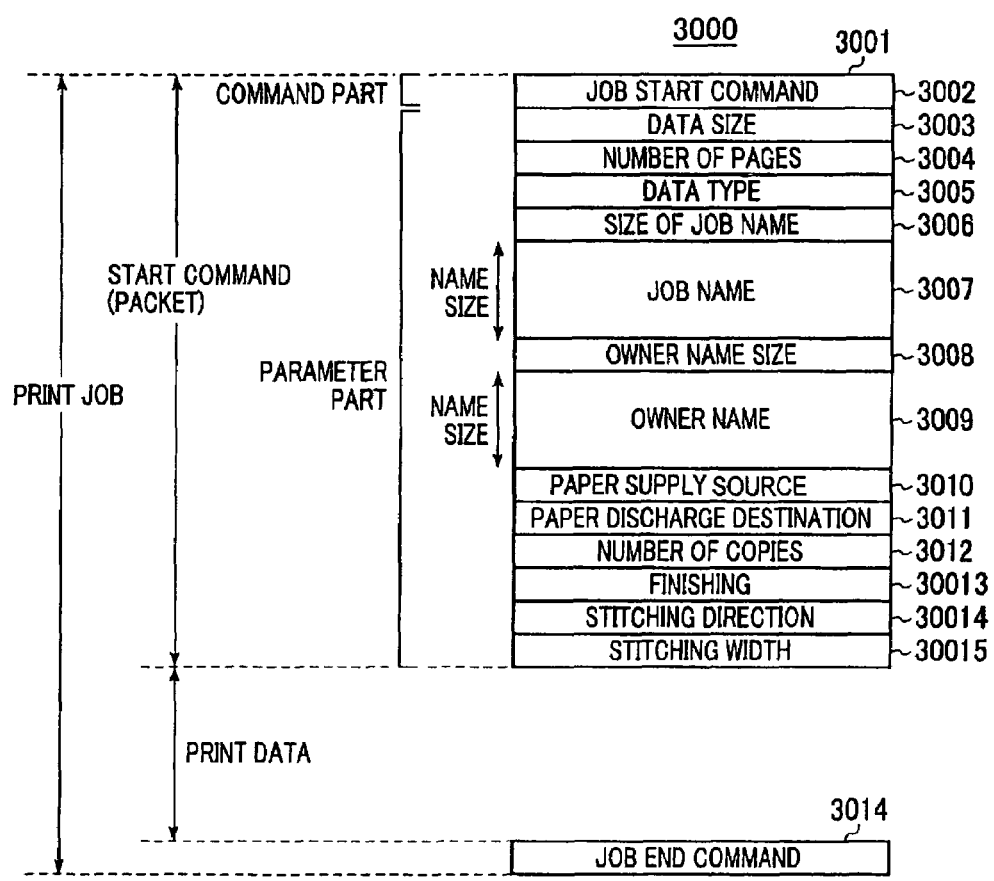
FIG. 61 illustrates the data structure of a print job sent to the home printing system from the data processing apparatus of FIG. 1.

FIG. 61 illustrates the data structure of the print job sent from the data processing apparatus 1 to the home printing system shown in FIG. 1. The elements identical to those described with reference to FIG. 53 are designated with the same reference numerals.

As shown in FIG. 61, the stitching direction parameter and the stitching width parameter are set in a stitching direction 30014 and a stitching width 30015, respectively. A parameter 30013 is for designating a finishing manner.

Upon receiving the print job, the host PC 3 transfers it to the printer 4. The printer 4 determines print attributes from the data of a job start command, and forms an image from subsequent print data in accordance with the print attributes. This operation remains the same as the first embodiment discussed with reference to FIG. 25.

The system of the present invention customizes, for each user, the print attributes based on the personal information registration information not closely related to printing, thereby providing a data delivery service finely tuned to and convenient to the user.

Twelfth Embodiment

In the first embodiment, the entire service providing system of the present invention converts the layout-processed and edited data into the print data, and sends the print data to the home printing system (including the host PC 3 and the printer 4) to cause the printer 4 to print out the print data. The print data sent from the data processing apparatus 1 has the format of print job containing the layout-processed print data and the print attribute information portion. In a twelfth embodiment, the structure of the print data sent from the data processing apparatus 1 and parameters of the print data are set.

Figure 62:
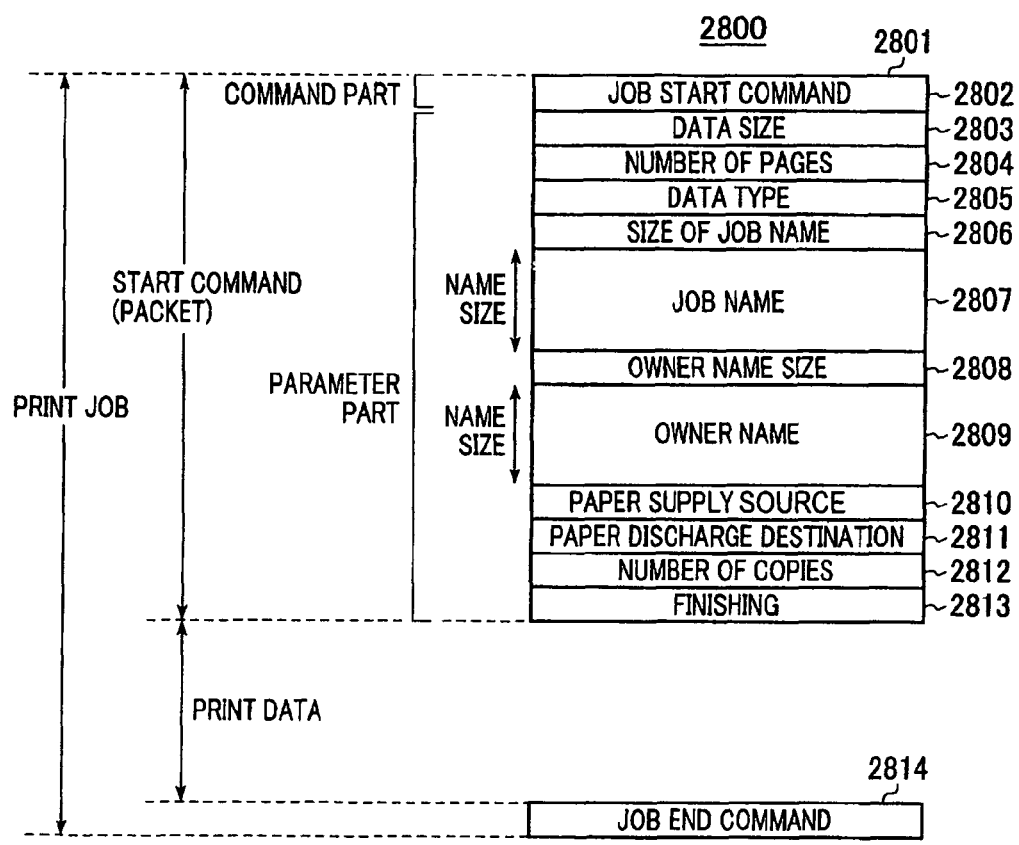
FIG. 62 illustrates the data structure of a print job sent to the home printing system from the data processing apparatus of FIG. 1.

FIG. 62 illustrates the data structure of the print job sent from the data processing apparatus 1 to the home printing system shown in FIG. 1.

As shown in FIG. 62, a print job 2800 for causing the home printer 4 to print out the layout-processed print data contains a job start command 2801, the print data, and a job end command 2814. The print job 2800 starts with the start command 2801, and ends with the job end command 2814.

The start command 2801 contains an ID portion identifying that the command is a job start command 2802, a data size 2803 of the print data, the number of pages 2804 of the print data, a data type 2805, a size of job name 2806, a job name 2807, an owner name size 2808, an owner name 2809, a paper supply source 2810, a paper discharge destination 2811, a number of copies 2812, and finishing type 2813. These parameters are collectively referred to as print attribute data.

The data type indicates whether the data is a text, an image, or a drawing. Each parameter is set by a printer driver program. The printer driver program is stored in the ROM 203 of the data processing apparatus 1 or the external memory 211, and is used to produce the data of the print job 2800. The printer driver program is initiated when the data processing apparatus 1 performs a series of process steps for collecting data, laying out the data, and delivering service. During data delivery, the printer driver program generates a variety of parameters for the job start command using the data of the user information table of FIG. 17 or FIG. 29.

Figure 63:
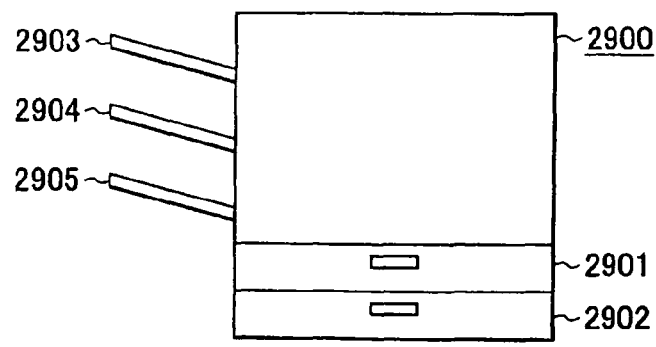
FIG. 63 diagrammatically illustrates the structure of the printer of FIG. 1.

The data set in the paper supply source 2810 identifies which of a plurality of paper cassettes (paper cassettes 604, and 605, and paper cassettes 2901 and 2902 of FIG. 63) supplies the sheets of paper. The printer 4 prints the data on a sheet supplied from the designated paper cassette.

The printer 4 discussed with reference to FIG. 6 has no plurality of discharge trays. A printer 2900 of FIG. 63 having a plurality of paper cassettes and a plurality of discharge trays may also be used as the printer 4.

FIG. 63 is a cross-sectional view diagrammatically illustrating the printer 2900 having a plurality of paper cassettes and a plurality of discharge trays.

As shown in FIG. 62, data set in the sheet supply source 2810 designates a source paper tray 2901-2903 and data set in the paper discharge destination 2811 designates one of the discharge trays 2903-2905 shown in FIG. 63.

The command may further contain sheet size data for designating the size of sheets on which images are formed, and the type of sheets (medium type) for designating the type of sheets on which images are formed.

As already described in connection with the first and second embodiments, the print data part is the output data layout-processed and edited, and contains image data, compressed image data, and script data such as PDL data.

The data processing apparatus 1 can modify the number of copies 2812 during the service in accordance with the user registration at the contract. The default value is one copy.

The finishing type 2813 sets the parameter of whether or not to staple the printed matter, and of whether the printed matter is stitched along the long side thereof or the short side thereof.

The job end command 2814 contains the command ID only.

Each parameter in the start command 2801 is set based on the user information table, and is sent as the print job. One example of parameter setting, the number of copies, will be discussed.

Figure 64:
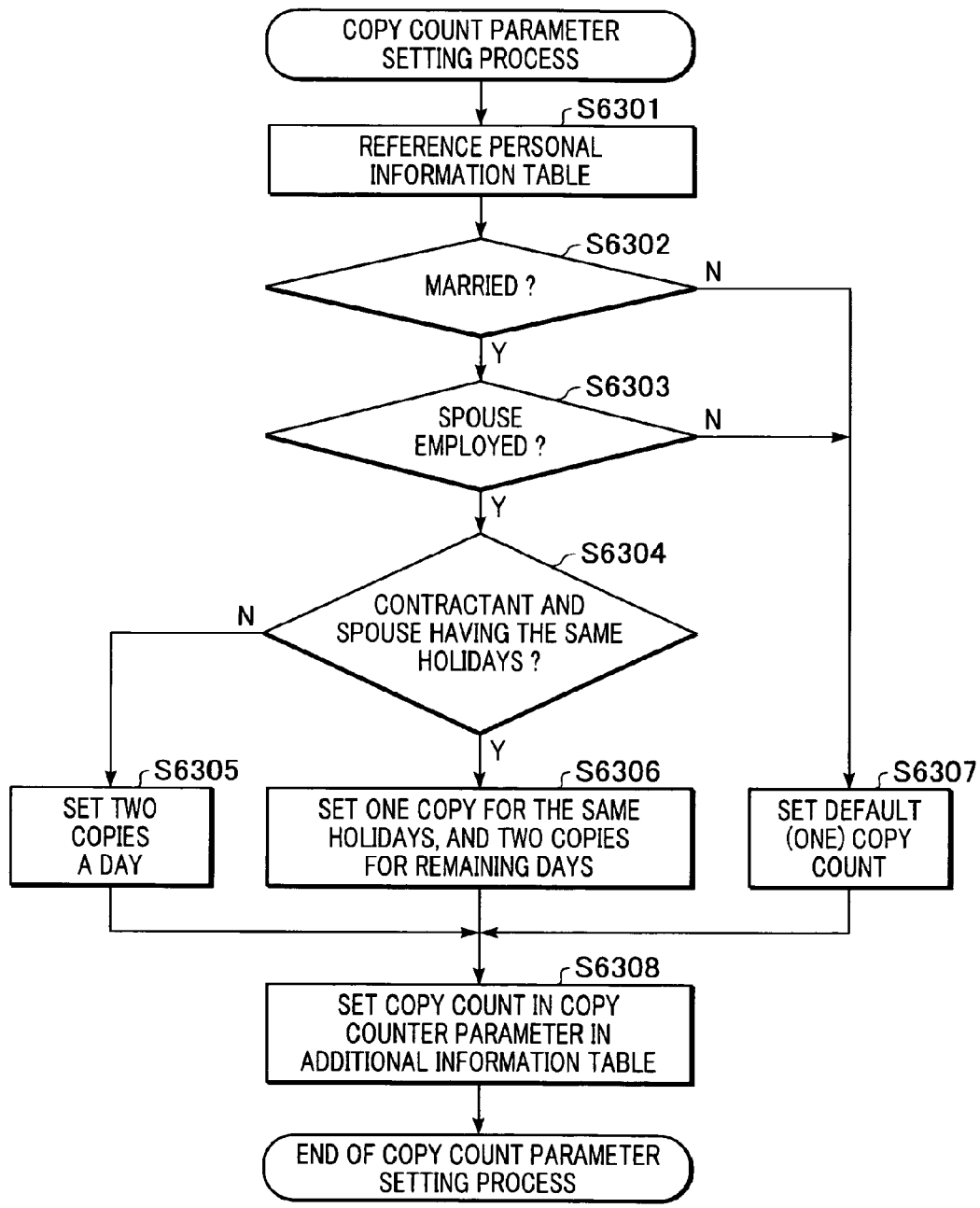
FIG. 64 is a flowchart of a data processing procedure of the data processing apparatus in accordance with the present invention.

FIG. 64 is a flowchart of a data processing procedure of the data processing apparatus 1. In the data processing procedure containing steps S6301-S6308, the data processing apparatus 1 sets the number of copies parameter in the additional information table of the user information table.

The data processing apparatus 1 references the personal information table set from the personal information that is set by the user during the service registration (step S6301), and checks to see if the user is married (step S6302). If it is determined that the user is married, the data processing apparatus 1 checks to see if the user's spouse is employed (step S6303). If it is determined that the user's spouse is employed, the data processing apparatus 1 checks to see if the user and user's spouse have the same holidays (step S6304).

For example, the user whose personal information is registered as shown in FIGS. 17 and 40 is married. The user's spouse is employed, and they have the same holidays, namely, Saturdays and Sundays. It is thus determined that the husband and wife spend the holidays together, and the number of copies parameter is set with one copy of prints for the holidays, and two copies of prints for the weekdays (step S6306).

If it is determined in step S6304 that the husband and wife have no same holidays, the number of copies parameter is set to two copies of prints for everyday (S6305). In this setting, the husband and wife may carry the printed matters of their own. This arrangement eliminates the need for an additional copy. With only one copy, another copy must be made available before coming to work. On the other hand, if it is determined that the husband and wife have at least one same holiday, the number of copies parameter is set to one copy for the days designated as a holiday for both the husband and wife and to two copies for the remaining days.

If it is determined in step S6302 that the user is unmarried, or if it is determined that the spouse is not employed, a default of one copy printing is set (step S6307).

The spouse, if not employed, may have time to collect information from another medium, and a default one copy printing is set.

The number of copies parameter determined in this way is set beforehand in the additional information table of the user information table (step S6308).

The item for the number of copy parameter is produced and set in the additional information table within the user information table shown in FIG. 17 or FIG. 40.

The additional information table thus set is attached, as attribute information, to the print data discussed in connection with step S2402 of FIG. 25.

In the case of FIG. 64, two as the number of copies parameter is set in the number of copies 2812.

Upon receiving the print job, the host PC 3 transfers it to the printer 4. The printer 4 determines print attribute from the data of the job start command, and forms an image from subsequent print data in accordance with the print attribute. This operation remains the same as the first embodiment discussed with reference to FIG. 25.

The system of the present invention customizes, for each user, the print attribute based on the personal information registration information not closely related to printing, thereby providing a data delivery service finely tuned to and convenient to the user.

Thirteenth Embodiment

In the first embodiment, the entire service providing system of the present invention converts the layout-processed and edited data into the print data, and sends the print data to the home printing system (including the host PC 3 and the printer 4) to cause the printer 4 to print out the print data. The print data sent from the data processing apparatus 1 has the format of print job containing the layout-processed print data and the print attribute information portion. In a thirteenth embodiment, the structure of the print data sent from the data processing apparatus 1 and parameters of the print data are set.

Figure 65:
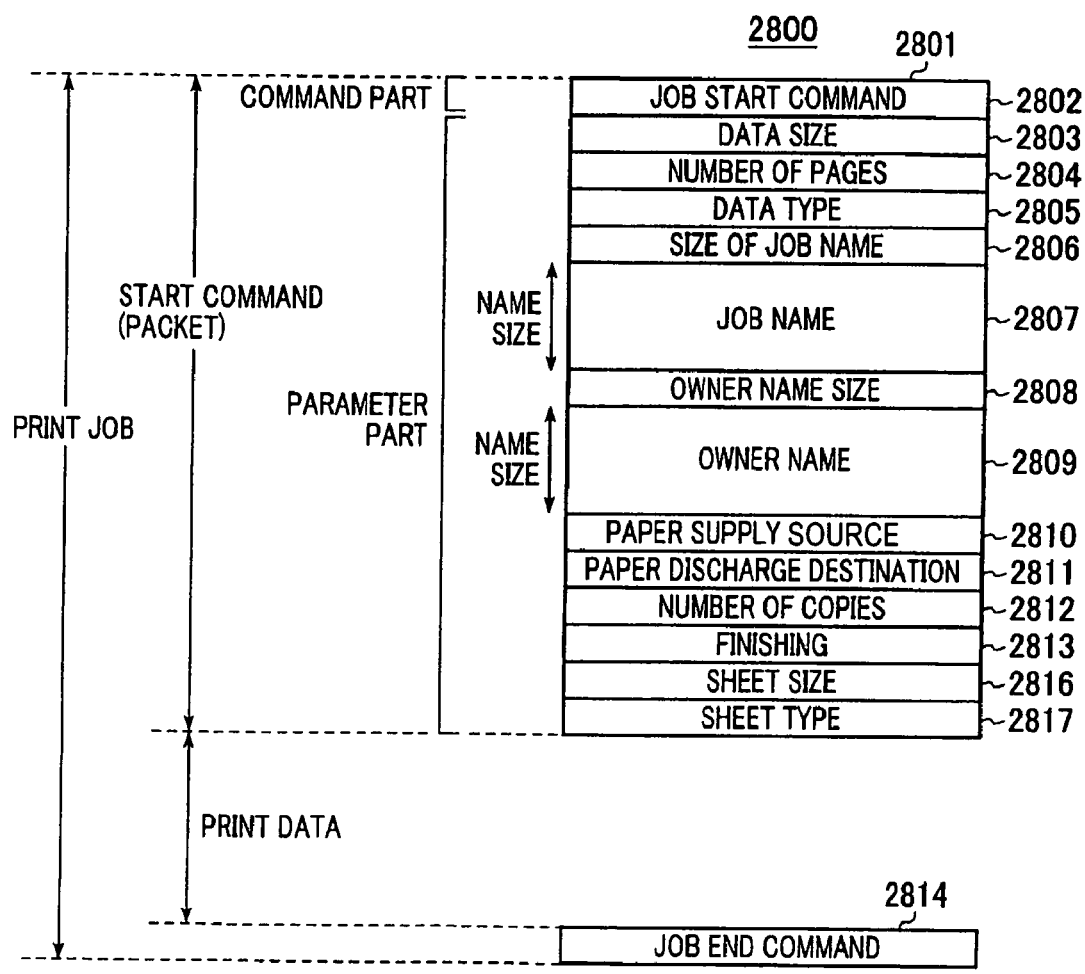
FIG. 65 illustrates the data structure of a print job sent to the home printing system from the data processing apparatus of FIG. 1.

FIG. 65 illustrates the data structure of the print job sent from the data processing apparatus 1 to the home printing system shown in FIG. 1.

As shown in FIG. 65, a print job 2800 for causing the home printer 4 to print out the layout-processed print data contains a job start command 2801, the print data, and a job end command 2814. The print job 2800 starts with the start command 2801, and ends with the job end command 2814.

The start command 2801 contains an ID portion identifying that the command is a job start command 2802, a data size 2803 of the print data, the number of pages 2804 of the print data, a data type 2805, a size of job name 2806, a job name 2807, an owner name size 2808, an owner name 2809, a paper supply source 2810, a paper discharge destination 2811, a number of copies 2812, and finishing type 2813. These parameters are collectively referred to as print attribute data.

The data type indicates whether the data is a text, an image, or a drawing. Each parameter is set by a printer driver program. The printer driver program is stored in the ROM 203 of the data processing apparatus 1 or the external memory 211, and is used to produce the data of the print job 2800. The printer driver program is initiated when the data processing apparatus 1 performs a series of process steps for collecting data, laying out the data, and delivering service. During data delivery, the printer driver program generates a variety of parameters for the job start command using the data of the user information table of FIG. 17 or FIG. 29.

The data set in the paper supply source 2810 identifies which of a plurality of paper cassettes (paper cassettes 604, and 605, and paper cassettes 2901 and 2902 of FIG. 63) supplies the sheets of paper. The printer 4 prints the data on a sheet supplied from the designated paper cassette.

The data processing apparatus 1 can modify the number of copies 2812 during the service in accordance with the user registration at the contract. The default value is one copy.

The finishing type 2813 sets the parameter of whether or not to staple the printed matter, and of whether the printed matter is stitched along the long side thereof or the short side thereof.

The job end command 2814 contains the command ID only.

Each parameter in the start command 2801 is set based on the user information table, and is sent as the print job. One example of parameter setting, here sheet size setting, will be discussed.

A sheet size that the user has registered on the layout setting screen of FIG. 13 is set in the sheet size 2816. A type of sheet (medium type) forming an image thereon is set in the sheet type 2817.

Figure 66:
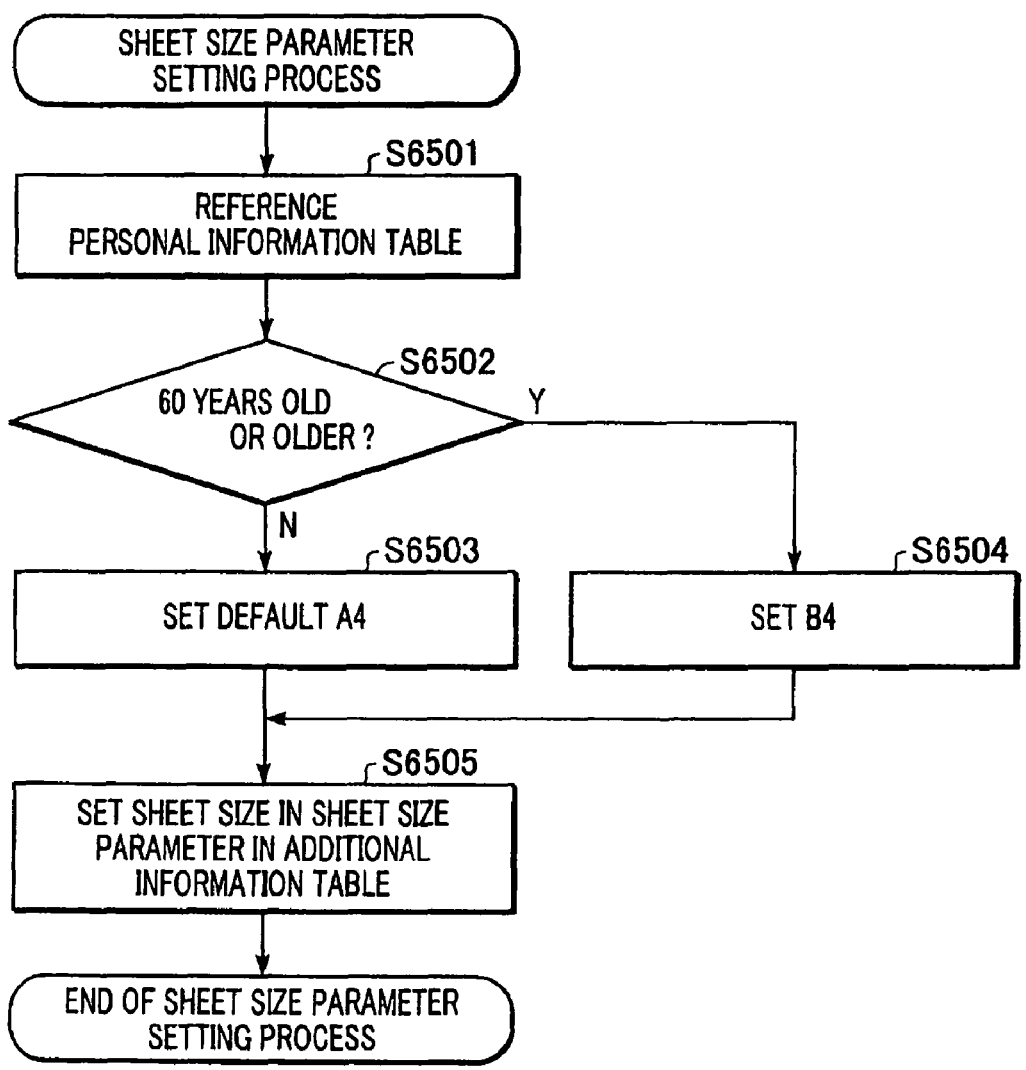
FIG. 66 is a flowchart of a data processing procedure of the data processing apparatus in accordance with the present invention.

FIG. 66 is a flowchart of a data processing procedure of the data processing apparatus 1. In the data processing procedure containing steps S6501-S6505, the data processing apparatus 1 sets the sheet size parameter in the additional information table of the user information table.

The data processing apparatus 1 references the personal information table that is set by the user during service registration (step S6501), and checks to see if the user is sixty-years-old or older based on the difference between the current date and the date of birth of the user input on the personal information input screen of FIG. 12 (step S6502). If it is determined that the user is younger than sixty-years-old, a default A4 sheet size is set (step S6503), and the algorithm proceeds to step S6505.

If it is determined in step S6502 that the user is sixty-years-old or older, a larger sheet size B4 is set (step S6504). In this way, an easy to see data is printed on a larger size sheet for an older person.

The parameter of the sheet size (sheet size 2816) is set beforehand in the additional information table of the user information table (step S6505), and the process is complete.

The item of the number of copies is produced in the additional information table of the user information table of FIG. 17, and the corresponding parameter is set.

Depending on the sex of the user, a sheet type parameter may be changed. For example, a pink sheet may be used for a female user.

The additional information table thus set is attached, as attribute information, to the print data discussed in connection with step S2402 of FIG. 25.

In the case of FIG. 64, two as the number of copies is set in the number of copies 2812. In the case of FIG. 66, A4 or B4 as the sheet size parameter is set in the sheet size 2816.

Upon receiving the print job, the host PC 3 transfers it to the printer 4. The printer 4 determines print attributes from the data of a job start command, and forms an image from subsequent print data in accordance with the print attributes. This operation remains the same as the first embodiment discussed with reference to FIG. 25.

The system of the present invention customizes, for each user, the print attributes based on the personal information registration information not closely related to printing, thereby providing a data delivery service finely tuned to and convenient to the user.

Fourteenth Embodiment

In the first embodiment, the layout condition is set taking into consideration the user, and the output data is modified in accordance with the layout condition. To deliver and print out more information, the output data must be laid out with the font as small as possible with the line spacing and the character spacing narrowed. If the same condition is applied in the layout for all users, some users may like it, but other user may not.

In a fourteenth embodiment, the user registration information not closely related to the layout information is also accounted for as a parameter of the layout information. The data processing apparatus 1 provides more output data in a layout satisfying the preference of each user. The fourteenth embodiment of the present invention will now be discussed.

To deliver more information, the output data must be laid out with more text information using a small font with a narrow line spacing and a narrow character spacing.

If the output data is laid out under such a condition, the resulting layout may not be preferable to primary school students. To young students, a document with a lot of photographs and drawings is easy to see and read. Such a document helps them to understand the content of the document with ease.

In the fourteenth embodiment of the present invention, the user registration information not directly related to the layout information, for example, age information as a primary school student, is accounted for as the layout information. The data processing apparatus 1 thus loads a large amount of effective information in the output date in a layout matching the level of the primary school students.

Figure 68:
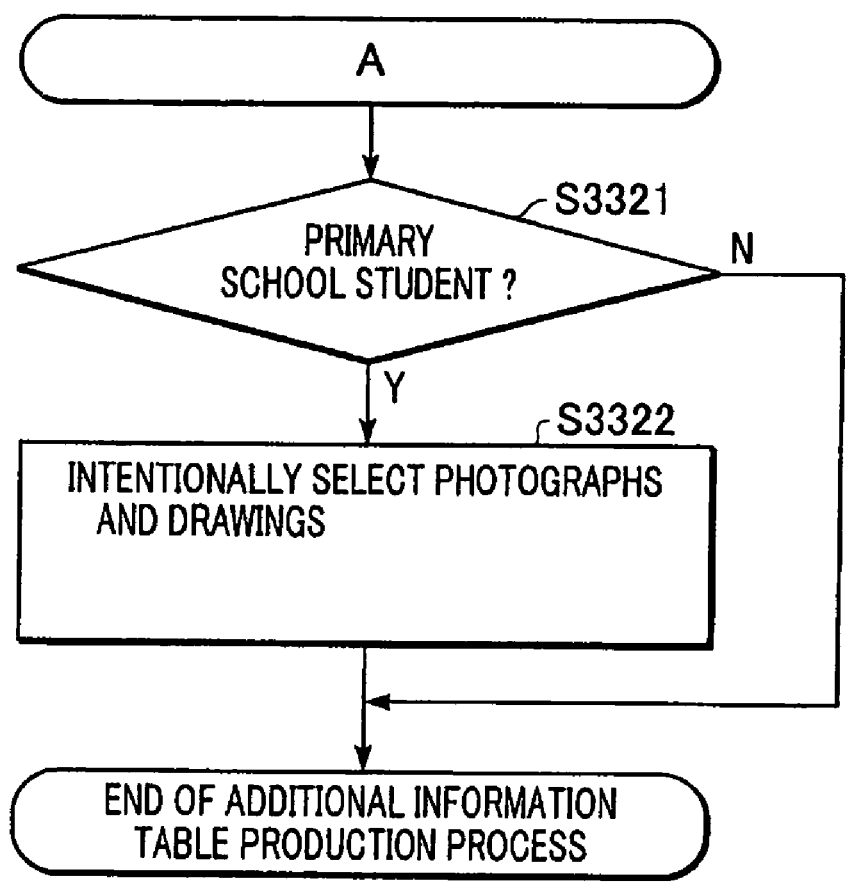
FIG. 68 is a flowchart illustrating a data processing procedure of the data processing apparatus of the present invention.

FIG. 68 is a flowchart of a data processing procedure of the data processing apparatus 1. In the data processing procedure containing steps S3321 and S3322, the data processing apparatus 1 increases the number of objects such as photographs and drawings if the user is a primary school student.

In step S3321, the data processing apparatus 1 checks to see if the user is a primary school student (from the age of the user requesting information). If it is determined that the user is a primary school student, the data processing apparatus 1 sets a layout of more photograph images and drawings (step S3322), and ends the process.

If it is determined in step S3321 that the user is not a primary school student, the data processing apparatus 1 does not set a layout for more photograph images and drawings, and ends the process.

The data processing apparatus 1 generates the layout basic table and the additional layout table, and lays out the searched and collected output data in accordance with these tables (as discussed with the process of FIG. 22).

FIG. 69 illustrates an example of the user registration information management table managed in the external memory 211 of the data processing apparatus 1 of FIG. 1.

As shown, if the user simply sets minimum amount of data required for the layout, or if the user sets the registration information not closely related to the layout, the information set is used for layout. The resulting layout becomes more appropriate for each user.

It is also possible to leave beforehand this setting to each user. However, if the user performs a detailed setting such as setting for the character font, the line spacing, and the character spacing, the output results may look different depending on the resolution of the CRT of the PC 3. This setting is preferably left to the responsibility of the system rather than the responsibility of the user.

Referring to a memory map shown in FIG. 67, the structure of a data processing program will now be discussed. The data processing program is read by the data processing system incorporating the data processing apparatus of the present invention.

Figure 67:
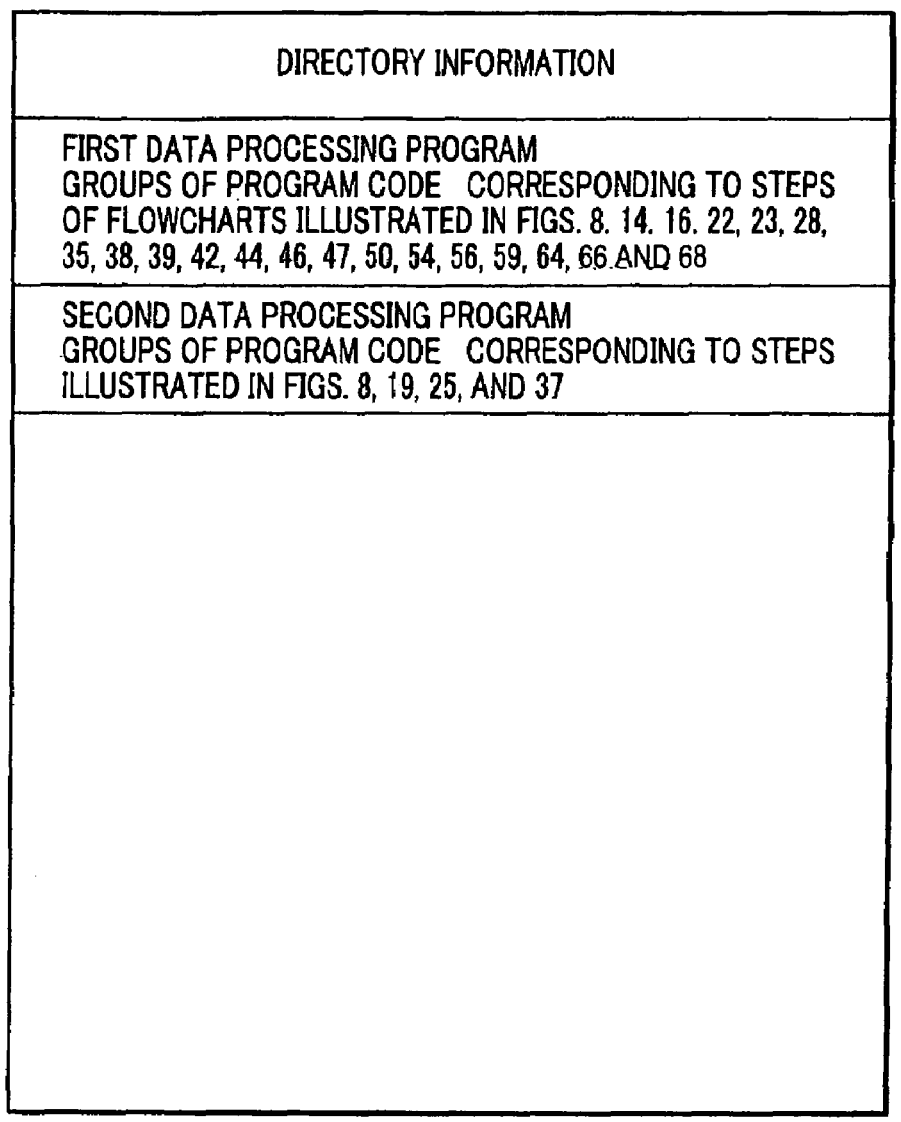
FIG. 67 illustrates a memory map of a storage medium that stores a variety of data processing programs that may be read by the data processing system incorporating the data processing apparatus of exemplary embodiments of the present invention.

FIG. 67 illustrates the memory map of a storage medium that stores various data processing programs read by the data processing system incorporating the data processing apparatus of the present invention.

The storage medium may store information for managing a group of programs, such as version information, and creator's name, and information depending on an operating system (OS), such as an icon for identifying each program, although these pieces of information are not shown.

Data belonging to each program is also managed in a directory. The storage medium may also store a program for installing each program onto a computer, and a program for decompressing the program to be installed if that program is compressed.

Under the control of a program installed from the outside, a host computer may perform the functions illustrated in FIGS. 8, 14, 16, 19, 22, 23, 25, 28, 35, 37, 38, 39, 42, 44, 46, 47, 50, 54, 56, 59, 64, 66, and 68. In such a case, an output apparatus may be supplied with a group of information containing programs by a storage medium such as a CD-ROM, a flash memory, a floppy disk, etc. or from an external storage medium through a network. Such an arrangement falls within the scope of the present invention.

A storage medium storing program code of software for carrying out the functions of the above-described embodiments is loaded in a system or apparatus. A computer (a CPU or an MPU) in the system or apparatus reads and executes the program code from the storage medium, thus achieving the object of the present invention.

The program code read from the storage medium performs the novel functions of the above-described embodiment, and the storage medium storing the program codes falls within the scope of the present invention.

Storage media for providing the program include, but are not limited to, a floppy disk, a hard disk, an optical disk, a magneto-optical disk, a CD-ROM, a CD-R, a magnetic tape, a nonvolatile memory card, a ROM, an EEPROM, and the like.

By executing the program code read by the computer, the functions of the above-described embodiments are performed. Furthermore, the operating system running on the computer performs the process in whole or in part in response to instructions from the program code. The functions of the above-described embodiments are thus carried out. Such an arrangement falls within the scope of the present invention.

The program code from the storage medium is read into a memory incorporated in a feature expansion board in the computer or in a feature expansion unit connected to the computer. The CPU mounted on the feature expansion board or the feature expansion unit performs partially or entirely the actual process in response to the instructions from the program code. The functions of the above-described embodiments are executed through the process. Such program code falls within the scope of the present invention.

The present invention is not limited to the above-described embodiments. A change and a combination of the above-described embodiments may be made without departing from the scope of the present invention.

Various embodiments of the present invention have been discussed. It may be apparent to those skilled in the art that the scope of the invention is not limited to any particular embodiment. The following embodiments also fall within the scope of the present invention.

In one embodiment of the present invention, the data processing apparatus of the present invention includes a layout unit for laying out data to be printed under a predetermined layout condition, a print job production unit for producing a print job that contains, as print attribute data, a layout result that is laid out by the layout unit, a sending unit (such as the communication I/F controller 208 of FIG. 2, for example) for sending, to another data processing apparatus, the print job produced by the print job production unit, a storage unit (the external memory 211 of FIG. 2, for example) for storing detailed personal information that contains data that is registered to be delivered and contains at least a data acquisition condition set from the other information processing apparatus, and other data, and a controller (for example, a job processing program loaded into the RAM 202 and executed by the CPU 201 of FIG. 2) that controls the production of individual print attribute data to be attached to the print job based on user information and the detailed personal information of a destination of the print job.

In one embodiment of the present invention, the data processing apparatus communicates with a data providing apparatus (for example, each of the data source servers 2A, 2B, and 2C of FIG. 1) for managing and providing a variety of information, acquires information of interest in accordance with personal information registered by a user, and produces a print job. The data processing apparatus includes a storage unit (the external memory 211 of FIG. 2, for example) for storing the personal information containing data that contains at least a data acquisition condition and is registered for data delivery, and other data, an acquisition unit (for example, the job processing program loaded into the RAM 202 and executed by the CPU 201 of FIG. 2) that acquires data from the data providing apparatus under a preregistered data acquisition condition by communicating with the data providing apparatus, a data storing unit (for example, the external memory 211 or the RAM 202 shown in FIG. 2) for storing the data acquired by the acquisition unit, a layout unit (the external memory 211 of FIG. 2, for example) for laying out the data stored in the data storing unit under a predetermined layout condition, a print job production unit (for example, the job processing program loaded into the RAM 202 and executed by the CPU 201 of FIG. 2) for producing a print job containing print attribute data from a layout result provided by the layout unit, a sending unit (the communication I/F controller 208 of FIG. 2) for sending, to another data processing apparatus, the print job produced by the print job production unit, and a controller (for example, the job processing program loaded into the RAM 202 and executed by the CPU 201 of FIG. 2) that controls the production of individual print attribute data to be attached to the print job, based on the user information and detailed personal information of a destination of the print job.

In one embodiment of the present invention, the data processing system includes a data providing apparatus for providing and managing a variety of information, a user data processing apparatus for registering information of interest acquired by a user in a data processing apparatus, and the data processing apparatus that acquires the information of interest in accordance with personal information registered on the data providing apparatus by the user and produces a print job. In the system, the data providing apparatus, the user data processing apparatus, and the data processing apparatus communicate with each other. The data processing apparatus includes a storage unit (the external memory 211 of FIG. 2, for example) for storing personal information containing data that contains at least a data acquisition condition and is registered for data delivery, and other data, an acquisition unit (for example, the job processing program loaded into the RAM 202 and executed by the CPU 201 of FIG. 2) that acquires data from the data providing apparatus under a preregistered data acquisition condition by communicating with the data providing apparatus, a data storing unit (for example, the external memory 211 or the RAM 202 shown in FIG. 2) for storing the data acquired by the acquisition unit, a layout unit (for example, the job processing program loaded into the RAM 202 and executed by the CPU 201 of FIG. 2) for laying out the data stored in the data storing unit under a predetermined layout condition, a print job production unit (for example, the job processing program loaded into the RAM 202 and executed by the CPU 201 of FIG. 2) for producing a print job containing print attribute data from a layout result provided by the layout unit, a sending unit (the communication I/F controller 208 of FIG. 2) for sending, to the user data processing apparatus, the print job produced by the print job production unit, and a controller (for example, the job processing program loaded into the RAM 202 and executed by the CPU 201 of FIG. 2) that controls the production of individual print attribute data to be attached to the print job, based on the user information and detailed personal information of a destination of the print job.

In one embodiment, the individual print attribute data contains a print density parameter to a printer that prints the print job.

In one embodiment, the print density parameter is a parameter for commanding a toner saving mode.

In one embodiment, the print density parameter is a parameter for commanding a print density.

In one embodiment, the other data processing apparatus is a printer.

In one embodiment, the user data processing apparatus communicates with the printer that prints in accordance with the print job sent from the data processing apparatus.

In one embodiment, the printer is optionally connected to a discharge unit that discharges a sheet in accordance with the print attribute data.

In one embodiment, the controller controls the production of the individual print attribute data to be attached to the print job for controlling the discharge unit, based on the user information and the detailed personal information of the destination of the print job.

In one embodiment, the discharge unit includes a staple sorter.

In one embodiment, the discharge unit includes a plurality of discharge trays, and a discharge processor that discharges a printout to any one of the discharge trays.

In one embodiment, the controller produces the print attribute data that determines the operation of the plurality of discharge trays in accordance with the detailed personal information.

In one embodiment, the detailed personal information of a user contains any of the date of birth, the occupation, the academic career, the marital status, the number of children, information as to whether or not the spouse of the user is employed, the blood type, the sex, the holidays, the annual income, the number of family members, the age of each child, the holidays of the spouse, physical information, the nationality, and the body height of the user.

In one embodiment, the physical information contains any of information as to whether the user is handicapped, the degree of the handicap if handicapped, the vision level, the better arm, and a reading place of the user.

In one embodiment, the controller produces the print attribute data that determines the operation of the plurality of discharge trays in accordance with the physical information of the detailed personal information.

In one embodiment, the controller produces the print attribute data that determines the operation of the plurality of discharge trays in accordance with the physical information and the age of the user specified in the detailed personal information.

In one embodiment, the controller produces the print attribute data that determines the staple operation of the staple sorter in accordance with the holidays specified in the detailed personal information.

In one embodiment, the controller produces the print attribute data related to a color matching parameter that determines a print color in accordance with the detailed personal information.

In one embodiment, the controller produces the print attribute data related to a color matching parameter that determines a different print color depending on the age of the user specified in the detailed personal information.

In one embodiment, the controller produces the print attribute data related to a color matching parameter that determines a different print color depending on the nationality of the user specified in the detailed personal information.

In one embodiment, the controller produces the print attribute data related to a color matching parameter that determines a different print color depending on the occupation of the user specified in the detailed personal information.

In one embodiment, the controller produces the print attribute data related to a color matching parameter that determines a different print color depending on the reading place of the user specified in the detailed personal information.

In one embodiment, the controller determines the layout condition in accordance with the detailed personal information.

In one embodiment, the controller produces the print attribute data related to a color correction table parameter among the color matching parameters that determine a different print color depending on the detailed personal information.

In one embodiment, the controller produces the print attribute data related to a color correction table parameter among the color matching parameters that determine a different print color depending on the age of the user specified in the detailed personal information.

In one embodiment, the controller produces the print attribute data related to a color correction table parameter among the color matching parameters that determine a different print color depending on the nationality of the user specified in the detailed personal information.

In one embodiment, the controller produces the print attribute data related to a color correction table parameter among the color matching parameters that determine a different print color depending on the occupation of the user specified in the detailed personal information.

In one embodiment, the controller produces the print attribute data related to a color correction table parameter among the color matching parameters that determine a different print color depending on the reading place of the user specified in the detailed personal information.

In one embodiment, the controller determines, from the layout condition related to a character font size, a print area, a character spacing, and a line spacing, whether a text to be printed can be printed within the print area without any missing portion thereof.

In one embodiment, the controller produces the print attribute data that determines the alignment of the layout of information to be printed in accordance with the detailed personal information.

In one embodiment, the controller produces the print attribute data that determines the alignment of the layout of information to be printed in accordance with the reading place of the user specified in the detailed personal information.

In one embodiment, the controller produces the print attribute data that determines the number of copies of information to be printed in accordance with the detailed personal information.

In one embodiment, the controller produces the print attribute data that determines the staple position of the staple sorter in accordance with the detailed personal information.

In one embodiment, the controller produces the print attribute data that determines the staple position of the staple sorter in accordance with the reading place of the user specified in the detailed personal information.

In one embodiment, the controller produces the print attribute data that determines an image processing condition of information to be printed, in accordance with the detailed personal information.

In one embodiment, the controller produces the print attribute data that determines a print resolution as the image processing condition of the information to be printed, in accordance with the detailed personal information.

In one embodiment, the controller produces the print attribute data that determines a dither pattern as the image processing condition of the information to be printed, in accordance with the detailed personal information.

In one embodiment, the controller produces the print attribute data that determines a print resolution as the image processing condition of the information to be printed, in accordance with the vision information of the detailed personal information.

In one embodiment, the controller produces the print attribute data that determines a dither pattern as the image processing condition of the information to be printed, in accordance with the vision information of the detailed personal information.

In one embodiment, the controller sends the print job containing the determined print attribute data to an external apparatus.

In one embodiment, the controller produces the print attribute data that determines an offset condition of the information to be printed, in accordance with the detailed personal information.

In one embodiment, the controller produces a stitching direction parameter and a stitching width parameter that determine an offset condition of the information to be printed, in accordance with the detailed personal information.

In one embodiment, the controller produces a stitching direction parameter and a stitching width parameter that determine an offset condition of the information to be printed, in accordance with the sex of the user specified in the detailed personal information.

In one embodiment, the controller produces a stitching direction parameter and a stitching width parameter that determine an offset condition of the information to be printed, in accordance with the better arm of the user specified in the detailed personal information.

In one embodiment, the controller produces a stitching direction parameter and a stitching width parameter that determine an offset condition of the information to be printed, in accordance with the body height of the user specified in detailed personal information.

In one embodiment, the controller produces the print attribute data that determines the number of copies of information to be printed, in accordance with the detailed personal information.

In one embodiment, the controller produces the print attribute data that determines the number of copies of information to be printed, the number of copies changing depending on the day of the week in accordance with the detailed personal information.

In one embodiment, the controller produces the print attribute data that determines a sheet to be printed, in accordance with the detailed personal information.

In one embodiment, the controller produces the print attribute data that determines the size of sheets to be printed, in accordance with the detailed personal information.

In one embodiment, the controller produces the print attribute data that determines the type of sheets to be printed, in accordance with the detailed personal information.

In one embodiment, the controller produces the print attribute data that determines a sheet to be printed, in accordance with the age of the user specified in the detailed personal information.

In one embodiment, the controller produces the print attribute data that determines the size of sheets to be printed, in accordance with the age of the user specified in the detailed personal information.

In one embodiment, the controller produces the print attribute data that determines the type of sheets to be printed, in accordance with the age of the user specified in the detailed personal information.

In one embodiment, the controller produces the print attribute data that determines a sheet to be printed, in accordance with the sex of the user specified in the detailed personal information.

In one embodiment, the controller produces the print attribute data that determines the size of sheets to be printed, in accordance with the sex of the user specified in the detailed personal information.

In one embodiment, the controller produces the print attribute data that determines the type of sheets to be printed, in accordance with the sex of the user specified in the detailed personal information.

One embodiment of the present invention relates to the data processing method of the data processing apparatus that includes the layout unit for laying out data to be printed under a predetermined layout condition, the print job production unit for producing the print job that contains, as the print attribute data, the layout result that is laid out by the layout unit, and the sending unit for sending, to another data processing apparatus, the print job produced by the print job production unit. The data processing method includes a storage step (step S801 of FIG. 8, for example) for storing the detailed personal information that contains data that is registered to be delivered and contains at least a data acquisition condition set from the other information processing apparatus, and other data, and a controlling step (for example, steps S802-S804 of FIG. 8) for controlling the production of individual print attribute data to be attached to the print job based on user information and the detailed personal information of a destination of the print job.

One embodiment of the present invention relates to the data processing method of the data processing apparatus that communicates with a data providing apparatus for managing and providing a variety of information, acquires information of interest in accordance with personal information registered by a user, and produces a print job. The data processing method includes a storing step (step S803 of FIG. 8, for example) for storing personal information containing data that contains at least a data acquisition condition and is registered for data delivery, and other data, an acquisition step (for example, step S803 of FIG. 8) for acquiring data from the data providing apparatus under a preregistered data acquisition condition in communication with the data providing apparatus, a data storing step (for example, step S803 of FIG. 8) for storing the data acquired in the acquisition step, a layout step (step S804 of FIG. 8) for laying out the data stored in the data storing step under a predetermined layout condition, a print job production step for producing a print job containing print attribute data from a layout result provided in the layout step, a sending step (step S805 of FIG. 8) for sending, to another data processing apparatus, the print job produced in the print job production step, and a controlling step (for example, step S804 of FIG. 8) for controlling the production of individual print attribute data to be attached to the print job, based on the user information and detailed personal information of a destination of the print job.

One embodiment of the present invention relates to a data processing method of a data processing system that includes a data providing apparatus for providing and managing a variety of information, a user data processing apparatus for registering information of interest acquired by a user in a data processing apparatus, and the data processing apparatus that acquires the information of interest in accordance with personal information registered on the data providing apparatus by the user and produces a print job. In the system, the data providing apparatus, the user data processing apparatus, and the data processing apparatus communicate with each other.

The data processing method includes a storage step for storing personal information containing data that contains at least a data acquisition condition and is registered for data delivery, and other data, an acquisition step (for example, step S802 of FIG. 8) for acquiring data from the data providing apparatus under a preregistered data acquisition condition in communication with the data providing apparatus, a data storing step (for example, step S801 of FIG. 8) for storing the data acquired in the acquisition step, a layout step (for example, step S804 of FIG. 8) for laying out the data stored in the data storing step under a predetermined layout condition, a print job production step (for example, step S804 of FIG. 8) for producing a print job containing print attribute data from a layout result provided in the layout step, a sending step (for example, step S806 of FIG. 8) for sending, to the user data processing apparatus, the print job produced in the print job production step, and a controlling step (for example, step S804 of FIG. 8) for controlling the production of individual print attribute data to be attached to the print job, based on the user information and detailed personal information of a destination of the print job.

In one embodiment, the individual print attribute data contains a print density parameter to a printer that prints the print job.

In one embodiment, the print density parameter is a parameter for commanding a toner saving mode.

In one embodiment, the print density parameter is a parameter for commanding a print density.

In one embodiment, the other data processing apparatus is a printer.

In one embodiment, the user data processing apparatus communicates with the printer that prints in accordance with the print job sent from the data processing apparatus.

In one embodiment, the printer is optionally connected to a discharge unit that discharges a sheet in accordance with the print attribute data.

In one embodiment, the controlling step includes controlling the production of the individual print attribute data to be attached to the print job for controlling the discharge unit, based on the user information and the detailed personal information of the destination of the print job.

In one embodiment, the discharge unit includes a staple sorter.

In one embodiment, the discharge unit includes a plurality of discharge trays, and a discharge processor that discharges a printout to any one of the discharge trays.

In one embodiment, the controlling step includes producing the print attribute data that determines the operation of the plurality of discharge trays in accordance with the detailed personal information.

In one embodiment, the detailed personal information of a user contains any of the date of birth, the occupation, the academic career, the marital status, the number of children, information as to whether or not the spouse of the user is employed, the blood type, the sex, the holidays, the annual income, the number of family members, the age of each child, the holidays of the spouse, physical information, the nationality, and the body height of the user.

In one embodiment, the physical information contains any of information as to whether the user is handicapped, the degree of the handicap if handicapped, the vision level, the better arm, and a reading place of the user.

In one embodiment, the controlling step includes producing the print attribute data that determines the operation of the plurality of discharge trays in accordance with the physical information of the detailed personal information.

In one embodiment, the controlling step includes producing the print attribute data that determines the operation of the plurality of discharge trays in accordance with the physical information and the age of the user specified in the detailed personal information.

In one embodiment, the controlling step includes producing the print attribute data that determines the staple operation of the staple sorter in accordance with the holidays specified in the detailed personal information.

In one embodiment, the controlling step includes producing the print attribute data related to a color matching parameter that determines a print color in accordance with the detailed personal information.

In one embodiment, the controlling step includes producing the print attribute data related to a color matching parameter that determines a different print color depending on the age of the user specified in the detailed personal information.

In one embodiment, the controlling step includes producing the print attribute data related to a color matching parameter that determines a different print color depending on the nationality of the user specified in the detailed personal information.

In one embodiment, the controlling step includes producing the print attribute data related to a color matching parameter that determines a different print color depending on the occupation of the user specified in the detailed personal information.

In one embodiment, the controlling step includes producing the print attribute data related to a color matching parameter that determines a different print color depending on the reading place of the user specified in the detailed personal information.

In one embodiment, the controlling step includes determining the layout condition in accordance with the detailed personal information.

In one embodiment, the controlling step includes producing the print attribute data related to a color correction table parameter among the color matching parameters that determine a different print color depending on the detailed personal information.

In one embodiment, the controlling step includes producing the print attribute data related to a color correction table parameter among the color matching parameters that determine a different print color depending on the age of the user specified in the detailed personal information.

In one embodiment, the controlling step includes producing the print attribute data related to a color correction table parameter among the color matching parameters that determine a different print color depending on the nationality of the user specified in the detailed personal information.

In one embodiment, the controlling step includes producing the print attribute data related to a color correction table parameter among the color matching parameters that determine a different print color depending on the occupation of the user specified in the detailed personal information.

In one embodiment, the controlling step includes producing the print attribute data related to a color correction table parameter among the color matching parameters that determine a different print color depending on the reading place of the user specified in the detailed personal information.

In one embodiment, the controlling step includes determining, from the layout condition related to a character font size, a print area, a character spacing, and a line spacing, whether text to be printed can be printed within the print area without any missing portion thereof.

In one embodiment, the controlling step includes producing the print attribute data that determines the alignment of the layout of information to be printed, in accordance with the detailed personal information.

In one embodiment, the controlling step includes producing the print attribute data that determines the alignment of the layout of information to be printed, in accordance with the reading place of the user specified in the detailed personal information.

In one embodiment, the controlling step includes producing the print attribute data that determines the number of copies of information to be printed, in accordance with the detailed personal information.

In one embodiment, the controlling step includes producing the print attribute data that determines the staple position of the staple sorter in accordance with the detailed personal information.

In one embodiment, the controlling step includes producing the print attribute data that determines the staple position of the staple sorter in accordance with the reading place of the user specified in the detailed personal information.

In one embodiment, the controlling step includes producing the print attribute data that determines an image processing condition of information to be printed, in accordance with the detailed personal information.

In one embodiment, the controlling step includes producing the print attribute data that determines a print resolution as the image processing condition of the information to be printed, in accordance with the detailed personal information.

In one embodiment, the controlling step includes producing the print attribute data that determines a dither pattern as the image processing condition of the information to be printed, in accordance with the detailed personal information.

In one embodiment, the control step includes producing the print attribute data that determines a print resolution as the image processing condition of the information to be printed, in accordance with the vision information of the detailed personal information.

In one embodiment, the controlling step includes producing the print attribute data that determines a dither pattern as the image processing condition of the information to be printed, in accordance with the vision information of the detailed personal information.

In one embodiment, the controlling step includes sending the print job containing the determined print attribute data to an external apparatus.

In one embodiment, the controlling step includes producing the print attribute data that determines an offset condition of the information to be printed, in accordance with the detailed personal information.

In one embodiment, the controlling step includes producing a stitching direction parameter and a stitching width parameter that determine an offset condition of the information to be printed, in accordance with the detailed personal information.

In one embodiment, the control step includes producing a stitching direction parameter and a stitching width parameter that determine an offset condition of the information to be printed, in accordance with the sex of the user specified in the detailed personal information.

In one embodiment, the controlling step includes producing a stitching direction parameter and a stitching width parameter that determine an offset condition of the information to be printed, in accordance with the better arm of the user specified in the detailed personal information.

In one embodiment, the controlling step includes producing a stitching direction parameter and a stitching width parameter that determine an offset condition of the information to be printed, in accordance with the body height of the user specified in detailed personal information.

In one embodiment, the controlling step includes producing the print attribute data that determines the number of copies of information to be printed, in accordance with the detailed personal information.

In one embodiment, the controlling step includes producing the print attribute data that determines the number of copies of information to be printed, the number of copies changing depending on the day of the week in accordance with the detailed personal information.

In one embodiment, the controlling step includes producing the print attribute data that determines a sheet to be printed, in accordance with the detailed personal information.

In one embodiment, the controlling step includes producing the print attribute data that determines the size of sheets to be printed, in accordance with the detailed personal information.

In one embodiment, the controlling step includes producing the print attribute data that determines the type of sheets to be printed, in accordance with the detailed personal information.

In one embodiment, the controlling step includes producing the print attribute data that determines a sheet to be printed, in accordance with the age of the user specified in the detailed personal information.

In one embodiment, the controlling step includes producing the print attribute data that determines the size of sheets to be printed, in accordance with the age of the user specified in the detailed personal information.

In one embodiment, the controlling step includes producing the print attribute data that determines the type of sheets to be printed, in accordance with the age of the user specified in the detailed personal information.

In one embodiment, the controlling step includes producing the print attribute data that determines a sheet to be printed, in accordance with the sex of the user specified in the detailed personal information.

In one embodiment, the controlling step includes producing the print attribute data that determines the size of sheets to be printed, in accordance with the sex of the user specified in the detailed personal information.

In one embodiment, the controlling step includes producing the print attribute data that determines the type of sheets to be printed, in accordance with the sex of the user specified in the detailed personal information.

One embodiment relates to a computer executable program including program code for performing one of the previously described data processing methods.

One embodiment relates to a computer readable storage medium that stores a computer executable program including program code for executing one of the above data processing methods.

In each of the previously described embodiments of the present invention, the data processing apparatus customizes the print attribute data to be attached to the print job, referencing the personal information registered on a per user basis. The data processing apparatus properly performs the print job in accordance with the personal information registered by the user even if the user performs no print setting on the print job. The data processing system thus presents a data processing environment that allows a print job production process to provide an excellent printout customized to each user.

More specifically, the data processing apparatus references the detailed personal information registered on a per user basis (including the date of birth, the occupation, the academic career, the marital status, the number of children, information as to whether or not the spouse of the user is employed, the blood type, the sex, the holidays, the annual income, the number of family members, the age of each child, the holidays of the spouse, the physical information, the nationality, the body height, and the better arm of the user, etc.). The data processing apparatus then customizes, on a per user basis, the print attribute data to be attached to the print job. The print attribute data may include the print character font size, the print sheet size, and the type of the sheet, the number of copies, the discharge destination, information as to whether to staple the printed matter, the staple position, and the image processing condition (image density, image resolution, the designation of the dither pattern, and the color matching parameter). Even if the user performs no print setting, the print job customized for each user is obtained. The data processing system thus presents a data processing environment that allows a print job production process to provide an excellent printout customized to each user.

When the system for providing data delivery service is built using the data source servers as shown in FIG. 1, the print data attribute of the print job to be delivered is customized for each user. The user simply prints the print job delivered from the data processing apparatus. The user thus prints out the delivered data in an intended form without any print irregularities and any useless printouts.

By referencing personal information registered by each user, the data processing apparatus customizes print attribute data that is attached to the print job to be output, and processes the print job in accordance with the personal information registered by the user even when no print setting is performed on the print job by the user. The data processing apparatus thus presents a convenient data processing environment under which the print job is generated to result in an excellent printout customized for each user.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A layout apparatus comprising:
a first determining unit for determining whether a user has a spouse by referring to a personal information table;
a second determining unit for determining whether the spouse is employed when the first determining unit determines that the user has the spouse; and
a first setting unit for setting a number of copies parameter as two when the first determining unit determines that the user has the spouse and the second determining unit determines that the spouse is employed and for setting the number of copies parameter as one when the first determining unit determines that the user has no spouse or when the second determining unit determines that the spouse is not employed,
a third determining unit for determining whether the user and the spouse have the same holidays when the second determining unit determines that the spouse is employed,
wherein the first setting unit sets the number of copies parameter as two when the first determining unit determines that the user has the spouse, the second determining unit determines that the spouse is employed and the third determining unit determines that the user and the spouse do not have the same holidays,
wherein the first setting unit sets the number of copies parameter as one for the same holidays and as two for the non-same holidays when the third determining unit determines that the user and the spouse have the same holidays, and
wherein the first setting unit sets the number of copies parameter as one when the first determining unit determines that the user has no spouse or when the second determining unit determines that the spouse is not employed.

2. A layout apparatus according to claim 1,
wherein the first setting unit sets a paper size parameter as a first sheet size when it is determined that the user is not older than a predetermined age by referring to personal information, and wherein the first setting unit sets the paper size parameter as a second sheet size, which is larger than the first sheet size, when it is determined that the user is older than a predetermined age by referring to personal information.

3. A layout method comprising a processor:
determining whether a user has a spouse by referring to a personal information table;
determining whether the spouse is employed when it is determined that the user has the spouse; and setting a number of copies parameter as two when it is determined that the user has the spouse and the spouse is employed and setting the number of copies parameter as one when it is determined that the user has no spouse or that the spouse is not employed,
determining whether the user and the spouse have the same holidays when it is determined that the spouse is employed,
wherein the number of copies parameter is set as two when it is determined that the user has the spouse, that the spouse is employed and that the user and the spouse have no same holidays,
wherein the number of copies parameter is set as one for the same holidays and as two for the non-same holidays when it is determined that the user and the spouse have the same holidays, and
wherein the number of copies parameter is set as one when it is determined that the user has no spouse or that the spouse is not employed.

4. A layout apparatus according to claim 3,
wherein a sheet size parameter is set as a first sheet size when it is determined that the user is not older than a predetermined age by referring to personal information, and
wherein the sheet size parameter is set as a second sheet size, which is larger than the first sheet size, when it is determined that the user is older than the predetermined age by referring to personal information.

* * * * *